US012734632B2

(12) United States Patent
Sato et al.

(10) Patent No.: US 12,734,632 B2
(45) Date of Patent: Sep. 15, 2026

(54) SPINDLE LUBRICATOR OF MACHINE TOOL, MACHINE TOOL, AND USE METHOD OF MACHINE TOOL

(71) Applicant: Yamazaki Mazak Corporation, Niwa-gun (JP)

(72) Inventors: Kimihiko Sato, Niwa-gun (JP); Takayuki Oka, Niwa-gun (JP); Mayato Tanaka, Niwa-gun (JP)

(73) Assignee: YAMAZAKI MAZAK CORPORATION, Niwa-gun (JP)

( * ) Notice: Subject to any disclaimer, the term of this patent is extended or adjusted under 35 U.S.C. 154(b) by 0 days.

(21) Appl. No.: 19/315,659

(22) Filed: Sep. 1, 2025

(65) Prior Publication Data

US 2025/0387861 A1 Dec. 25, 2025

Related U.S. Application Data

(63) Continuation of application No. PCT/JP2023/033488, filed on Sep. 14, 2023.

(51) Int. Cl.
*B23Q 11/12* (2006.01)
*F16C 33/66* (2006.01)
*F16N 7/38* (2006.01)

(52) U.S. Cl.
CPC ............ *B23Q 11/123* (2013.01); *F16C 33/66* (2013.01); *F16N 7/38* (2013.01)

(58) Field of Classification Search
CPC .... B23Q 11/123; F16C 33/66; F16C 33/6674; F16C 33/6662; F16C 33/6685; F16N 7/38
See application file for complete search history.

(56) References Cited

U.S. PATENT DOCUMENTS 3,062,454 A * 11/1962 Cocks ................. B05B 13/0207 239/550
3,618,709 A * 11/1971 Boelkins ................... F16N 7/32 184/81

(Continued)

FOREIGN PATENT DOCUMENTS

CN 101131182 2/2008
CN 101182901 5/2008

(Continued)

OTHER PUBLICATIONS

International Preliminary Report on Patentability (Chapter I) with translation of Written Opinion for corresponding International Application No. PCT/JP2023/033488, Mar. 26, 2026.

(Continued)

*Primary Examiner* — Michael A Riegelman
(74) *Attorney, Agent, or Firm* — MORI & WARD, LLP

(57) ABSTRACT

A spindle lubricator of a machine tool includes a rotation body configured to hold a tool; bearings; a housing; a fluid mixture supplier; and a collector that collects an oil-containing fluid. The collector includes collection flow channels, ejectors, and flow control valves. The ejectors include a first ejector configured to generate negative pressure due to first air to suck a first oil-containing fluid through a first collection flow channel; and a second ejector that generates negative pressure due to second air to suck a second oil-containing fluid through a second collection flow channel. The flow control valves include a first flow control valve configured to adjust a flow rate of the first air; and a second flow control valve configured to adjust a flow rate of the second air.

20 Claims, 32 Drawing Sheets

(56) References Cited

U.S. PATENT DOCUMENTS

| | | | | |
|---|---|---|---|---|
| 4,205,708 A * | 6/1980 | Burgbacher | F16N 7/32 139/438 |
| 4,284,174 A * | 8/1981 | Salvana | F16C 19/52 60/39.08 |
| 4,312,424 A * | 1/1982 | Taylor | F16N 27/00 180/8.5 |
| 4,494,676 A * | 1/1985 | Berweger | B29B 7/7447 222/63 |
| 4,527,661 A * | 7/1985 | Johnstone | F16C 33/6674 384/468 |
| 5,020,636 A * | 6/1991 | Daeges | F16N 7/32 184/7.4 |
| 5,715,912 A * | 2/1998 | Maxwell | F16N 7/32 184/6.12 |
| 6,769,884 B2 * | 8/2004 | Miller | F04B 9/113 91/275 |
| 6,840,404 B1 * | 1/2005 | Schultz | B29B 7/7457 222/137 |
| 8,256,388 B2 * | 9/2012 | Aixala | F01P 3/08 123/196 R |
| 8,881,871 B2 * | 11/2014 | Divisi | F16N 7/32 184/55.1 |
| 9,616,540 B2 * | 4/2017 | Balaji | B23Q 11/10 |
| 10,576,596 B2 * | 3/2020 | Bangma | F16N 13/22 |
| 12,072,061 B2 * | 8/2024 | Lehmann | B05B 7/0491 |
| 2003/0123940 A1 * | 7/2003 | Hubbard | B23Q 11/1076 408/1 R |
| 2003/0159889 A1 * | 8/2003 | Johnson | B65G 45/02 184/15.3 |
| 2005/0241882 A1 * | 11/2005 | Grozinger | B23Q 11/1046 184/50.2 |
| 2008/0050060 A1 * | 2/2008 | Norihisa | F16C 33/58 384/473 |
| 2008/0110700 A1 * | 5/2008 | Yanohara | F16C 33/6674 184/7.4 |
| 2009/0026016 A1 * | 1/2009 | Matumura | B23Q 11/123 184/6.14 |
| 2009/0242330 A1 * | 10/2009 | Shimomura | F16N 7/366 184/6.26 |
| 2012/0031705 A1 * | 2/2012 | Divisi | F16N 27/005 184/55.1 |
| 2014/0334757 A1 * | 11/2014 | Onda | F16C 33/767 384/467 |
| 2015/0226266 A1 * | 8/2015 | Mori | B23Q 11/123 384/467 |
| 2015/0330564 A1 * | 11/2015 | Mueller | F16N 11/08 184/7.4 |
| 2016/0158784 A1 * | 6/2016 | Fehr | B05B 9/0413 239/569 |
| 2017/0066097 A1 * | 3/2017 | Bangma | B05B 7/0876 |
| 2017/0113315 A1 * | 4/2017 | Bangma | B23Q 11/1046 |
| 2025/0354584 A1 * | 11/2025 | Sato | B23Q 11/123 |
| 2025/0387861 A1 * | 12/2025 | Sato | B23Q 11/123 |

FOREIGN PATENT DOCUMENTS

| | | |
|---|---|---|
| CN | 101549467 | 10/2009 |
| CN | 103180626 | 6/2013 |
| CN | 208358268 U | 1/2019 |
| CN | 111350933 | 6/2020 |
| CN | 211387977 U | 9/2020 |
| CN | 113357271 | 9/2021 |
| CN | 215092391 U | 12/2021 |
| CN | 114905327 | 8/2022 |
| CN | 116494019 | 7/2023 |
| JP | H02-053343 U | 4/1990 |
| JP | H05-111850 | 5/1993 |
| JP | 2003-232371 | 8/2003 |
| JP | 2006-077851 | 3/2006 |
| JP | 2008-151179 | 7/2008 |
| JP | 2010-240783 | 10/2010 |
| JP | 2016-002622 | 1/2016 |
| JP | 3214465 U | 1/2018 |
| JP | 2020-199584 | 12/2020 |
| JP | 2020199584 A * | 12/2020 |
| JP | 2021-028513 | 2/2021 |

OTHER PUBLICATIONS

Supplementary European Search Report for corresponding EP Application No. 23952245.1-1103, Mar. 5, 2026.

Chinese Office Action for corresponding CN Application No. 202380090240.2, Oct. 31, 2025 (w/ machine translation).

International Search Report for corresponding International Application No. PCT/JP2023/033488, Nov. 21, 2023.

Japanese Office Action for corresponding JP Application No. 2023-577278, Jan. 22, 2024 (w/ English machine translation).

* cited by examiner 1A,1
7
78
792
791
77a
76a
8
13
AS
12
77b
75a
AS1,AS2
76b
75b
74b
AR1
22
11b
6
3
72
10
11a
36b,36
4
5
74a
66
31c,31
20,2
DR2
71
24
31a,31
3
DR1
4f
T
AX1
HD 7
75a
74a
74b
76a
C2
13a,13
77a
75b
78
76b
C2
13b,13
77b
75c
76c
791
792
74c
68
13c,13
77c
6
67
63
13e,13
C2
C1
84
82
8
88
80
C1
62
12
91
C3
C
AT,AS
9
13d,13
96

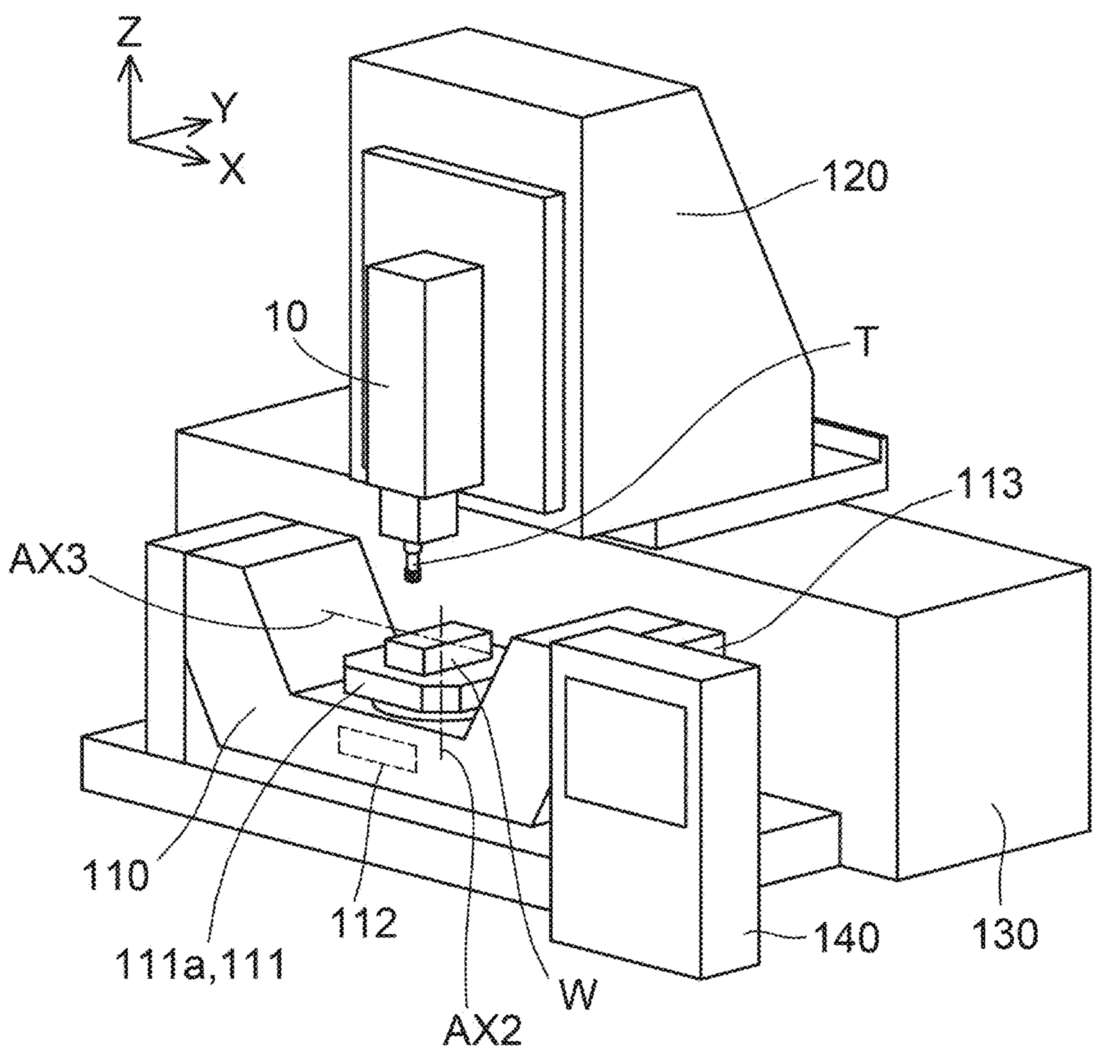
100
Z
Y
X
120
10
T
113
AX3
110
111a,111
112
AX2
W
140
130

SPINDLE LUBRICATOR OF MACHINE TOOL, MACHINE TOOL, AND USE METHOD OF MACHINE TOOL

CROSS-REFERENCE TO RELATED APPLICATIONS

The present disclosure is a continuation application of International Application No. PCT/JP2023/033488, filed Sep. 14, 2023. The contents of this application are incorporated herein by reference in their entirety.

BACKGROUND

Technical Field

The present disclosure relates to a spindle lubricator of a machine tool, a machine tool, and a use method of a machine tool.

Discussion of the Background

A lubricator of a spindle of a machine tool is known.

As a related art, JP 2016-002622 A discloses a spindle lubricator. In the spindle lubricator described in JP 2016-002622 A, a rotation shaft is rotatably supported by a housing via a bearing, and in addition, the bearing is lubricated by lubrication oil supplied from the outside. Further, in the spindle lubricator described in JP 2016-002622 A, drain oil is sucked by negative pressure by a negative pressure generator, or the drain oil is naturally dropped and collected.

SUMMARY

According to one aspect of the present disclosure, a spindle lubricator of a machine tool includes a rotation body configured to hold a tool; a plurality of bearings including a first bearing and a second bearing; a housing that supports the rotation body to be rotatable about a first axis via the plurality of bearings; a fluid mixture supplier configured to supply a fluid mixture containing oil and air to the plurality of bearings; and a collector configured to collect an oil-containing fluid containing the oil. The collector includes a plurality of collection flow channels that are disposed in the housing to collect the oil-containing fluid from the plurality of bearings, a plurality of ejectors disposed outside the housing, and a plurality of flow control valves. The plurality of collection flow channels include a first collection flow channel that is configured to collect a first oil-containing fluid from at least one bearing including the first bearing; and a second collection flow channel that is configured to collect a second oil-containing fluid from at least one bearing including the second bearing. The plurality of ejectors include a first ejector that is configured to generate negative pressure due to first air supplied from a first air flow channel and that is configured to suck the first oil-containing fluid from the first collection flow channel; and a second ejector that is configured to generate negative pressure due to second air supplied from a second air flow channel and that is configured to suck the second oil-containing fluid from the second collection flow channel. The plurality of flow control valves include a first flow control valve that is configured to adjust a flow rate of the first air supplied to the first ejector from the first air flow channel, and a second flow control valve that is configured to adjust a flow rate of the second air supplied to the second ejector from the second air flow channel.

According to another aspect of the present disclosure, a machine tool includes a machining head including a plurality of bearings having a first bearing and a second bearing; a fluid mixture supplier configured to supply a fluid mixture containing oil and air to the plurality of bearings; a collector configured to collect an oil-containing fluid containing the oil; a workpiece holder configured to support a workpiece; a mover configured to move the machining head relative to the workpiece holder; and control circuitry. The machining head includes a rotation body configured to hold a tool; a housing that supports the rotation body to be rotatable about a first axis via the plurality of bearings; and a first rotational driver configured to rotate the rotation body about the first axis. The control circuitry is configured to control at least the first rotational driver, the fluid mixture supplier, and the mover. The collector includes a plurality of collection flow channels that are disposed in the housing to collect the oil-containing fluid from the plurality of bearings, a plurality of ejectors disposed outside the housing, and a plurality of flow control valves. The plurality of collection flow channels include a first collection flow channel that is configured to collect a first oil-containing fluid from at least one bearing including the first bearing, and a second collection flow channel that is configured to collect a second oil-containing fluid from at least one bearing including the second bearing. The plurality of ejectors include a first ejector that is configured to generate negative pressure due to first air supplied from a first air flow channel and that is configured to suck the first oil-containing fluid from the first collection flow channel, and a second ejector that is configured to generate negative pressure due to second air supplied from a second air flow channel and that is configured to suck the second oil-containing fluid from the second collection flow channel. The plurality of flow control valves include a first flow control valve that is configured to adjust a flow rate of the first air supplied to the first ejector from the first air flow channel, and a second flow control valve that is configured to adjust a flow rate of the second air supplied to the second ejector from the second air flow channel.

According to the other aspect of the present disclosure, a use method of the above-described machine tool includes deriving a first discharge flow rate that is defined as a flow rate of the first oil-containing fluid discharged to an outside of the first collection flow channel from the first collection flow channel under a second condition in which the plurality of pipe lines are in fluid separation from the plurality of collection flow channels and in which the fluid mixture is supplied to the plurality of bearings from the fluid mixture supplier at a first flow rate; deriving a second discharge flow rate that is defined as a flow rate of the second oil-containing fluid discharged to an outside of the second collection flow channel from the second collection flow channel under the second condition; deriving a first collection flow rate that is defined as a flow rate of the first oil-containing fluid flowing through the first pipe line under a first condition in which the plurality of pipe lines are respectively in fluid connection with the plurality of collection flow channels and in which the fluid mixture is supplied to the plurality of bearings from the fluid mixture supplier at the first flow rate; deriving a second collection flow rate that is defined as a flow rate of the second oil-containing fluid flowing through the second pipe line under the first condition; deriving a first valve aperture of the first flow control valve such that a ratio of the first collection flow rate to the first discharge flow rate is within a predetermined range; deriving a second valve aperture of the second flow control valve such that a ratio of the second collection flow rate to the second discharge flow rate is within a predetermined range; supplying the fluid mixture to the plurality of bearings using the fluid mixture supplier; operating the collector in a state in which a valve aperture of the first flow control valve is set to the first valve aperture and a valve aperture of the second flow control valve is set to the second valve aperture; and rotating the tool about the first axis to machine the workpiece.

According to the other aspect of the present disclosure, a spindle lubricator of a machine tool includes a rotation body configured to hold a tool; a front bearing; a rear bearing; a housing that supports the rotation body to be rotatable about a first axis via the front bearing and the rear bearing; a fluid mixture supplier configured to supply a fluid mixture containing oil and air to the front bearing and the rear bearing; and a collector configured to collect an oil-containing fluid containing the oil. The collector includes a first collection flow channel that is provided in the housing and through which a first oil-containing fluid flows from the front bearing; a second collection flow channel that is provided in the housing and through which a second oil-containing fluid flows from the rear bearing; a first ejector connected to the first collection flow channel and configured to generate negative pressure due to first air supplied from a first air flow channel so as to suck the first oil-containing fluid through the first collection flow channel; a second ejector connected to the second collection flow channel and configured to generate negative pressure due to second air supplied from a second air flow channel so as to suck the second oil-containing fluid through the second collection flow channel; a first flow control valve provided in the first air flow channel to adjust a flow rate of the first air supplied to the first ejector; and a second flow control valve provided in the second air flow channel to adjust a flow rate of the second air supplied to the second ejector.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 27 is a schematic perspective view of an example of the machine tool according to a third embodiment, schematically illustrating the example of the machine tool;

DESCRIPTION OF THE EMBODIMENTS

Figure 1:
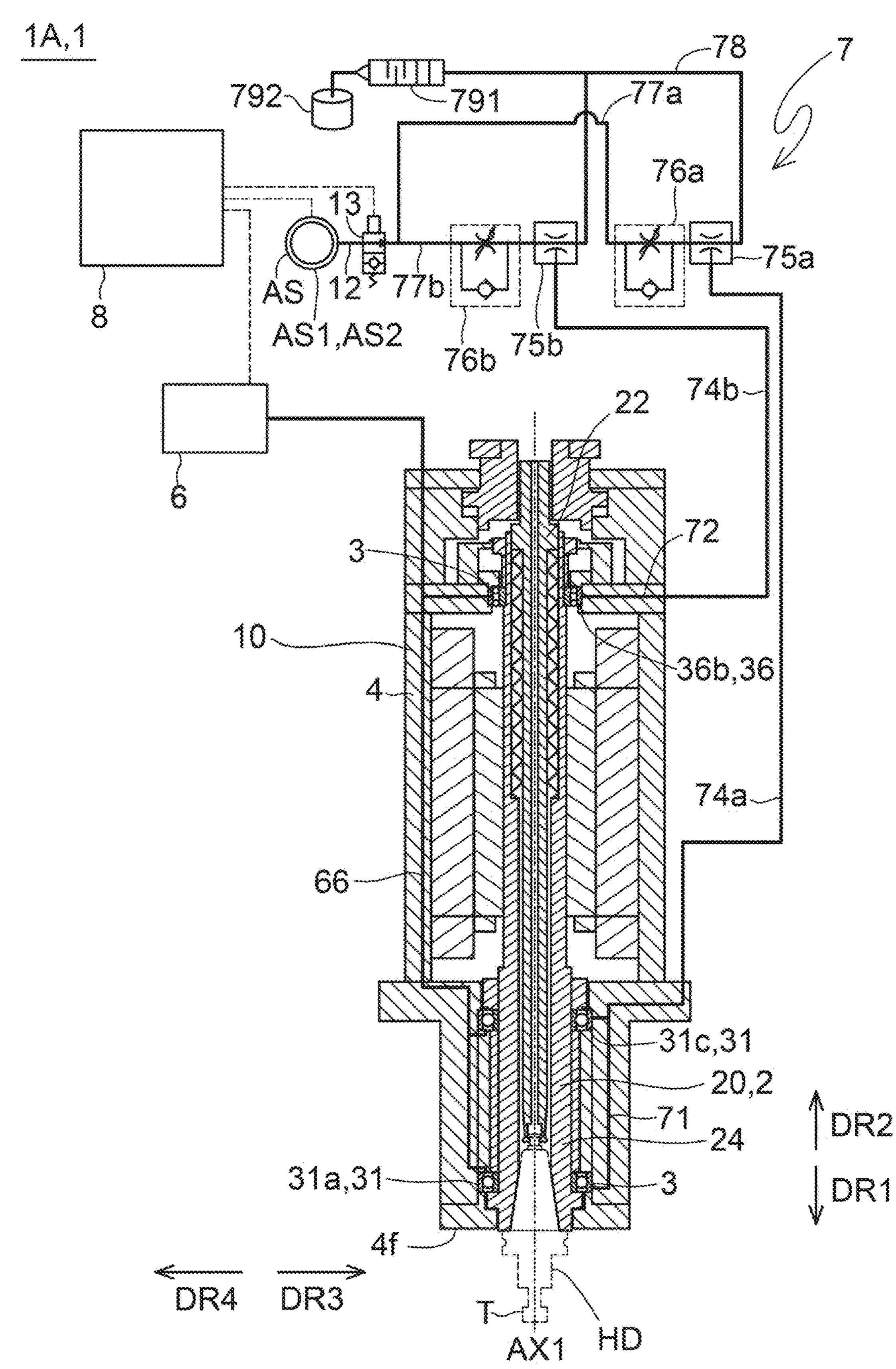
FIG. 1 is a schematic cross-sectional view of a spindle lubricator of a machine tool according to a first embodiment, schematically illustrating the spindle lubricator.

Hereinafter, a spindle lubricator 1 of a machine tool, a machine tool 100, and a use method of the machine tool according to embodiments will be described with reference to the drawings. It is to be noted that in the following description of embodiments, portions and members having the same functions are denoted by the same reference numerals, and repeated descriptions of the portions and members denoted by the same reference numerals will be omitted.

Definition of Direction

Herein, a "first direction DR1" is defined as a direction from a rear end portion 22 of a rotation body 2 toward a tip end portion 24 of the rotation body 2, and a "second direction DR2" is defined as a direction opposite to the first direction DR1.

Herein, a "radially inward direction DR3" or an "inward direction" is defined as a direction approaching a first axis AX1, which is the axis of rotation of the rotation body 2. A "radially outward direction DR4" or an "outward direction" is defined as a direction away from the first axis AX1, which is the axis of rotation of the rotation body 2.

A direction from the rear end portion 22 of the rotation body 2 toward the tip end portion 24 of the rotation body 2 is, for example, a downward direction or a lateral direction. In a case where the attitude of a machining head 10 is changeable, the direction from the rear end portion 22 of the rotation body 2 toward the tip end portion 24 of the rotation body 2 changes in accordance with a change of the attitude of the machining head 10. Herein, regardless of the actual attitude of the machining head 10, a direction from the rear end portion 22 of the rotation body 2 toward the tip end portion 24 of the rotation body will be referred to as a "downward direction", and a direction from the tip end portion 24 of the rotation body 2 toward the rear end portion 22 of the rotation body will be referred to as an "upward direction". In addition, herein, regardless of the actual attitude of the machining head 10, a surface at one end of the machining head 10 in the first direction DR1 will be referred to as a "lower surface", and a surface at one end of the machining head 10 in the second direction DR2 will be referred to as an "upper surface".

First Embodiment

Figure 2:
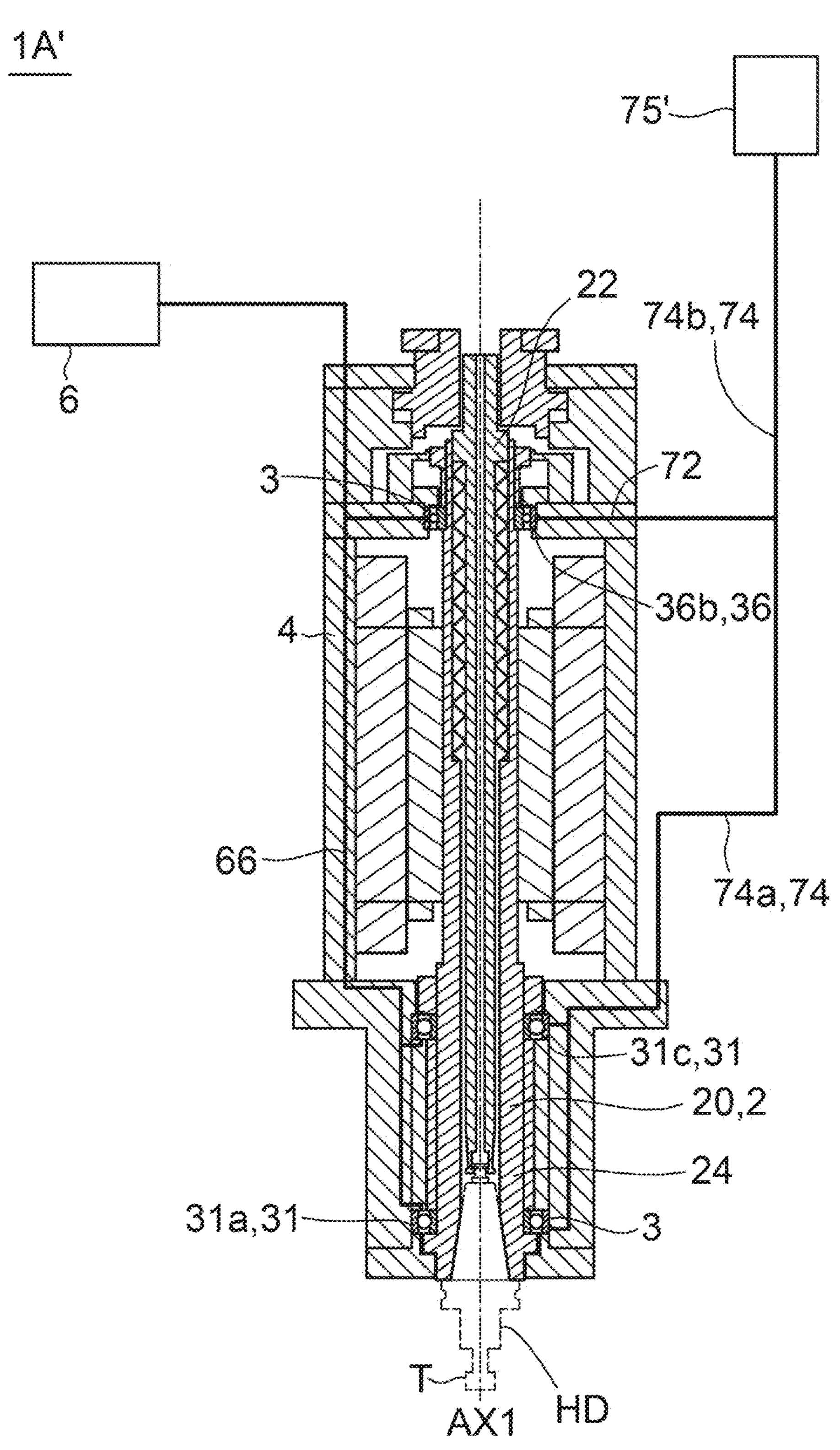
FIG. 2 is a schematic cross-sectional view of a spindle lubricator of a machine tool according to a comparative example, schematically illustrating the spindle lubricator.
Figure 3:
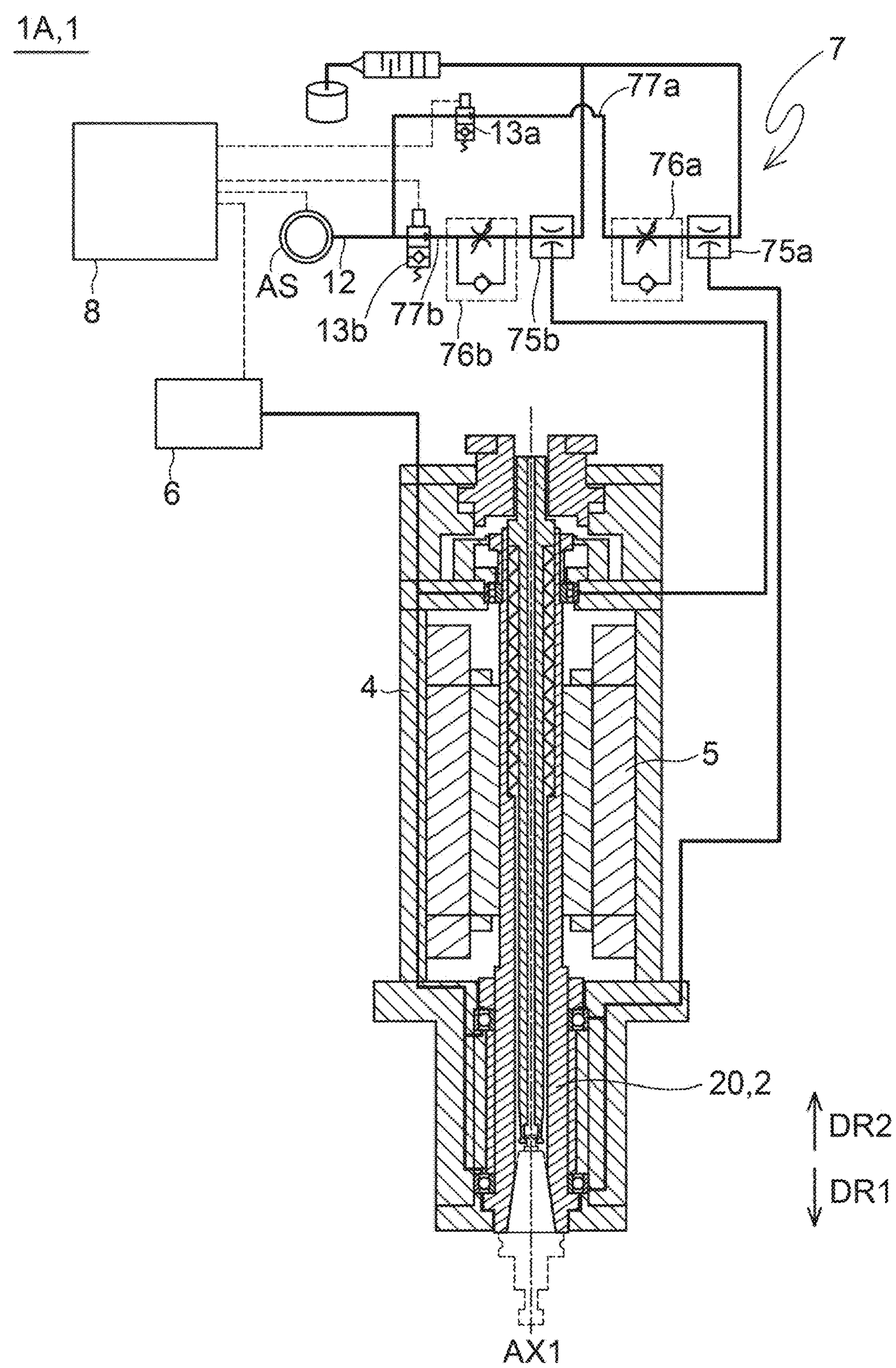
FIG. 3 is a schematic cross-sectional view of a spindle lubricator of a machine tool according to a first modification of the first embodiment, schematically illustrating the spindle lubricator.
Figure 4:
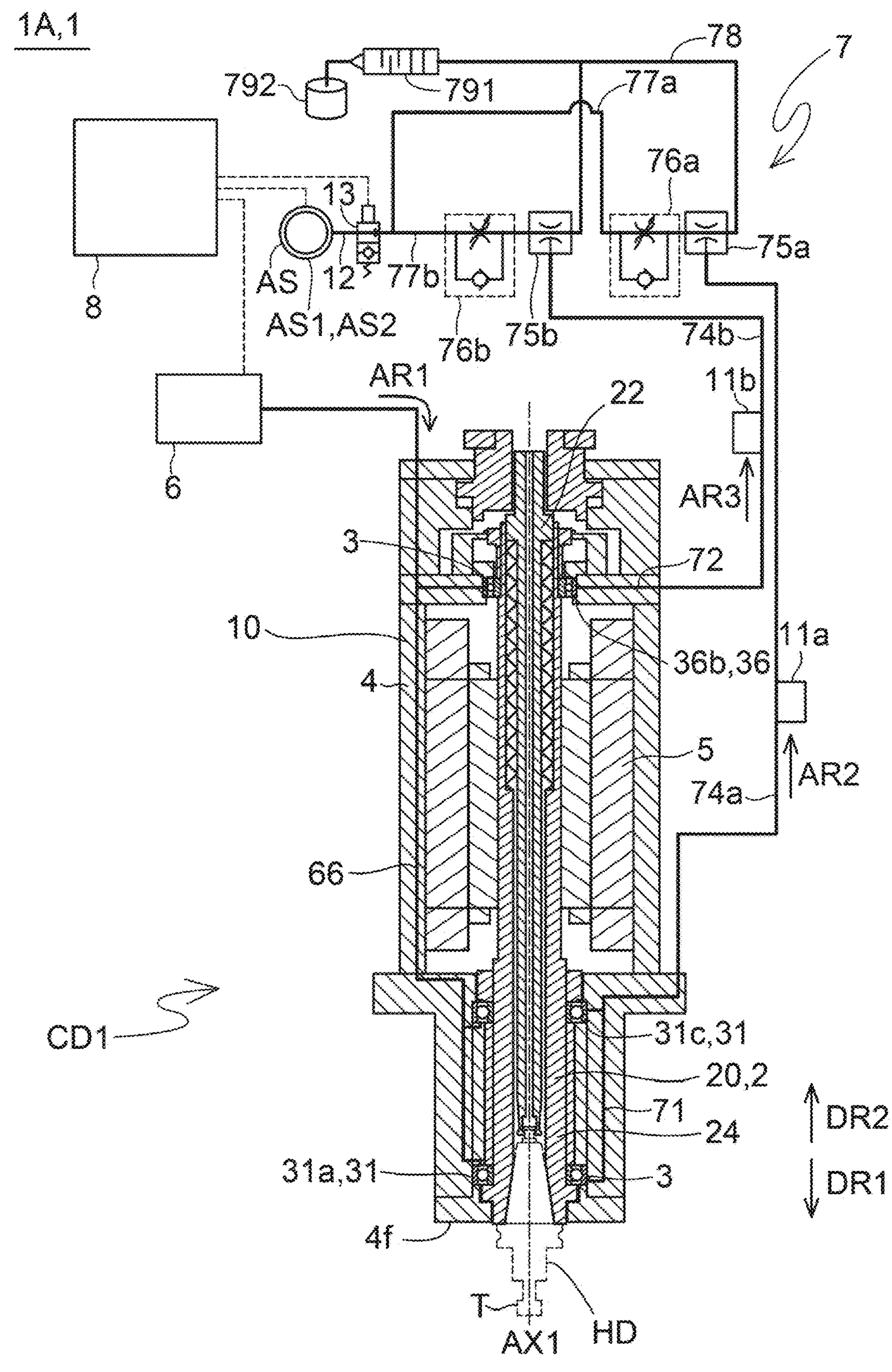
FIG. 4 is a schematic illustration of a state in which a first collection flow rate and a second collection flow rate are measured.
Figure 5:
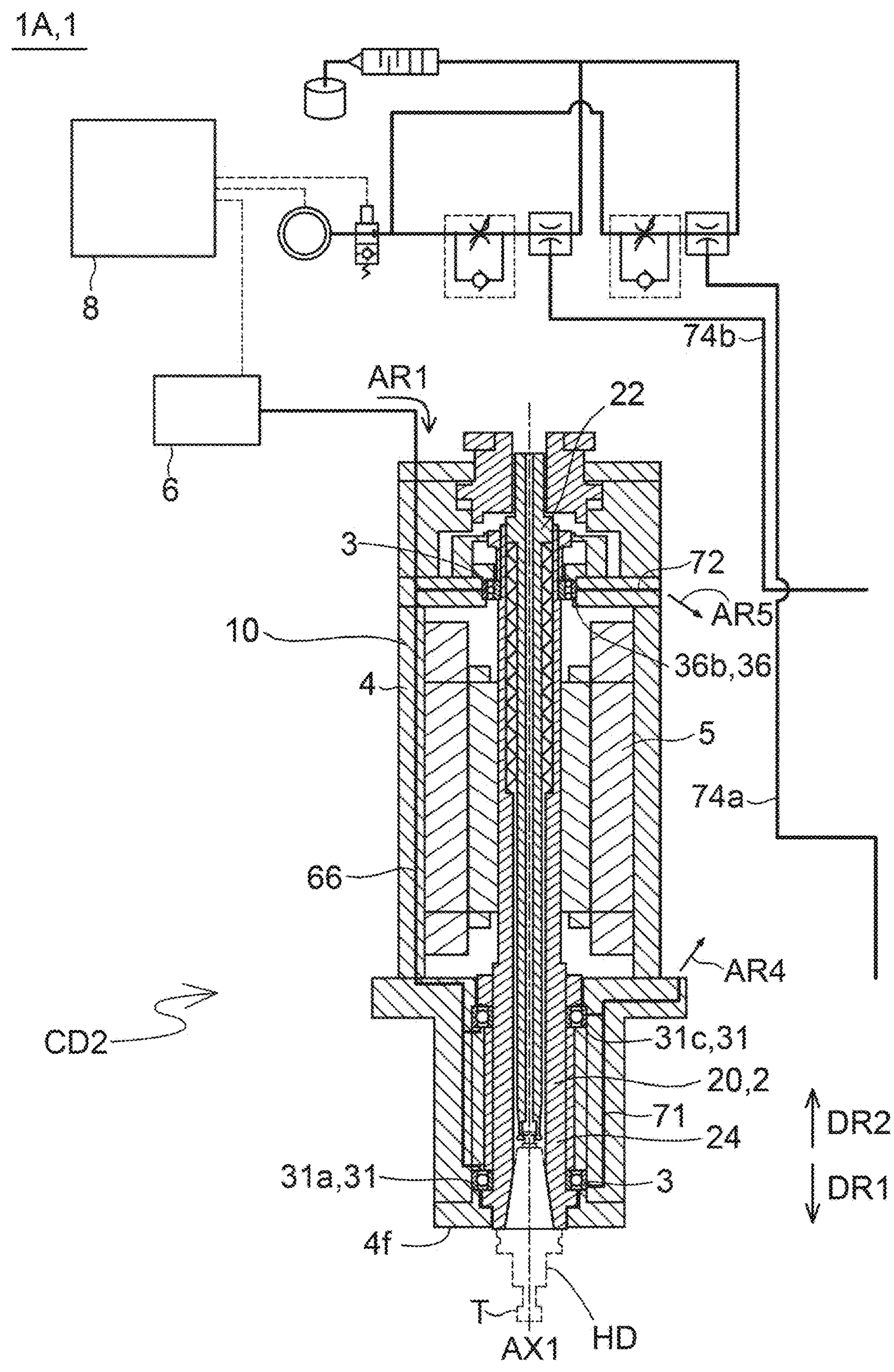
FIG. 5 is a schematic illustration of a state in which an oil-containing fluid is discharged from a first collection flow channel and a second collection flow channel to the outside of a housing.
Figure 6:
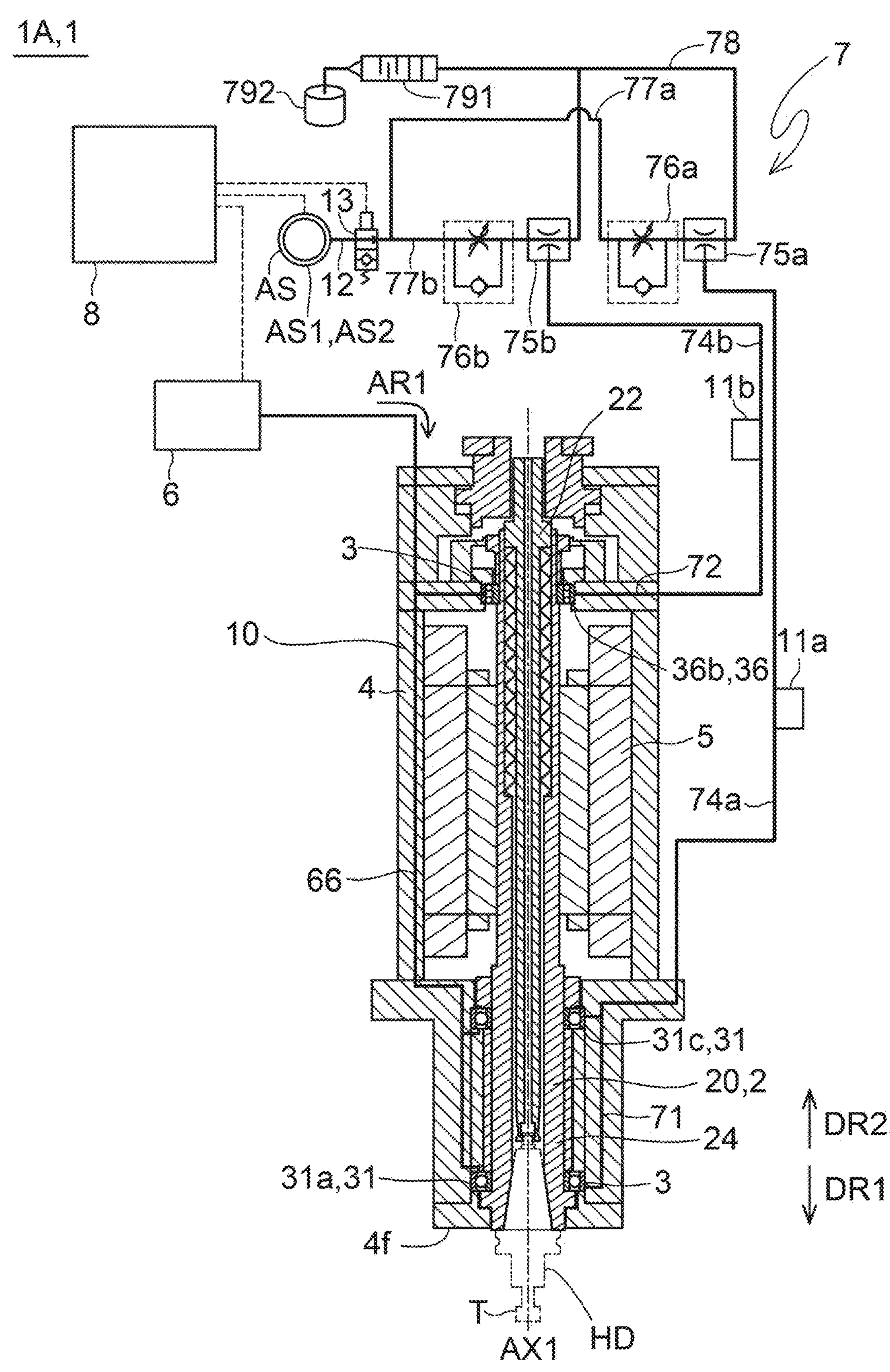
FIG. 6 is a schematic cross-sectional view of the spindle lubricator of the machine tool according to the first embodiment, schematically illustrating the spindle lubricator.

A spindle lubricator 1A of the machine tool according to the first embodiment will be described with reference to FIGS. 1 to 6. FIG. 1 is a schematic cross-sectional view of the spindle lubricator 1A of the machine tool according to the first embodiment, schematically illustrating the spindle lubricator. FIG. 2 is a schematic cross-sectional view of a spindle lubricator 1A' of a machine tool according to a comparative example, schematically illustrating the spindle lubricator. FIG. 3 is a schematic cross-sectional view of the spindle lubricator 1A of a machine tool according to a first modification of the first embodiment, schematically illustrating the spindle lubricator. FIG. 4 is a schematic illustration of a state in which a first collection flow rate and a second collection flow rate are measured. FIG. 5 is a schematic illustration of a state in which an oil-containing fluid is discharged from a first collection flow channel 71 and a second collection flow channel 72 to the outside of a housing 4. FIG. 6 is a schematic cross-sectional view of the spindle lubricator 1A of the machine tool according to the first embodiment, schematically illustrating the spindle lubricator.

As illustrated in FIG. 1, the spindle lubricator 1A of the machine tool according to the first embodiment includes: a rotation body 2, which holds a tool T; a plurality of bearings 3; a housing 4; a fluid mixture supplier 6; and a collector 7. The spindle lubricator 1A of the machine tool may include a controller (an example of "control circuitry") 8, which controls at least the fluid mixture supplier 6.

In an example illustrated in FIG. 1, the rotation body 2 serves as a rotation shaft 20. The rotation body 2 is rotatable about a first axis AX1. The rotation body 2 (more specifically, the rotation shaft 20) includes a rear end portion 22 and a tip end portion 24, which holds the tool T. It is to be noted that a tool holder HD for holding the tool Tis attached to the tip end portion 24, in some cases. In such cases, the tool T is held by the tip end portion 24 via the tool holder HD. Therefore, herein, the "tip end portion 24, which holds a tool" includes both concepts of the tip end portion 24, which directly holds the tool T, and the tip end portion 24, which holds the tool T via the tool holder HD. In other words, herein, the tip end portion 24 may be configured to directly hold the tool T, or may be configured to hold the tool T via the tool holder HD.

The housing 4 supports the rotation body 2 to be rotatable about the first axis AX1 via the plurality of bearings 3. In the example illustrated in FIG. 1, the housing 4 includes an assembly of a plurality of components.

In the example illustrated in FIG. 1, the spindle lubricator 1A includes a plurality of bearings 3, which include a first bearing 31*a* and a second bearing 36*b*. In the example illustrated in FIG. 1, the first bearing 31*a* is a front bearing 31, which supports the tip end portion 24 of the rotation body 2. The second bearing 36*b* is a rear bearing 36, which supports the rear end portion 22 of the rotation body 2. Alternatively, the second bearing 36*b* may be a bearing that supports a middle portion of the rotation body.

In the example illustrated in FIG. 1, the spindle lubricator 1A of the machine tool includes the front bearing 31, which supports the tip end portion 24 of the rotation body 2, and the rear bearing 36, which supports the rear end portion 22 of the rotation body 2. The front bearing 31 includes at least one bearing including the first bearing 31*a*. The front bearing 31 may include the first bearing 31*a* and a third bearing 31*c*. In the example illustrated in FIG. 1, the rear bearing 36 include at least one bearing including a second bearing 36*b*. The rear bearing 36 may include a plurality of bearings including the second bearing 36*b*.

The fluid mixture supplier 6 supplies a fluid mixture containing oil and air to the plurality of bearings 3. The fluid mixture will be referred to as oil air, in some cases. In the oil air, the oil is carried by the air. In other words, in the oil air, the air functions as a carrier fluid for carrying the oil. More specifically, the oil air is supplied to the plurality of bearings 3, and thus a small amount of oil is continuously supplied to the plurality of bearings 3 by using the flow of the compressed air.

The collector 7 collects an oil-containing fluid, which contains oil. In the example illustrated in FIG. 1, the collector 7 includes: a plurality of collection flow channels (71, 72), which are provided in the housing 4; a plurality of ejectors (75*a*, 75*b*); and a plurality of flow control valves (76*a*, 76*b*), which are provided outside the housing 4. The collector 7 may include a plurality of pipe lines (74*a*, 74*b*), which fluidly connect the plurality of collection flow channels (71, 72) respectively with the plurality of ejectors (75*a*, 75*b*). Alternatively, in a case where the plurality of collection flow channels (71, 72) are respectively connected directly with the plurality of ejectors (75*a*, 75*b*), the plurality of pipe lines (74*a*, 74*b*) are omitted.

The plurality of collection flow channels (71, 72) are provided in the housing 4, and collect the oil-containing fluid from the plurality of bearings 3. In the example illustrated in FIG. 1, the plurality of collection flow channels (71, 72) include a first collection flow channel 71 and a second collection flow channel 72.

The first collection flow channel 71 is provided in the housing 4, and mainly collects the oil-containing fluid discharged from at least one of the bearings mainly including the first bearing 31*a*. Hereinafter, the oil-containing fluid to be collected through the first collection flow channel 71 will be referred to as a "first oil-containing fluid". In the example illustrated in FIG. 1, the first collection flow channel 71 collects the first oil-containing fluid mainly discharged from the front bearing 31. In the example illustrated in FIG. 1, the entirety or most of the first collection flow channel 71 is disposed inside the housing 4. The entirety or most of the first collection flow channel 71 may be made up of a through hole formed in the housing 4.

The second collection flow channel 72 is provided in the housing 4, and collects the oil-containing fluid discharged from at least one of the bearings mainly including the second bearing 36*b*. Hereinafter, the oil-containing fluid to be collected through the second collection flow channel 72 will be referred to as a "second oil-containing fluid". In the example illustrated in FIG. 1, the second collection flow channel 72 collects the second oil-containing fluid mainly discharged from the rear bearing 36. In the example illustrated in FIG. 1, the entirety or most of the second collection flow channel 72 is disposed inside the housing 4. The entirety or most of the second collection flow channel 72 may be made up of a through hole formed in the housing 4. In the example illustrated in FIG. 1, the second collection flow channel 72 is a flow channel different from the first collection flow channel 71.

In the example illustrated in FIG. 1, the plurality of pipe lines (74*a*, 74*b*) include a first pipe line 74*a* and a second pipe line 74*b*.

The first pipe line 74*a* fluidly connects the first collection flow channel 71 with a first ejector 75*a*, which is disposed outside the housing 4. In the example illustrated in FIG. 1, the entirety of the first pipe line 74*a* is disposed outside the housing 4. Alternatively, the first pipe line 74*a* may be partially disposed inside the housing 4, and most of the first pipe line 74*a* may be disposed outside the housing 4. In the example illustrated in FIG. 1, the first ejector 75*a* is an ejector provided to correspond to the first collection flow channel 71 on a one-to-one basis through the first pipe line 74*a*.

The second pipe line 74*b* fluidly connects the second collection flow channel 72 with a second ejector 75*b*, which is disposed outside the housing 4. In the example illustrated in FIG. 1, the entirety of the second pipe line 74*b* is disposed outside the housing 4. Alternatively, the second pipe line 74*b* may be partially disposed inside the housing 4, and most of the second pipe line 74*b* may be disposed outside the housing 4. In the example illustrated in FIG. 1, the second ejector 75*b* is an ejector provided to correspond to the second collection flow channel 72 on a one-to-one basis through the second pipe line 74*b*.

The plurality of ejectors (75*a*, 75*b*) are disposed outside the housing. In the example illustrated in FIG. 1, the plurality of ejectors (75*a*, 75*b*) include a first ejector 75*a* and a second ejector 75*b*.

By generating negative pressure with air supplied from the first air flow channel 77*a*, the first ejector 75*a* sucks the first oil-containing fluid from the first collection flow channel 71. Hereinafter, the air supplied from the first air flow channel 77*a* to the first ejector 75*a* will be referred to as "first air". In the example illustrated in FIG. 1, the first ejector 75*a* generates the negative pressure in the first pipe line 74*a* with the first air supplied from the first air flow channel 77*a*, and sucks the first oil-containing fluid from the first collection flow channel 71 through the first pipe line 74*a*.

By generating negative pressure with air supplied from the second air flow channel 77*b*, the second ejector 75*b* sucks the second oil-containing fluid from the second collection flow channel 72. Hereinafter, the air supplied from the second air flow channel 77*b* to the second ejector 75*b* will be referred to as "second air". In the example illustrated in FIG. 1, the second ejector 75*b* generates the negative pressure in the second pipe line 74*b* with the second air supplied from the second air flow channel 77*b*, and sucks the second oil-containing fluid from the second collection flow channels 72 through the second pipe line 74*b*.

In the example illustrated in FIG. 1, the plurality of flow control valves (76*a*, 76*b*) include a first flow control valve 76*a* and a second flow control valve 76*b*. The first flow control valve 76*a* adjusts the flow rate of the first air supplied from the first air flow channel 77*a* to the first ejector 75*a*. The second flow control valve 76*b* adjusts the flow rate of the second air supplied from the second air flow channel 77*b* to the second ejector 75*b*.

In the example illustrated in FIG. 1, the controller 8 transmits a control command to the fluid mixture supplier 6, and the fluid mixture supplier 6, which receives the control command, supplies a fluid mixture containing oil and air to the plurality of bearings 3 (more specifically, oil air). Additionally, the controller 8 may control the collector 7. More specifically, the controller 8 transmits a control command to the collector 7, and the collector 7, which receives the control command, collects the oil-containing fluid containing oil.

In a spindle lubricator 1A' (see FIG. 2) of a machine tool in a comparative example, a plurality of bearings 3 are in fluid connection with one negative pressure generator 75' through a pipe line 74. In an example illustrated in FIG. 2, regarding the flow rate of the oil-containing fluid collected from the plurality of bearings 3, it is not possible to adjust the flow rate of the oil-containing fluid collected from every bearing or every bearing group. Hence, it is difficult to prevent insufficient lubrication in each of the plurality of bearings. For example, in the example illustrated in FIG. 2, it is assumed that the lubrication of the second bearing 36*b* is appropriate and the collection of the oil-containing fluid from the first bearing 31*a* is insufficient. In this case, there is a possibility that the oil might leak from a gap between the housing 4 and the rotation body 2. For this reason, in order to prevent the leakage, it is necessary to increase the suction amount of the negative pressure generator 75'. However, if the suction amount of the negative pressure generator 75' is increased, the collection of the oil-containing fluid from the second bearing 36*b* will be excessive, thereby resulting in insufficient lubrication in the second bearing 36*b*.

In the example illustrated in FIG. 2, it is assumed that the number of bearings included in the front bearing 31 is different from the number of bearings included in the rear bearing 36. Alternatively or additionally, it is assumed that the length of the first pipe line 74*a* and the length of the second pipe line 74*b* are different from each other. In such a case, if equal suction force is exerted in the first pipe line 74*a* and the second pipe line 74*b* to prevent leakage of oil from all the bearings, the insufficient lubrication will more easily occur.

In contrast, the spindle lubricator 1A of the machine tool according to the first embodiment includes: the plurality of ejectors including the first ejector 75*a* and the second ejector 75*b*; and the plurality of flow control valves including the first flow control valve 76*a*, which adjusts the flow rate of the first air supplied to the first ejector 75*a*, and the second flow control valve 76*b*, which adjusts the flow rate of the second air supplied to the second ejector 75*b*.

Therefore, by adjusting each flow rate of the first air and the second air, it becomes possible to adjust the flow rate of the oil-containing fluid to be collected from every bearing or every beating group. As a result, it becomes possible to prevent the insufficient lubrication in each of the plurality of bearings 3.

Further, according to the first embodiment, leakage of the oil to the periphery of the machining head 10 is eliminated or minimized, and contamination of the working environment due to the oil is prevented, or eliminated or minimized. Thus, the working environment is improved, and the load on the environment is also reduced.

Optional and Additional Configurations

Subsequently, optional and additional configurations that are adoptable in the spindle lubricator 1A of the machine tool according to the first embodiment will be described with reference to FIGS. 1 to 6.

Air Source AS

In the example illustrated in FIG. 1, the spindle lubricator 1A of the machine tool includes at least one air source AS (for example, an air compressor). Such at least one air source AS supplies the first air to the first air flow channel 77*a*, and supplies the second air to the second air flow channel 77*b*. In the example illustrated in FIG. 1, an air source AS1, which supplies the first air to the first air flow channel 77*a*, also serves as an air source AS2, which supplies the second air to the second air flow channel 77*b*. Alternatively, the air source AS2, which supplies the second air to the second air flow channel 77*b*, may be an air source different from the air source AS1, which supplies the first air to the first air flow channel 77*a*.

First Air Flow Channel 77*a* and Second Air Flow Channel 77*b*

In the example illustrated in FIG. 1, the collector 7 includes: the first air flow channel 77*a*, which supplies the first air to the first ejector 75*a*; and the second air flow channel 77*b*, which supplies the second air to the second ejector 75*b*. In the example illustrated in FIG. 1, the first flow control valve 76*a* is disposed on the first air flow channel 77*a*, and the second flow control valve 76*b* is disposed on the second air flow channel 77*b*.

Main Air Flow Channel 12

In the example illustrated in FIG. 1, the spindle lubricator 1A of the machine tool includes a main air flow channel 12, which fluidly connects the air source AS with the first air flow channel 77*a* and the second air flow channel 77*b*. In the example illustrated in FIG. 1, the main air flow channel 12 is branched into a plurality of air flow channels including the first air flow channel 77*a* and the second air flow channel 77*b*.

On-Off Valve 13

In the example illustrated in FIG. 1, the spindle lubricator 1A of the machine tool includes an on-off valve 13, which is disposed between the air source AS and the first flow control valve 76*a*. When such an on-off valve 13 is in a closed state, no air is supplied to the first flow control valve 76*a*. In the example illustrated in FIG. 1, the on-off valve 13 is disposed on the main air flow channel 12. In this case, when the on-off valve 13 are in an open state, air is supplied to the first flow control valve 76*a* and the second flow control valve 76*b*, and when the on-off valve 13 are in the closed state, no air is supplied to the first flow control valve 76*a* or the second flow control valve 76*b*.

Alternatively, as illustrated in FIG. 3, the spindle lubricator 1A of the machine tool may include: a first on-off valve 13*a*, which is disposed between the air source AS and the first flow control valve 76*a*; and a second on-off valve 13*b*, which is disposed between the air source AS and the second flow control valve 76*b*. In an example illustrated in FIG. 3, the first on-off valve 13*a* is disposed on the first air flow channel 77*a*, and the second on-off valve 13*b* is disposed on the second air flow channel 77*b*. In this case, when the first on-off valve 13*a* is in the open state, air is supplied to the first flow control valve 76*a*, and when the first on-off valve 13*a* is in the closed state, no air is supplied to the first flow control valve 76*a*. When the second on-off valve 13*b* is in the open state, air is supplied to the second flow control valve 76*b*, and when the second on-off valve 13*b* is in the closed state, no air is supplied to the second flow control valve 76*b*.

Exhaust Pipe Line 78 and Exhaust Cleaner 791

In the example illustrated in FIG. 1, the collector 7 includes an exhaust pipe line 78 and a collection container 792. Additionally, the collector 7 may include an exhaust cleaner 791.

The exhaust pipe line 78 receives exhaust (more specifically, oil-containing fluids) from the plurality of ejectors (75*a*, 75*b*). In the example illustrated in FIG. 1, the exhaust pipe line 78 fluidly connects the plurality of ejectors (75*a*, 75*b*) with the exhaust cleaner 791. The exhaust pipe line 78 is made up of, for example, a plurality of pipes.

The collection container 792 is in fluid connection with the exhaust pipe line 78. In the example illustrated in FIG. 1, the collection container 792 receives liquid-state oil contained in the oil-containing fluid from the exhaust pipe line 78 through the exhaust cleaner 791. Alternatively, the collection container 792 may receive the oil-containing fluid directly from the exhaust pipe line 78 without intervention of the exhaust cleaner 791.

In the example illustrated in FIG. 1, the exhaust cleaner 791 receives oil-containing fluids from the plurality of ejectors (75*a*, 75*b*) through the exhaust pipe line 78. The exhaust cleaner 791 also separates the oil-containing fluid that has been received from the exhaust pipe line 78 into liquid-state oil and air. The liquid-state oil that has been separated from the oil-containing fluid by the exhaust cleaner 791 is stored in the collection container 792.

In the example illustrated in FIG. 1, most of the oil used for lubricating the plurality of bearings 3 is collected in the collection container 792 through the exhaust cleaner 791. This prevents, or eliminates or minimizes contamination in the periphery of the machining head 10 due to the oil. Thus, the working environment is improved, and the load on the environment is reduced.

Second Embodiment

Figure 7:
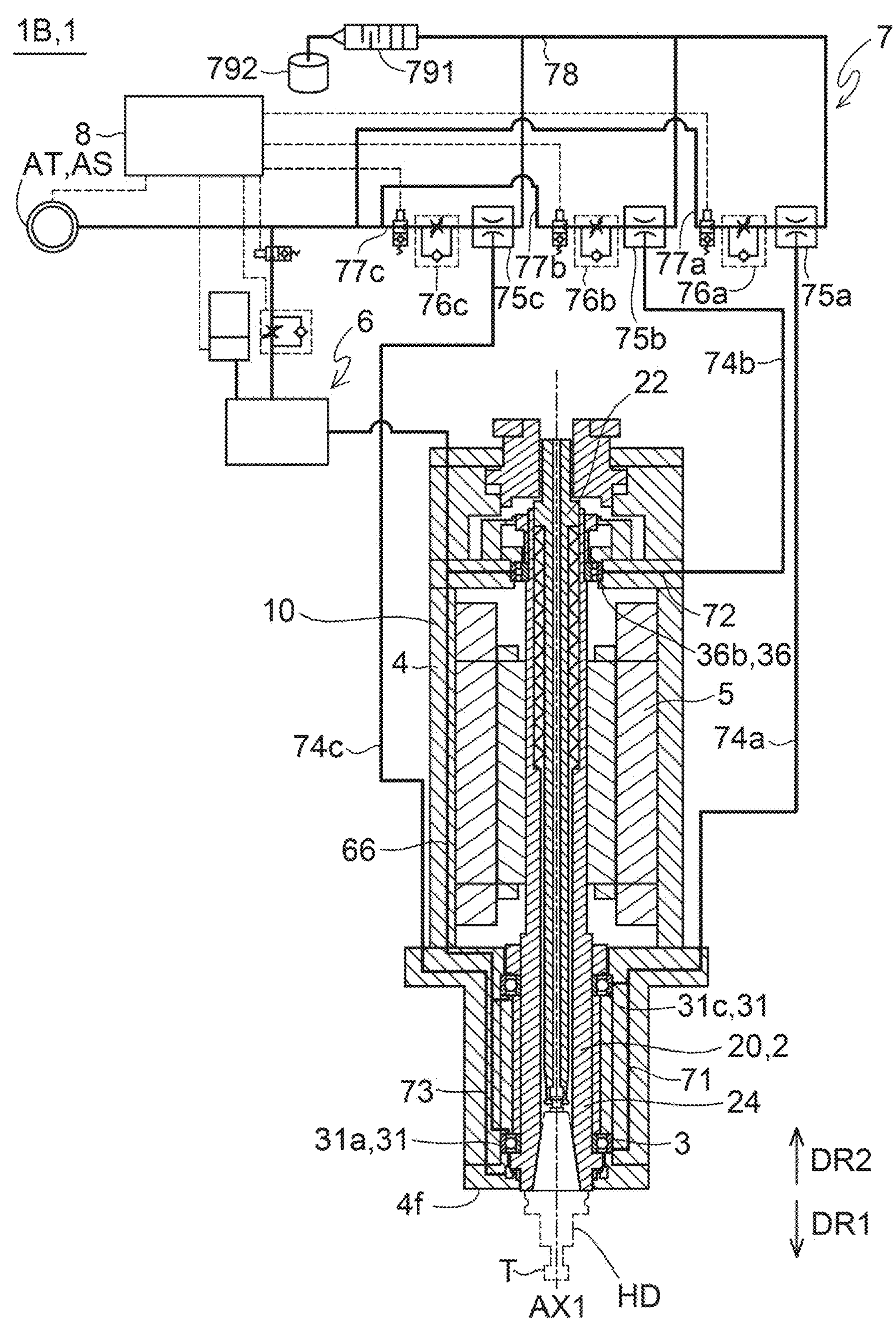
FIG. 7 is a schematic cross-sectional view of a spindle lubricator of a machine tool according to a second embodiment, schematically illustrating the spindle lubricator.
Figure 8:
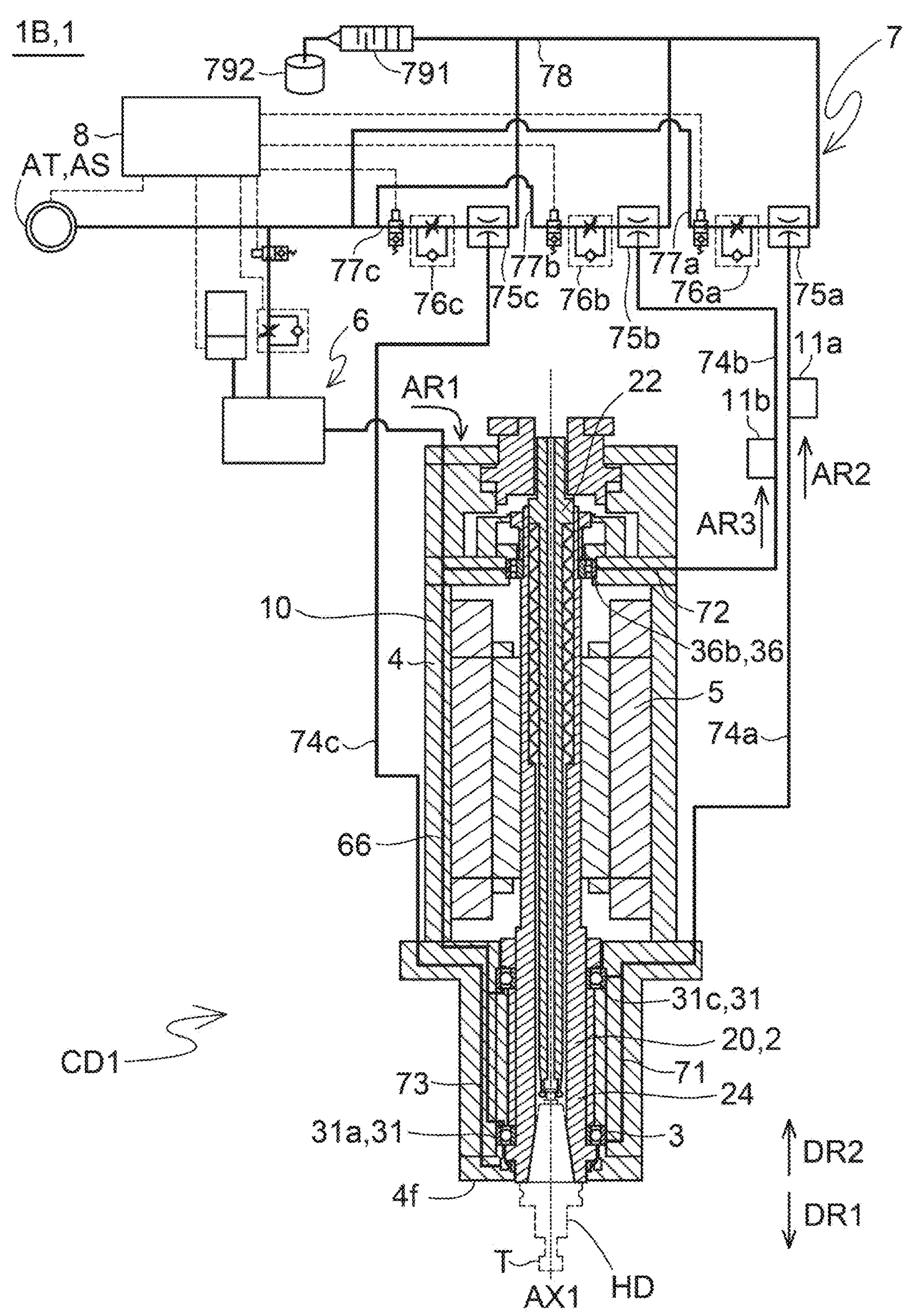
FIG. 8 is a schematic illustration of a state in which a first collection flow rate and a second collection flow rate are measured.
Figure 9:
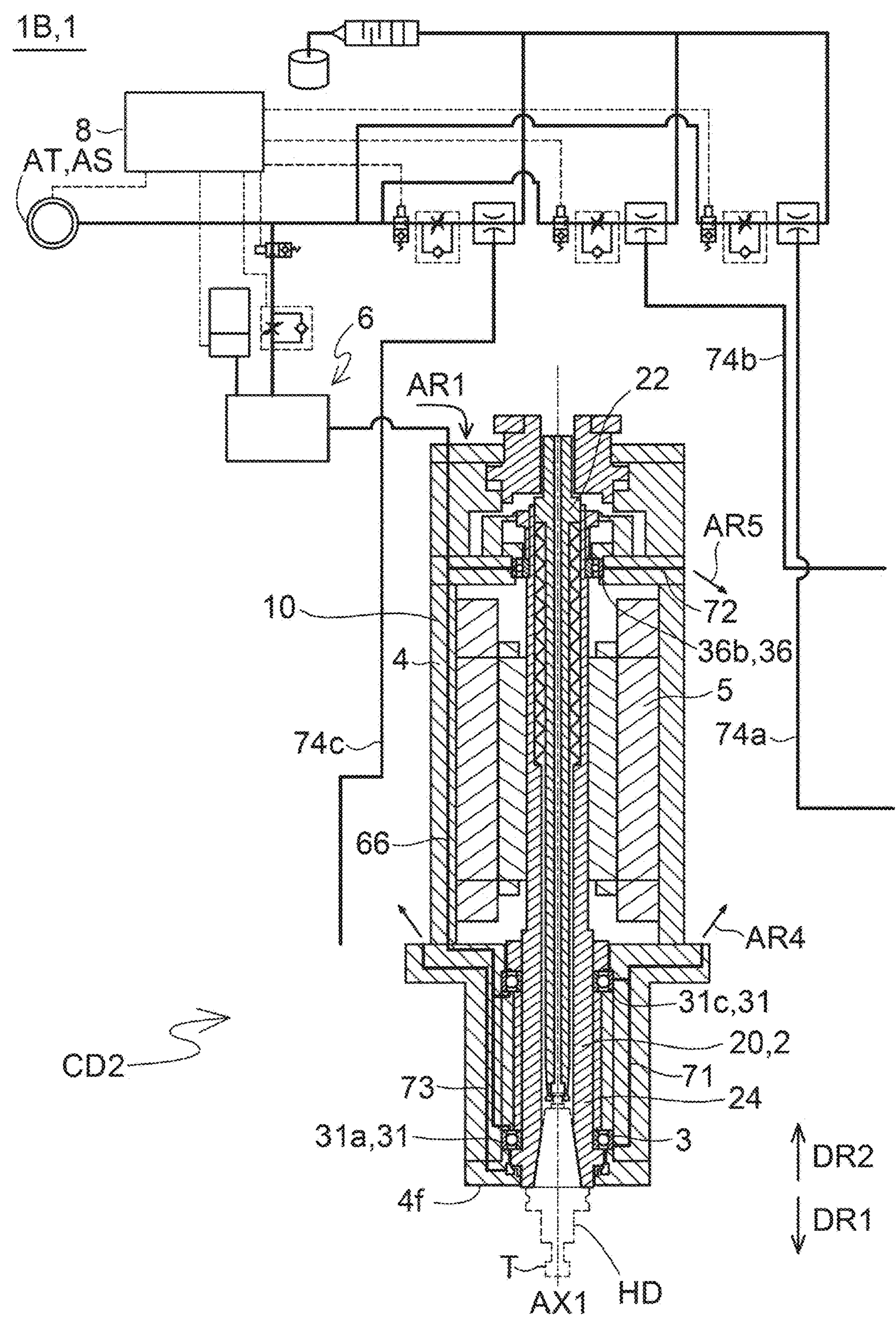
FIG. 9 is a schematic illustration of a state in which an oil-containing fluid is discharged from the first collection flow channel and the second collection flow channel to the outside of a housing.
Figure 10:
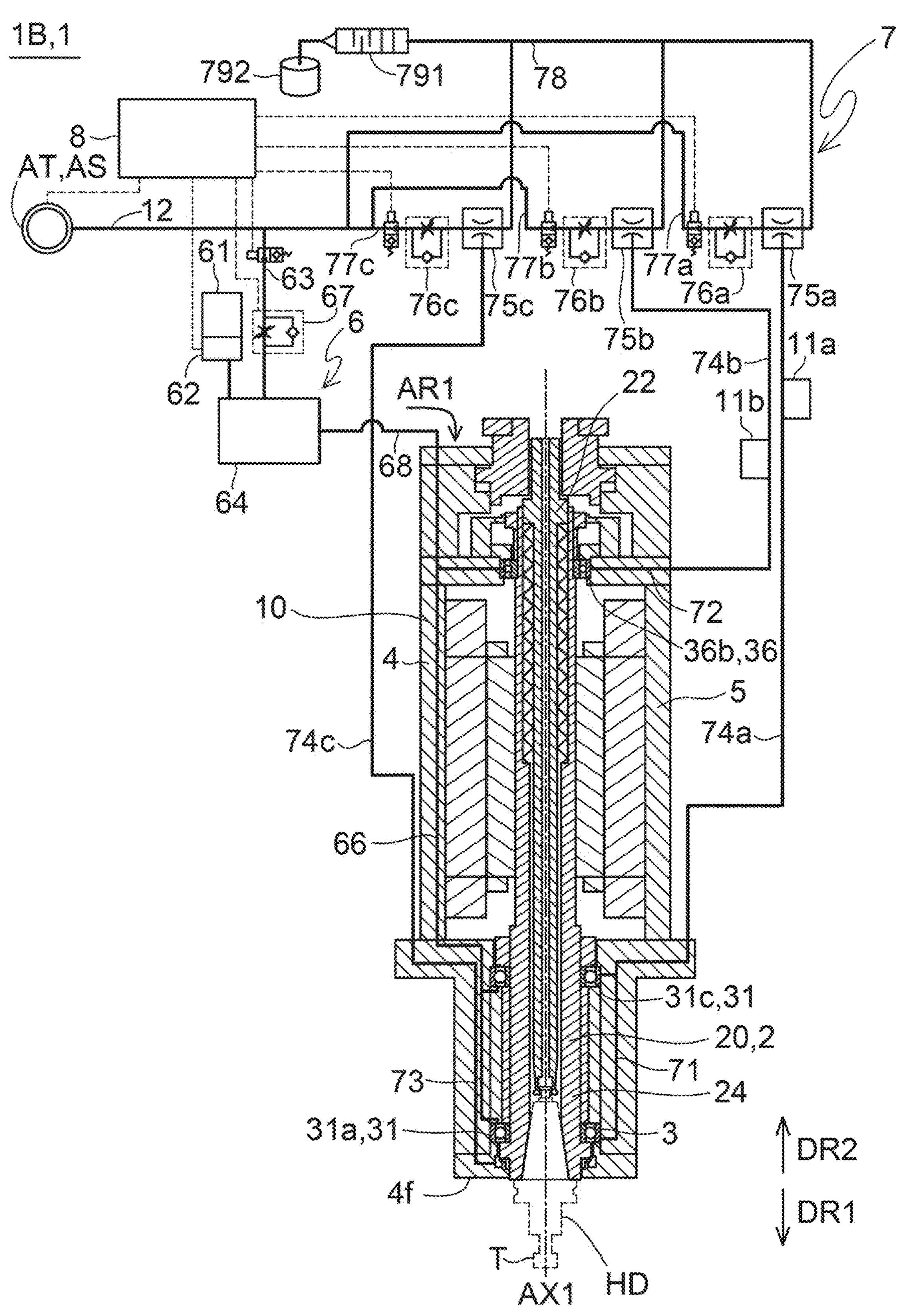
FIG. 10 is a schematic cross-sectional view of the spindle lubricator of the machine tool according to the second embodiment, schematically illustrating the spindle lubricator.
Figure 11:
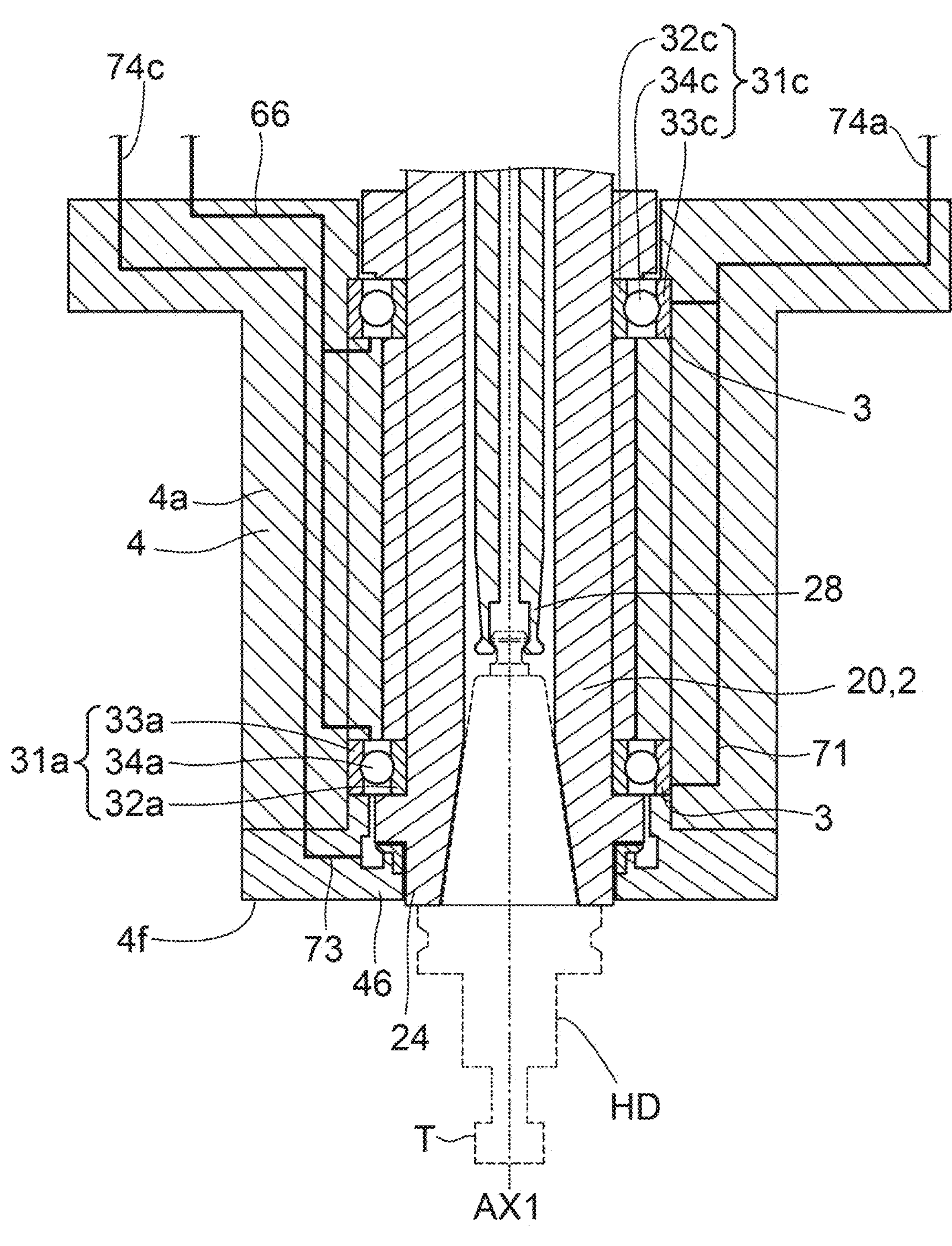
FIG. 11 is a schematic cross-sectional view of a part of the spindle lubricator of the machine tool according to the second embodiment, schematically illustrating the part of the spindle lubricator.
Figure 12:
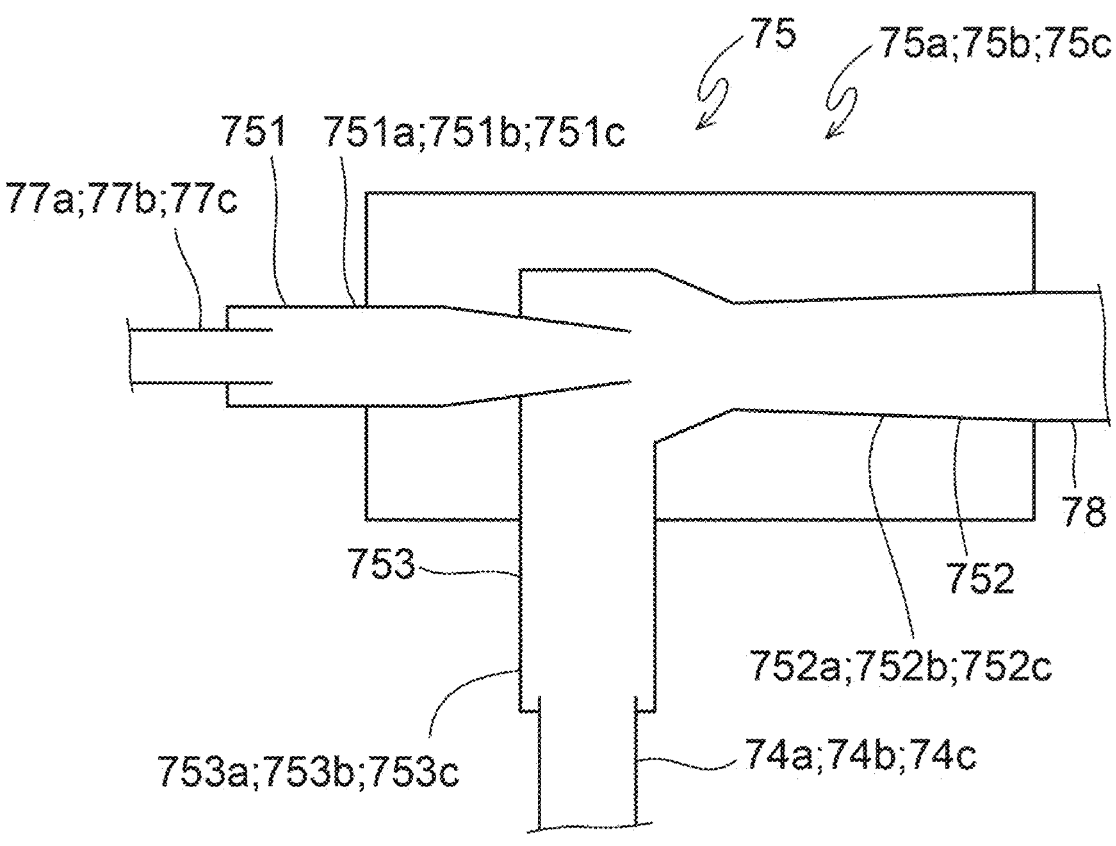
FIG. 12 is a view for describing an example of the structure of an ejector.
Figure 13:
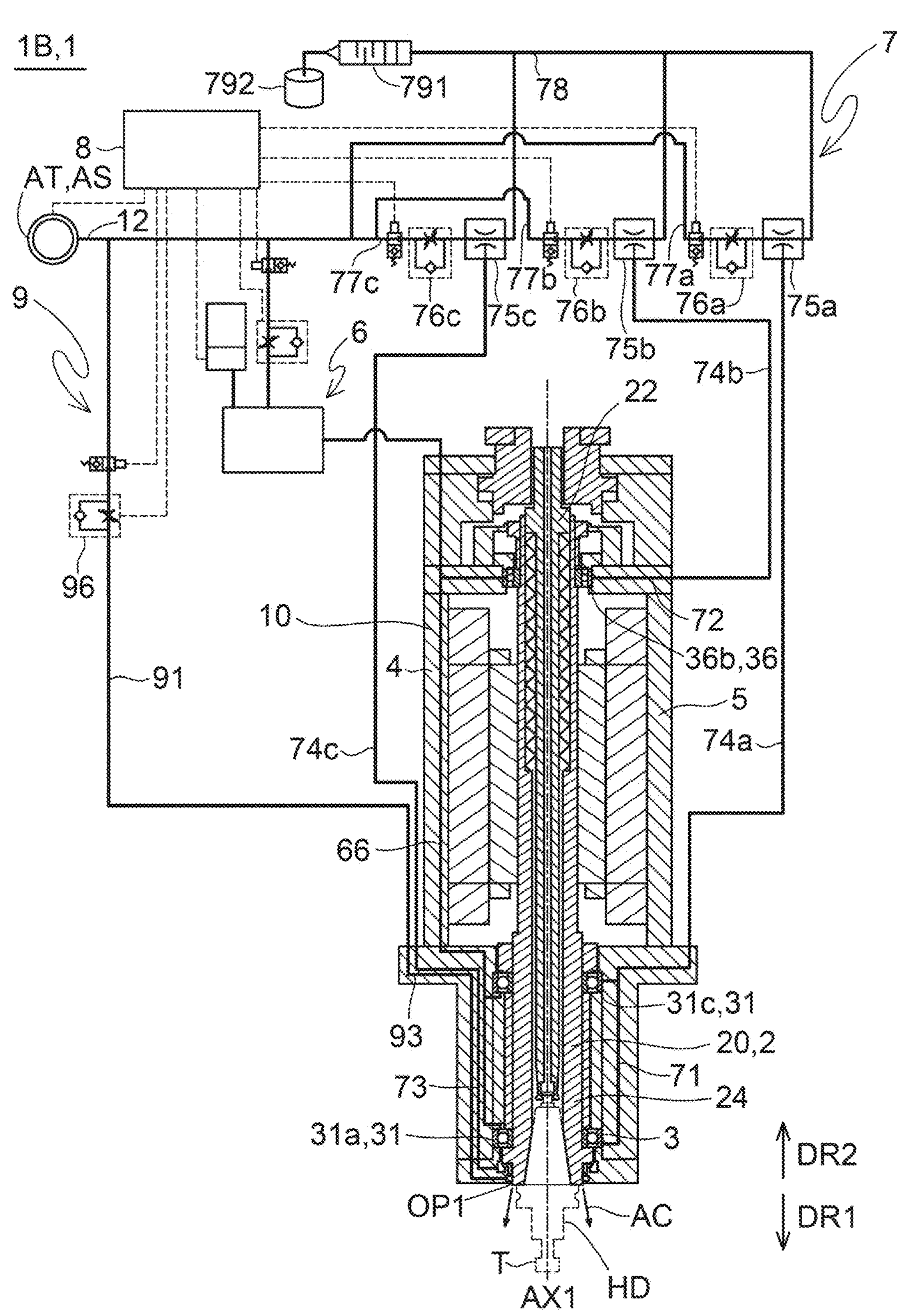
FIG. 13 is a schematic sectional view of a spindle lubricator of a machine tool according to a first modification of the second embodiment, schematically illustrating the spindle lubricator.
Figure 14:
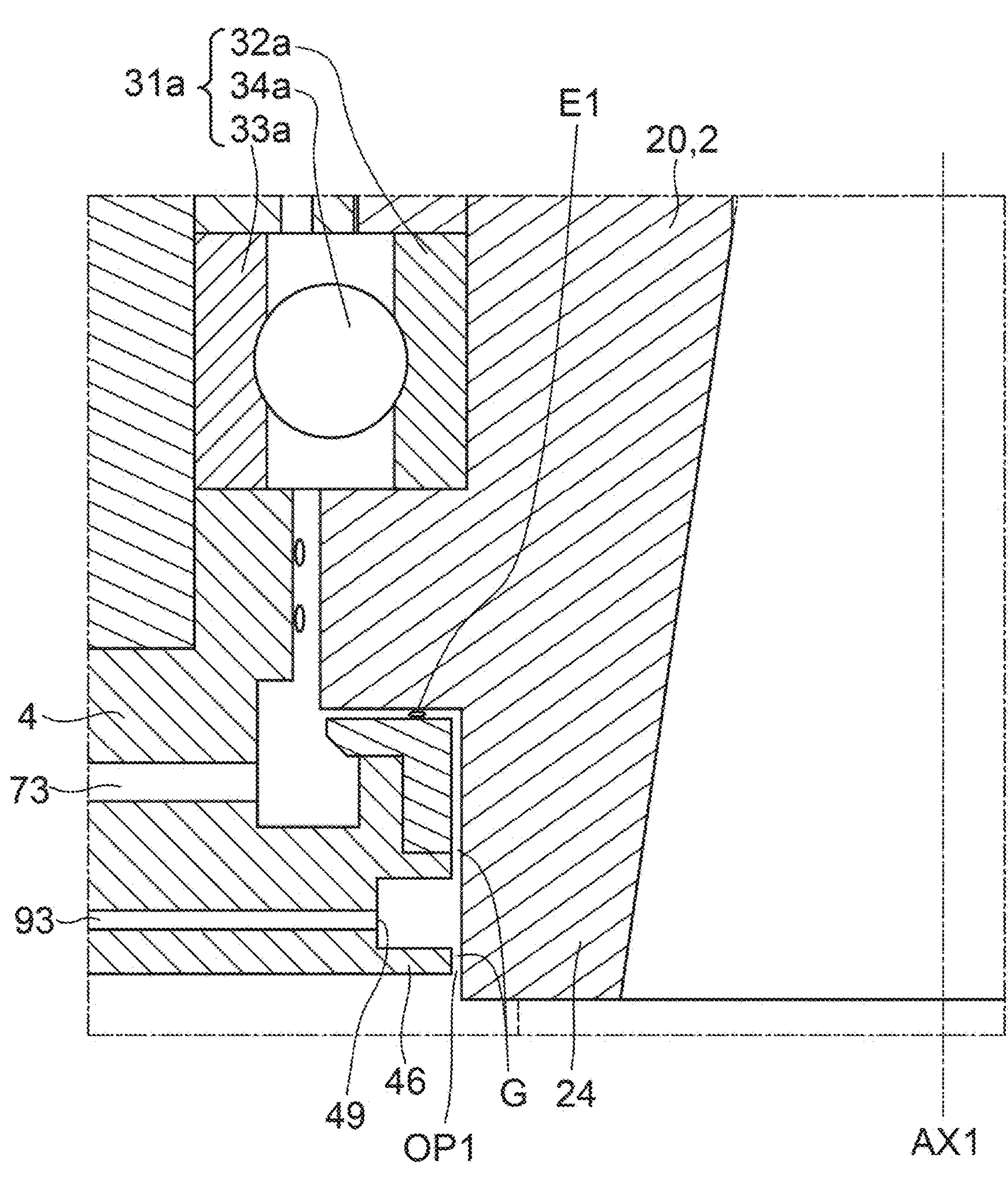
FIG. 14 is a schematic cross-sectional view of a part of the spindle lubricator of the machine tool according to the first modification of the second embodiment, schematically illustrating the part of the spindle lubricator.
Figure 15:
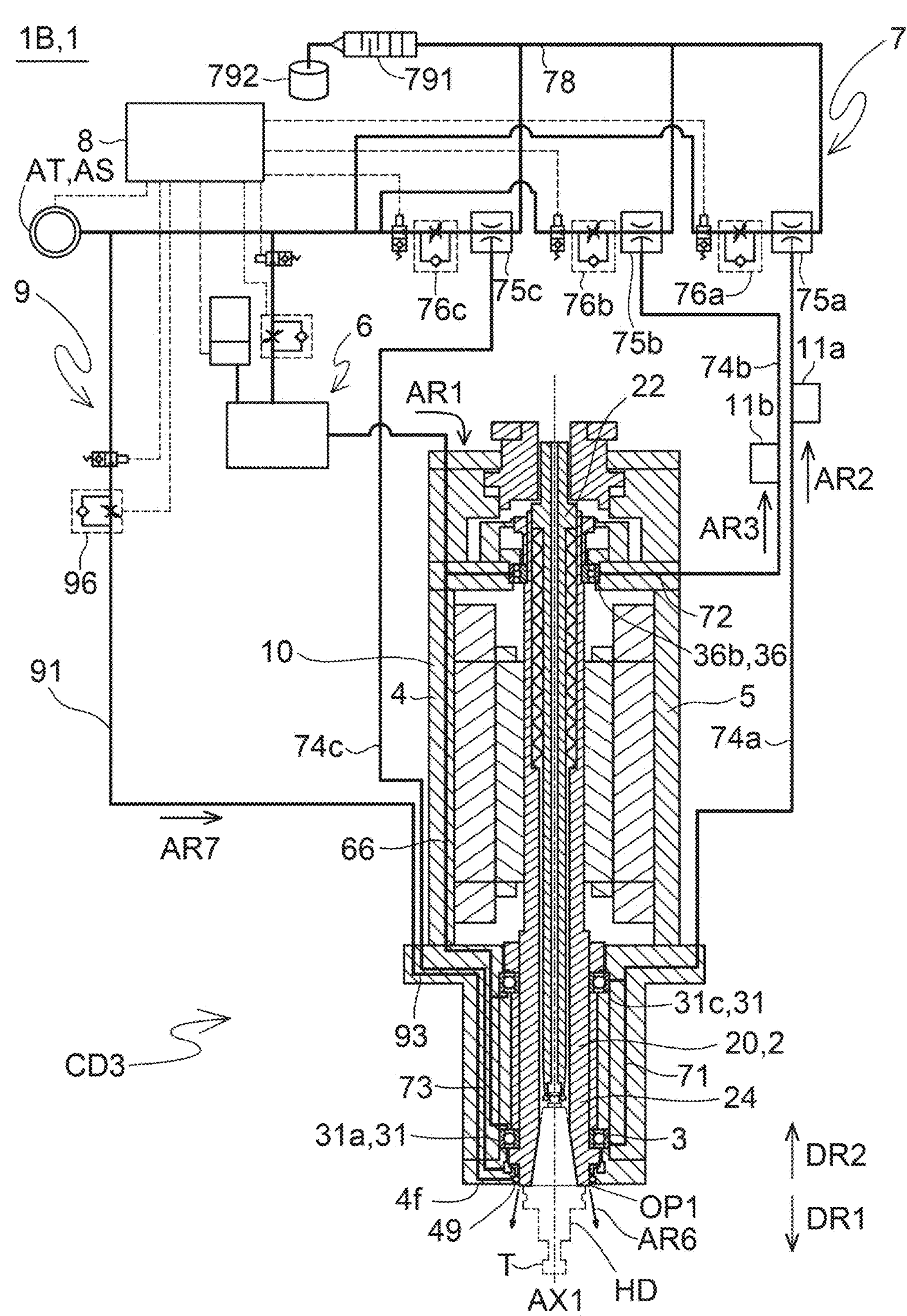
FIG. 15 is a schematic illustration of a state in which the first collection flow rate and the second collection flow rate are measured.
Figure 16:
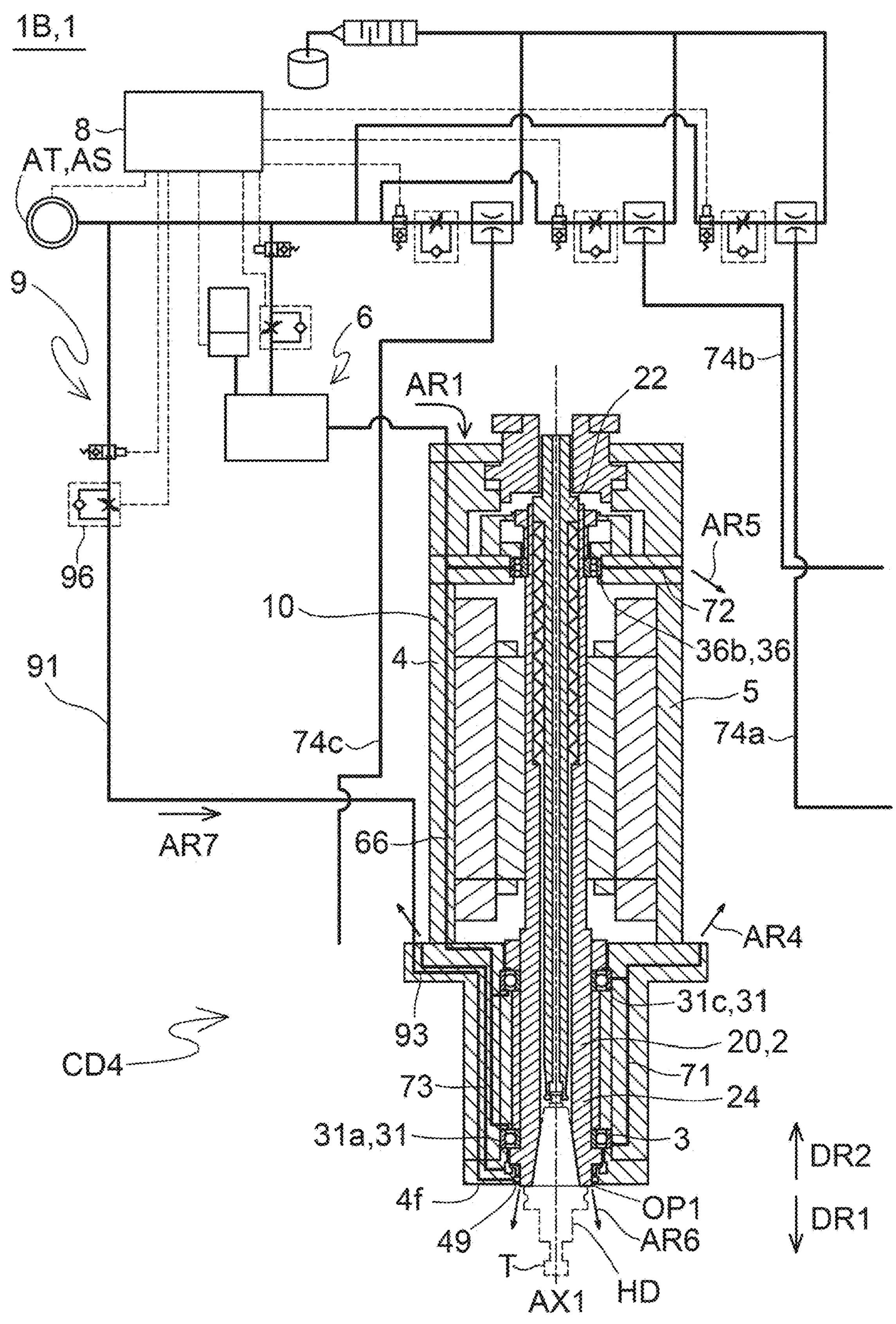
FIG. 16 is a schematic illustration of a state in which the oil-containing fluid is discharged from the first collection flow channel, the second collection flow channel, and a third collection flow channel to the outside of the housing.
Figure 17:
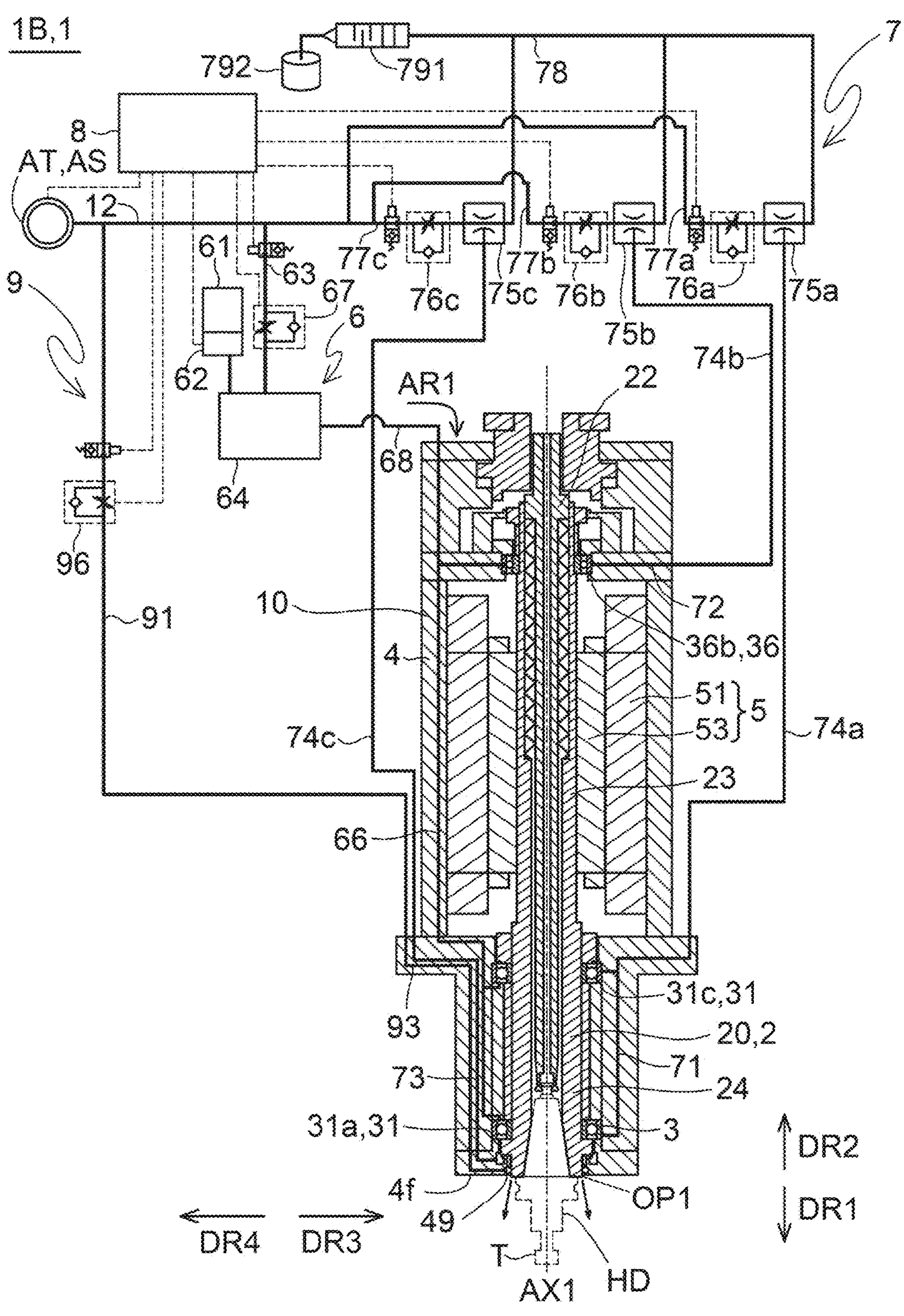
FIG. 17 is a schematic cross-sectional view of the spindle lubricator of the machine tool according to the first modification of the second embodiment, schematically illustrating the spindle lubricator.
Figure 18:
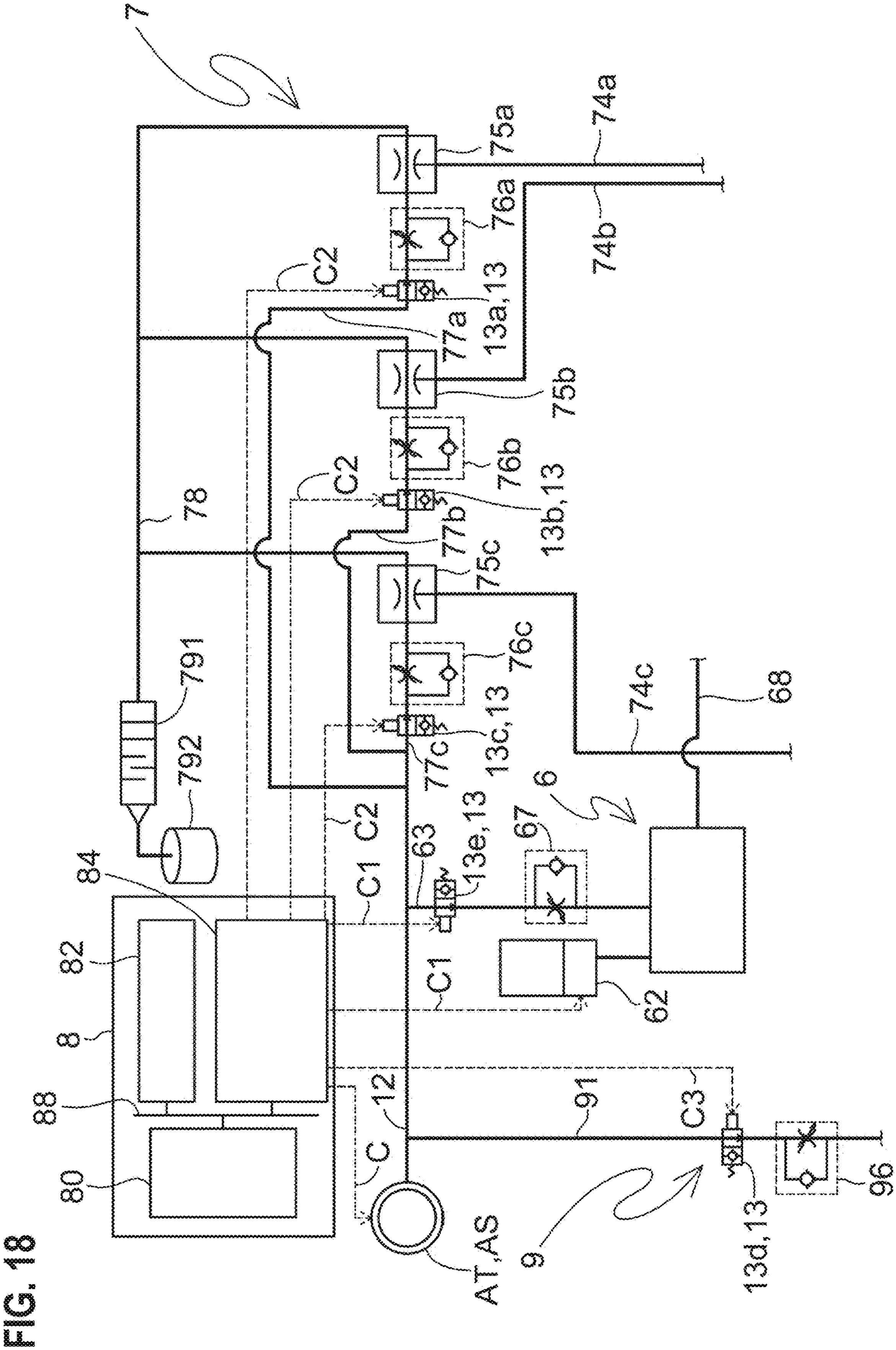
FIG. 18 is a schematic illustration of a part of the spindle lubricator of the machine tool according to the first modification of the second embodiment.
Figure 19:
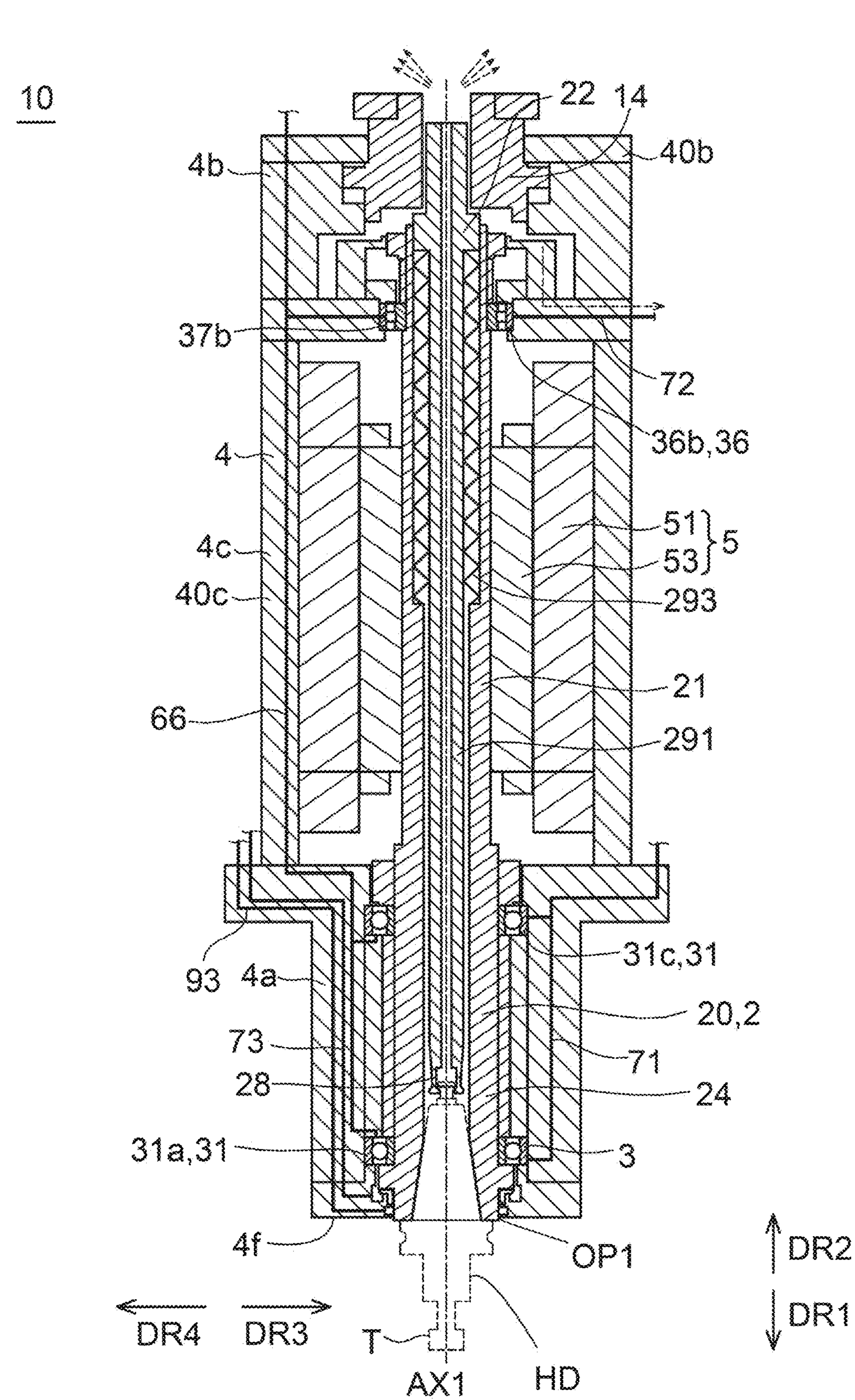
FIG. 19 is a schematic cross-sectional view of an example of a machining head, schematically illustrating the example of the machining head.
Figure 22:
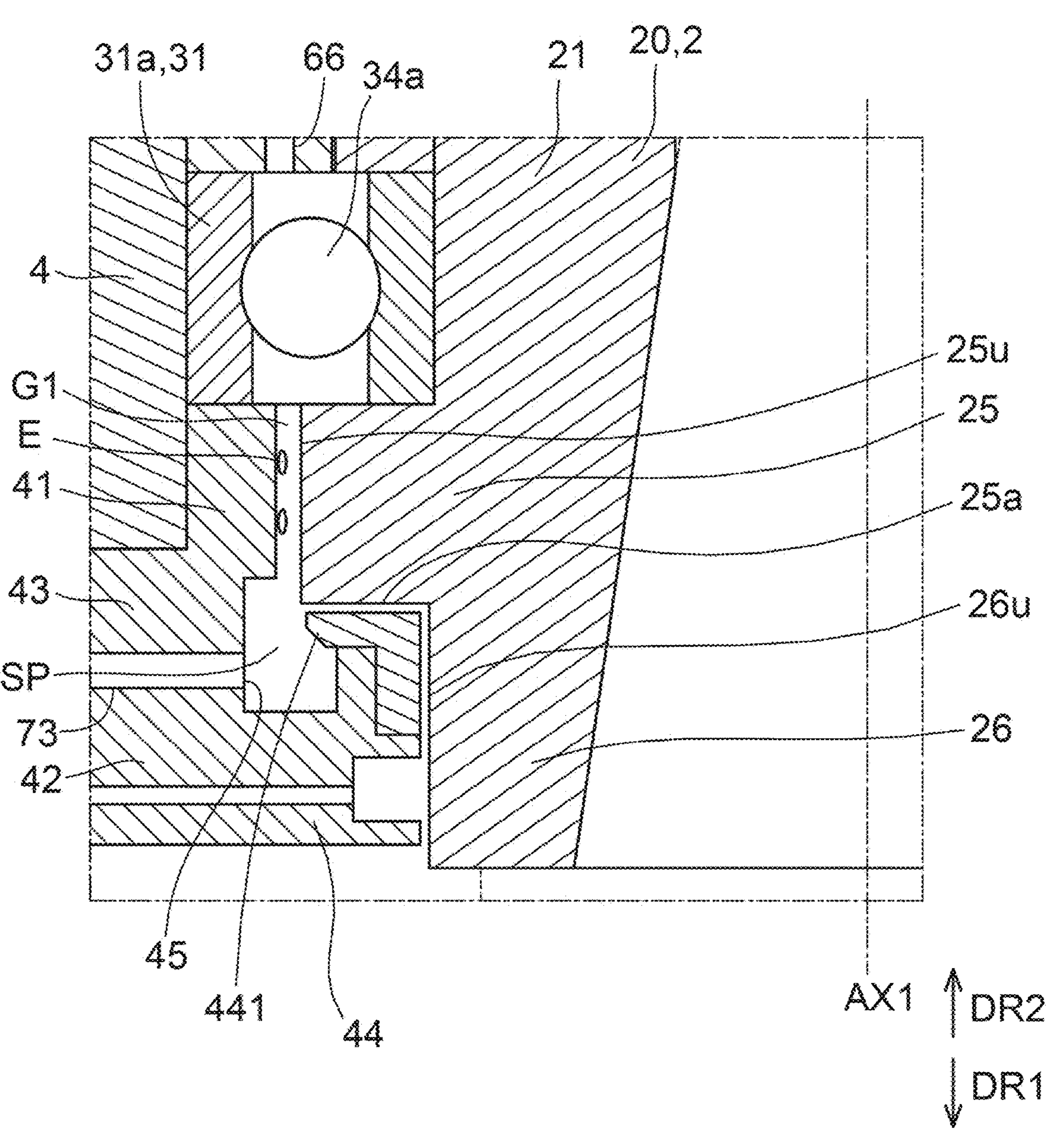
FIG. 22 is a schematic cross-sectional view of a part of the spindle lubricator of the machine tool according to the first modification of the second embodiment, schematically illustrating the part of the spindle lubricator.
Figure 23:
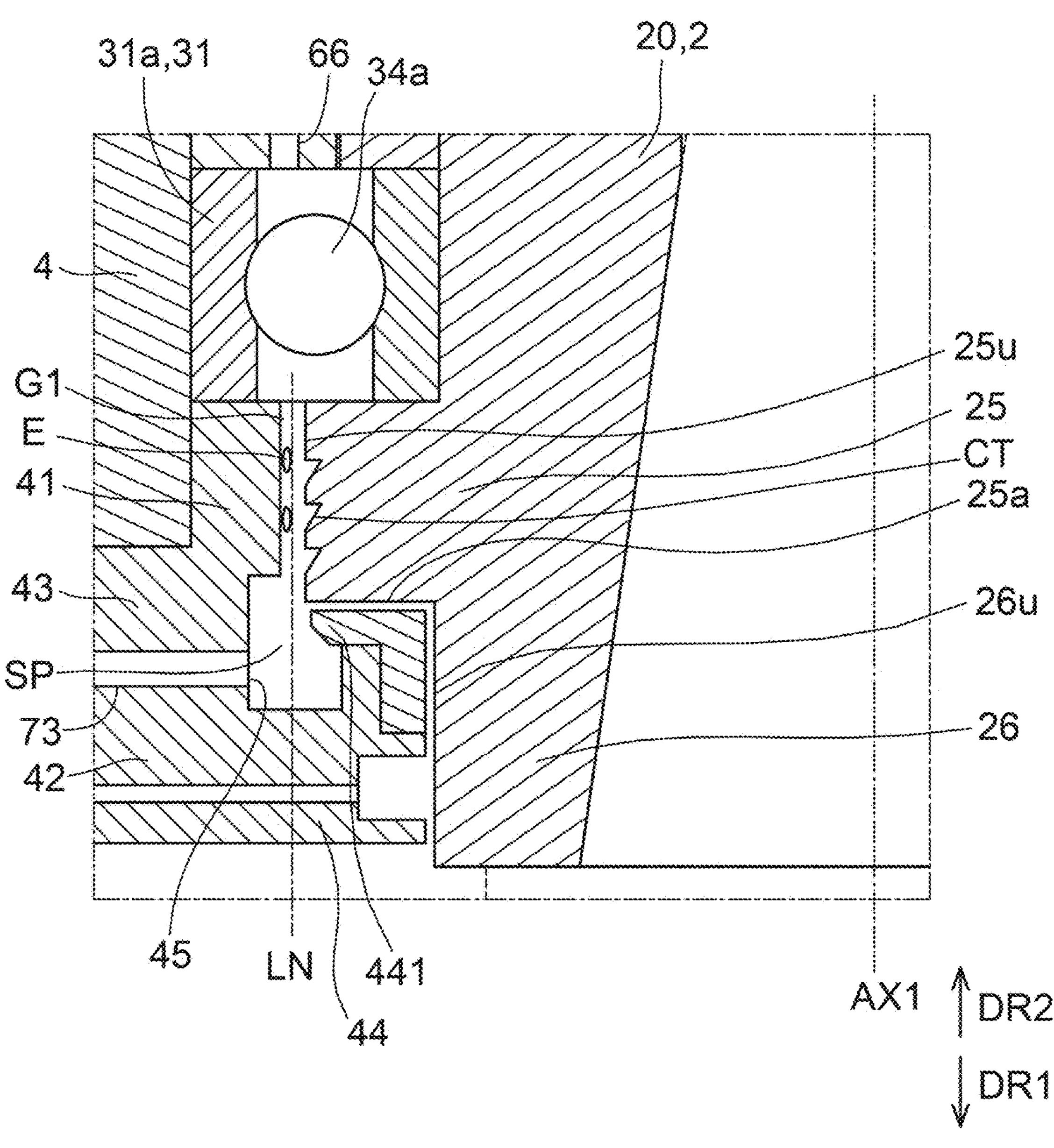
FIG. 23 is a schematic cross-sectional view of a part of the spindle lubricator of the machine tool according to a second modification of the second embodiment, schematically illustrating the part of the spindle lubricator.

A spindle lubricator 1B of a machine tool according to a second embodiment will be described with reference to FIGS. 7 to 26. FIG. 7 is a schematic cross-sectional view of the spindle lubricator 1B of the machine tool according to the second embodiment, schematically illustrating the spindle lubricator. FIG. 8 is a schematic illustration of a state in which a first collection flow rate and a second collection flow rate are measured. FIG. 9 is a schematic illustration of a state in which an oil-containing fluid is discharged from the first collection flow channel 71 and the second collection flow channel 72 to the outside of a housing 4. FIG. 10 is a schematic cross-sectional view of the spindle lubricator 1B of the machine tool according to the second embodiment, schematically illustrating the spindle lubricator. FIG. 11 is a schematic cross-sectional view of a part of the spindle lubricator 1B of the machine tool according to the second embodiment, schematically illustrating the part of the spindle lubricator. FIG. 12 is a view for describing an example of the structure of an ejector 75. FIG. 13 is a schematic sectional view of a spindle lubricator 1B of a machine tool according to a first modification of the second embodiment, schematically illustrating the spindle lubricator. FIG. 14 is a schematic cross-sectional view of a part of the spindle lubricator 1B of the machine tool according to the first modification of the second embodiment, schematically illustrating the part of the spindle lubricator. FIG. 15 is a schematic illustration of a state in which the first collection flow rate and the second collection flow rate are measured. FIG. 16 is a schematic illustration of a state in which the oil-containing fluid is discharged from the first collection flow channel 71, the second collection flow channel 72, and a third collection flow channel 73 to the outside of the housing 4. FIG. 17 is a schematic cross-sectional view of the spindle lubricator 1B of the machine tool according to the first modification of the second embodiment, schematically illustrating the spindle lubricator. FIG. 18 is a schematic illustration of a part of the spindle lubricator 1B of the machine tool according to the first modification of the second embodiment. FIG. 19 is a schematic cross-sectional view of an example of a machining head 10, schematically illustrating the example of the machining head 10. FIGS. 20 to 22, 24, and 25 are each a schematic cross-sectional view of a part of the spindle lubricator 1B of the machine tool according to the first modification of the second embodiment, schematically illustrating the part of the spindle lubricator. FIG. 23 is a schematic cross-sectional view of a part of the spindle lubricator 1B of the machine tool according to a second modification of the second embodiment, schematically illustrating the part of the spindle lubricator. FIG. 26 is a view for describing a first annular groove V1 and a second annular groove V2.

In the second embodiment, differences from the first embodiment will be mainly described. On the other hand, in the second embodiment, repeated descriptions of the matters that have been described in the first embodiment will be omitted. Therefore, it is needless to say that the matters that have been described in the first embodiment are applicable to the second embodiment, even though they are not explicitly described in the second embodiment. On the contrary, all matters to be described in the second embodiment are applicable to the first embodiment.

As illustrated in FIG. 7, the spindle lubricator 1B of a machine tool according to the second embodiment includes: (1) a rotation body 2, which holds a tool T; (2) a plurality of bearings 3 including a first bearing 31*a* and a second bearing 36*b*; (3) a housing 4, which supports the rotation body 2 to be rotatable about a first axis AX1 via the plurality of bearings 3; (4) a fluid mixture supplier 6, which supplies a fluid mixture that contains oil and air to the plurality of bearings 3; and (5) a collector 7, which collects an oil-containing fluid containing oil. Additionally, the spindle lubricator 1B of the machine tool may include a controller 8, which controls at least the fluid mixture supplier 6. The collector 7 includes: (6A) a plurality of collection flow channels (71, 72, 73), which are provided in the housing 4 and which collect the oil-containing fluids respectively from the plurality of bearings 3; (6B) a plurality of ejectors (75*a*, 75*b*, 75*c*) which are disposed outside the housing 4; and (6C) a plurality of flow control valves (76*a*, 76*b*, 76*c*). Additionally, the collector 7 may include a plurality of pipe lines (74*a*, 74*b*, 74*c*), which fluidly connect the plurality of collection flow channels (71, 72, 73) respectively with the plurality of ejectors (75*a*, 75*b*, 75*c*).

In an example illustrated in FIG. 7, the plurality of collection flow channels (71, 72, 73) include: a first collection flow channel 71, which collects a first oil-containing fluid discharged from at least one of the bearings mainly including the first bearing 31*a*; and a second collection flow channel 72, which collects a second oil-containing fluid discharged from at least one of the bearings mainly including the second bearing 36*b*.

In the example illustrated in FIG. 7, the plurality of pipe lines (74*a*, 74*b*, 74*c*) include: a first pipe line 74*a*, which fluidly connects the first collection flow channel 71 with the first ejector 75*a*; and a second pipe line 74*b*, which fluidly connects the second collection flow channel 72 with the second ejector 75*b*.

In the example illustrated in FIG. 7, the plurality of ejectors (75*a*, 75*b*, 75*c*) include: the first ejector 75*a*, which generates negative pressure in the first pipe line 74*a* with the first air supplied from the first air flow channel 77*a*, and which sucks the first oil-containing fluid from the first collection flow channel 71 through the first pipe line 74*a*; and the second ejector 75*b*, which generates negative pressure in the second pipe line 74*b* with the second air supplied from the second air flow channel 77*b*, and which sucks the second oil-containing fluid from the second collection flow channel 72 through the second pipe line 74*b*.

In the example illustrated in FIG. 7, the plurality of flow control valves (76*a*, 76*b*, 76*c*) include: the first flow control valve 76*a*, which adjusts the flow rate of the first air supplied from the first air flow channel 77*a* to the first ejector 75*a*; and the second flow control valve 76*b*, which adjusts the flow rate of the second air supplied from the second air flow channel 77*b* to the second ejector 75*b*.

As described heretofore, the spindle lubricator 1B of the machine tool according to the second embodiment has the same effects as those of the spindle lubricator 1A of the machine tool according to the first embodiment.

Optional and Additional Configurations

Subsequently, with reference to FIGS. 1 to 26, optional and additional configurations that are adoptable in the spindle lubricator 1B of the machine tool according to the second embodiment (or the spindle lubricator 1A of the machine tool according to the first embodiment) will be described.

Settings of First Collection Flow Rate, First Discharge Flow Rate, and Valve Aperture of First Flow Control Valve 76*a*

In each of FIGS. 4, 5, 8, and 9, it is assumed that the fluid mixture at a first flow rate is supplied from the fluid mixture supplier 6 to the plurality of bearings 3 (see an arrow AR1).

FIG. 4 or FIG. 8 illustrates a state in which the plurality of pipe lines (74*a*, 74*b*, and the like) are respectively in fluid connection with the plurality of collection flow channels (71, 72, and the like). More specifically, in examples illustrated in FIGS. 4 and 8, the first pipe line 74*a* is in fluid connection with the first collection flow channel 71, and the second pipe line 74*b* is in fluid connection with the second collection flow channel 72. In addition, in the example illustrated in FIG. 8, the third pipe line 74*c* is in fluid connection with the third collection flow channel 73.

FIG. 5 or FIG. 9 illustrates a state in which the plurality of pipe lines (74*a*, 74*b*, and the like) are respectively in fluid separation from the plurality of collection flow channels (71, 72, and the like). More specifically, in examples illustrated in FIGS. 5 and 9, the first pipe line 74*a* is in fluid separation from the first collection flow channel 71, and the second pipe line 74*b* is in fluid separation from the second collection flow channel 72. In the example illustrated in FIG. 9, the third pipe line 74*c* is in fluid separation from the third collection flow channel 73.

As illustrated in FIG. 4 or FIG. 8, under a first condition CD1 in which the plurality of pipe lines (74*a*, 74*b*, and the like) are respectively in fluid connection with the plurality of collection flow channels (71, 72, and the like) and the fluid mixture at the first flow rate is supplied from the fluid mixture supplier 6 to the plurality of bearings 3, a first collection flow rate is defined as a flow rate of the first oil-containing fluid flowing through the first pipe line 74*a* (see an arrow AR2 in FIG. 4 or FIG. 8). The first collection flow rate is derived by, for example, measurement. In the example illustrated in FIG. 4 or FIG. 8, the spindle lubricator 1 of the machine tool includes a first flow meter 11*a*, which is disposed on the first pipe line 74*a*. In this case, it is possible to measure the first collection flow rate using the first flow meter 11*a*. It is to be noted that after the first collection flow rate is measured, the first flow meter 11*a* may be detached from the first pipe line 74*a*. Alternatively, after the first collection flow rate is measured, the first flow meter 11*a* may remain attached to the first pipe line 74*a*.

Under a second condition CD2, which is different from the first condition CD1 only in that the plurality of pipe lines (74*a*, 74*b*, and the like) are respectively in fluid separation from the plurality of collection flow channels (71, 72, and the like) as illustrated in FIG. 5 or FIG. 9, a first discharge flow rate is defined as a flow rate of the first oil-containing fluid discharged from the first collection flow channel 71 to the outside of the first collection flow channel 71 (in the example illustrated in FIG. 5 or FIG. 9, the outside of the first collection flow channel 71 and the outside of the housing 4) (see an arrow AR4 in FIG. 5 or FIG. 9). The first discharge flow rate may be derived through measurement, or may be derived by simulation. For example, the first oil-containing fluid discharged from the first collection flow channel 71 to the outside of the housing 4 may be collected in a bag, and the first discharge flow rate may be derived by dividing the volume of the first oil-containing fluid that has been collected by a collecting time. It is to be noted that the first discharge flow rate may be measured by using another spindle lubricator of the same type with the above-described spindle lubricator 1 except that the collector 7 is not included.

The above-described first condition CD1 may include a condition of maintaining the rotation angle of the rotation body 2 about the first axis AX1 with respect to the housing 4. In this case, the above-described second condition CD2 includes the condition of maintaining the rotation angle of the rotation body 2 about the first axis AX1 with respect to the housing 4. Alternatively, the above-described first condition CD1 may include a condition of rotating the rotation body 2 about the first axis AX1 with respect to the housing 4 at a predetermined rotation speed (for example, 20000 rpm, or the maximum rotation speed or a similar rotation speed in the design specifications of the spindle lubricator). In this case, the above-described second condition CD2 includes the condition of rotating the rotation body 2 about the first axis AX1 with respect to the housing 4 at the predetermined rotation speed (for example, 20000 rpm, or the maximum rotation speed or a similar rotation speed in the design specifications of the spindle lubricator).

The flow rate (namely, the first flow rate) of the fluid mixture supplied to the plurality of bearings 3 from the fluid mixture supplier 6 in above-described first condition CD1 is equal to the flow rate (namely, the first flow rate) of the fluid mixture supplied to the plurality of bearings 3 from the fluid mixture supplier 6 in above-described second condition CD2. It is assumed that in the operation of the spindle lubricator 1, an upper limit value of the flow rate of the fluid mixture and a lower limit value of the flow rate of the fluid mixture supplied to the plurality of bearings 3 from the fluid mixture supplier 6 are determined beforehand. In this case, in each the above-described first condition CD1 and the above-described second condition CD2, the value of the first flow rate of the fluid mixture supplied to the plurality of bearings 3 from the fluid mixture supplier 6 is set to an optional value within a range between equal to or higher than the above-described lower limit and equal to or lower than the above-described upper limit. In each the above-described first condition CD1 and the above-described second condition CD2, the value of the first flow rate of the fluid mixture supplied to the plurality of bearings 3 from the fluid mixture supplier 6 may be set to the above-described upper limit value, may be set to the above-described lower limit value, or may be set to a value lower than the above-described upper limit value and higher than the above-described lower limit value.

In an example illustrated in FIG. 6 or FIG. 10, the valve aperture of the first flow control valve 76*a* is set so that the above-described first collection flow rate falls within a range between equal to or higher than 1 time and equal to or lower than 1.5 times the above-described first discharge flow rate (more preferably, so that the above-described first collection flow rate falls within a range between equal to or higher than 1 time and equal to or lower than 1.2 times the above-described first discharge flow rate). The valve aperture of the first flow control valve 76*a* may be set manually, or may be set by the controller 8.

When manually setting the valve aperture of the first flow control valve 76*a*, an operator adjusts the valve aperture of the first flow control valve 76*a* while seeing the value of the first collection flow rate indicated by the first flow meter 11*a*. In this manner, the operator manually sets the valve aperture of the first flow control valve 76*a* so that the above-described first collection flow rate falls within a range between equal to or higher than 1 time and equal to or lower than 1.5 times the above-described first discharge flow rate. When the valve aperture of the first flow control valve 76*a* is set by the controller 8, the controller 8 may automatically adjust the valve aperture of the first flow control valve 76*a* so that the value of the first collection flow rate indicated by the first flow meter 11*a* falls within a range between equal to or higher than 1 time and equal to or lower than 1.5 times the above-described first discharge flow rate. It is to be noted that after the first collection flow rate is adjusted, the first flow meter 11*a* may be detached from the first pipe line 74*a*, or may remain attached to the first pipe line 74*a* without change.

The above-described first collection flow rate is equal to or higher than 1 time the above-described first discharge flow rate, thereby eliminating or minimizing the insufficient collection of the first oil-containing fluid. In this manner, leakage of the oil from a gap between the rotation body 2 and the housing 4 to the outside of the spindle lubricator 1 of the machine tool is eliminated or minimized. In addition, the above-described first collection flow rate is equal to or lower than 1.5 times the above-described first discharge flow rate, thereby eliminating or minimizing excessive collection of the first oil-containing fluid. In this manner, the insufficient lubrication does not occur in at least one of the bearings including the first bearing 31*a*.

Setting of Second Collection Flow Rate, Second Discharge Flow Rate, and Valve Aperture of Second Flow Control Valve 76*b*

As illustrated in FIG. 4 or FIG. 8, a second collection flow rate is defined as a flow rate of the second oil-containing fluid flowing through the second pipe line 74*b* under the above-described first condition CD1 (see an arrow AR3 in FIG. 4 or FIG. 8). The second collection flow rate is derived by, for example, measurement. In the example illustrated in FIG. 4 or FIG. 8, the spindle lubricator 1 of the machine tool includes a second flow meter 11*b*, which is disposed on the second pipe line 74*b*. In this case, it is possible to measure the second collection flow rate using the second flow meter 11*b*. It is to be noted that after the second collection flow rate is measured, the second flow meter 11*b* may be detached from the second pipe line 74*b*. Alternatively, after the second collection flow rate is measured, the second flow meter 11*b* may remain attached to the second pipe line 74*b*.

As illustrated in FIG. 5 or FIG. 9, under the above-described second condition CD2, a second discharge flow rate is defined as a flow rate of the second oil-containing fluid discharged to the outside of the second collection flow channel 72 from the second collection flow channel 72 (in the example illustrated in FIG. 5 or FIG. 9, to the outside of the second collection flow channel 72 and the outside of the housing 4) (see an arrow AR5 in FIG. 5 or FIG. 9). The second discharge flow rate may be derived through measurement, or may be derived by simulation. For example, the second oil-containing fluid discharged to the outside of the housing 4 from the second collection flow channel 72 is collected in a bag, and the second discharge flow rate may be derived by dividing the volume of the second oil-containing fluid that has been collected by a collecting time. It is to be noted that the second discharge flow rate may be measured by using another spindle lubricator of the same type with the above-described spindle lubricator 1 except that the collector 7 is not included.

In the example illustrated in FIG. 6 or FIG. 10, the valve aperture of the second flow control valve 76*b* is set so that the above-described second collection flow rate falls within a range between equal to or higher than 1 time and equal to or lower than 1.5 times the above-described second discharge flow rate (more preferably, so that the above-described second collection flow rate falls within a range between equal to or higher than 1 time and equal to or lower than 1.2 times the above-described second discharge flow rate). The valve aperture of the second flow control valve 76*b* may be set manually, or may be set by the controller 8.

When manually setting the valve aperture of the second flow control valve 76*b*, the operator adjusts the valve aperture of the second flow control valve 76*b* while seeing the value of the second collection flow rate indicated by the second flow meter 11*b*. In this manner, the operator manually sets the valve aperture of the second flow control valve 76*b* so that the above-described second collection flow rate falls within a range between equal to or higher than 1 time and equal to or lower than 1.5 times the above-described second discharge flow rate. When the valve aperture of the second flow the first flow control valve 76*b* is set by the controller 8, the controller 8 may automatically adjust the valve aperture of the second flow control valve 76*b* so that the value of the second collection flow rate indicated by the second flow meter 11*b* falls within a range between equal to or higher than 1 time and equal to or lower than 1.5 times the above-described second discharge flow rate. It is to be noted that after the second collection flow rate is adjusted, the second flow meter 11*b* may be detached from the second pipe line 74*b*, or may remain attached to the second pipe line 74*b* without change.

The above-described second collection flow rate is equal to or higher than 1 time the above-described second discharge flow rate, thereby eliminating or minimizing the insufficient collection of the second oil-containing fluid. In this manner, leakage of the oil from a gap between the rotation body 2 and the housing 4 to the outside of the spindle lubricator 1 of the machine tool is eliminated or minimized. In addition, the above-described second collection flow rate is equal to or lower than 1.5 times the above-described second discharge flow rate, thereby eliminating or minimizing excessive collection of the second oil-containing fluid. In this manner, the insufficient lubrication does not occur in at least one of the bearings including the second bearing 36*b*.

For example, in a case where the plurality of pipe lines (74*a*, 74*b*, and the like) are long, or in a case where the exhaust pipe line 78 is long, a pressure loss of the oil-containing fluid that flows through the pipe line becomes large. In such a case, it is necessary to increase the suction force of the plurality of ejectors (75*a*, 75*b*, and the like). However, if the suction force of the plurality of ejectors (75*a*, 75*b*, and the like) is increased, the insufficient lubrication of the bearings will easily occur. In addition, in a case where the number of bearings included in the front bearing 31 and the number of bearings included in the rear bearing 36 are different from each other, or in a case where the length of the first pipe line 74*a* and the length of the second pipe line 74*b* are different from each other, an imbalance in lubrication easily occurs between the plurality of bearings. In contrast, by appropriately setting the valve aperture of each first flow control valve 76*a* and second flow control valve 76*b* as described above, the insufficient lubrication does not occur in each of the plurality of bearings.

Plurality of Bearings 3

The plurality of bearings 3 include the first bearing 31*a* and the second bearing 36*b*. Additionally, the plurality of bearings 3 may include a third bearing 31*c*. In the example illustrated in FIG. 6 or FIG. 10, the third bearing 31*c* is disposed between the first bearing 31*a* and the second bearing 36*b* in the direction along the first axis AX1. The third bearing 31*c* is, for example, a ball bearing.

The first bearing 31*a* constitutes at least a part of the front bearing 31, which supports the tip end portion 24 of the rotation body 2. The first bearing 31*a* is, for example, a ball bearing. In the example illustrated in FIG. 6 or FIG. 10, the first bearing 31*a* is a bearing disposed furthest in the first direction DR1 (in other words, closest to the tip end) among the plurality of bearings 3, which support the rotation body 2. The front bearing 31, which supports the tip end portion 24 of the rotation body 2, may include a plurality of bearings. In the example illustrated in FIG. 6 or FIG. 10, the front bearing 31 includes the first bearing 31*a* and the third bearing 31*c*.

In an example illustrated in FIG. 11, the first bearing 31*a* includes an inner ring 32*a*, an outer ring 33*a*, and rolling elements 34*a*, which are disposed between the inner ring 32*a* and the outer ring 33*a*. The third bearing 31*c* includes an inner ring 32*c*, an outer ring 33*c*, and rolling elements 34*c*, which are disposed between the inner ring 32*c* and the outer ring 33*c*.

In the example illustrated in FIG. 6 or FIG. 10, the second bearing 36*b* constitutes at least a part of the rear bearing 36, which supports the rear end portion 22 of the rotation body 2. The second bearing 36*b* is, for example, a roller bearing.

Collector 7

In the example illustrated in FIG. 10, the collector 7 includes: (1) a plurality of collection flow channels including the first collection flow channel 71, the second collection flow channel 72, and the third collection flow channel 73; (2) a plurality of pipe lines including the first pipe line 74*a*, the second pipe line 74*b*, and the third pipe line 74*c*; (3) a plurality of ejectors including the first ejector 75*a*, the second ejector 75*b*, and the third ejector 75*c*; and (4) a plurality of flow control valves including the first flow control valve 76*a*, the second flow control valve 76*b*, and the third flow control valve 76*c*.

The first collection flow channel 71, the second collection flow channel 72, the first pipe line 74*a*, the second pipe line 74*b*, the first ejector 75*a*, the second ejector 75*b*, the first flow control valve 76*a*, and the second flow control valve 76*b* have been described in the first embodiment, and thus the repeated descriptions of these configurations will be omitted.

The third collection flow channel 73 is provided in the housing 4. In an example illustrated in FIG. 11, the entirety or most of the third collection flow channel 73 is disposed inside the housing 4. The entirety or most of the third collection flow channel 73 may be made up of a through hole formed in the housing 4.

The third collection flow channel 73 collects the oil-containing fluid containing the oil that has passed through the first bearing 31*a* without being collected by the first collection flow channel 71. Hereinafter, the oil-containing fluid collected through the third collection flow channel 73 will be referred to as a "third oil-containing fluid". In the example illustrated in FIG. 10, the third collection flow channel 73 is a flow channel different from the first collection flow channel 71 and the second collection flow channel 72.

As illustrated in FIG. 10, the third pipe line 74*c* fluidly connects the third collection flow channel 73 with the third ejector 75*c*, which is disposed outside the housing 4. In the example illustrated in FIG. 10, the entirety of the third pipe line 74*c* is disposed outside the housing 4. Alternatively, the third pipe line 74*c* may be partially disposed inside the housing 4, and most of the third pipe line 74*c* may be disposed outside the housing 4.

By generating negative pressure with the air supplied from a third air flow channel 77*c*, the third ejector 75*c* sucks the third oil-containing fluid from the third collection flow channel 72. Hereinafter, the air supplied from the third air flow channel 77*c* to the third ejector 75*c* will be referred to as "third air". In the example illustrated in FIG. 10, the third ejector 75*c* generates negative pressure in the third pipe line 74*c* with the third air supplied from the third air flow channel 77*c*, and sucks the third oil-containing fluid from the third collection flow channel 73 through the third pipe line 74*c*. In the example illustrated in FIG. 10, the third ejector 75*c* is an ejector provided to correspond to the third collection flow channels 73 on a one-to-one basis through the third pipe line 74*c*.

The third flow control valve 76*c* adjusts the flow rate of the third air supplied to the third ejector 75*c* from the third air flow channel 77*c*. The valve aperture of the third flow control valve 76*c* may be set manually, or may be set by the controller 8.

In the example illustrated in FIG. 11, the spindle lubricator 1 of the machine tool includes the third collection flow channel 73, which collects the third oil-containing fluid containing oil that has passed through the first bearing 31*a* without being collected by the first collection flow channel 71. Therefore, leakage of the oil, which has passed through the first bearing 31*a*, from a gap between the rotation body 2 and a tip end portion 46 of the housing 4 is effectively eliminated or minimized.

For example, it is assumed that it is not desirable that oil adheres to a workpiece to be machined by the tool T. More specifically, it is assumed that a workpiece made of a carbon material is to be machined, and if oil adheres to the workpiece, an issue will arise. In such a case, the embodiment including the third collection flow channel 73 is useful.

In addition, when a resin material or a similar material is machined using the tool T, dry machining is used in some cases. In the embodiment including the third collection flow channel 73, leakage of the oil from the gap between the rotation body 2 and the tip end portion 46 of the housing 4 is eliminated or minimized, and adhesion of the oil to a workpiece (for example, a resin material or a similar material) is effectively eliminated or minimized. Therefore, the embodiment including the third collection flow channel 73 is useful also in the case where the dry machining is used.

In the embodiment including the third collection flow channel 73, leakage of the oil from the gap between the rotation body 2 and the tip end portion 46 of the housing 4 is eliminated or minimized. Thus, in a case where a coolant is used while a workpiece is being machined (in other words, in a case where machining not the dry machining is performed), the oil being mixed into the coolant is eliminated or minimized. Therefore, the load on the environment is reduced.

In the example illustrated in FIG. 10, the collector 7 includes an exhaust pipe line 78, an exhaust cleaner 791, and a collection container 792. In the example illustrated in FIG. 10, the exhaust pipe line 78 fluidly connects the first ejector 75*a*, the second ejector 75*b*, and the third ejector 75*c* with the exhaust cleaner 791.

The exhaust cleaner 791 receives the oil-containing fluid from a plurality of ejectors (75*a*, 75*b*, 75*c*) through the exhaust pipe line 78. The exhaust cleaner 791 also separates the oil-containing fluid that has been received from the exhaust pipe line 78 into liquid-state oil and air. The liquid-state oil that has been separated from the oil-containing fluid by the exhaust cleaner 791 is collected in the collection container 792.

Structure of Ejector 75

FIG. 12 illustrates an example of the structure of the ejector 75. The ejector 75 includes an inlet port 751, an outlet port 752, and a vacuum port 753. When the compressed air is supplied to the inlet port 751 of the ejector 75, a fluid to be sucked is sucked into the ejector 75 through the vacuum port 753 of the ejector 75. The compressed air and the sucked fluid are discharged from the ejector 75 through the outlet port 752. When the flow rate of the compressed air supplied to the inlet port 751 increases, the flow rate of the fluid to be sucked into the ejector 75 increases. On the other hand, when the flow rate of the compressed air supplied to the inlet port 751 decreases, the flow rate of the fluid to be sucked into the ejector 75 decreases.

Regarding the first ejector 75*a*, the above-described first air flow channel 77*a* is connected with an inlet port 751*a*, the above-described exhaust pipe line 78 is connected with an outlet port 752*a*, and the above-described first pipe line 74*a* is connected with a vacuum port 753*a*. Regarding the second ejector 75*b*, the above-described second air flow channel 77*b* is connected with an inlet port 751*b*, the above-described exhaust pipe line 78 is connected with an outlet port 752*b*, and the above-described second pipe line 74*b* is connected with a vacuum port 753*b*. Regarding the third ejector 75*c*, the above-described third air flow channel 77*c* is connected with an inlet port 751*c*, the above-described exhaust pipe line 78 is connected with an outlet port 752*c*, and the above-described third pipe line 74*c* is connected with a vacuum port 753*c*.

Air Supplier 9

As illustrated in FIG. 13, the spindle lubricator 1 of the machine tool may include an air supplier 9. The air supplier 9 includes: an air source AS (for example, an air compressor) disposed outside the housing 4; an air supply flow channel 93, which is provided in the housing 4; an air supply pipe 91, which connects the air source AS with the air supply flow channel 93; and a fourth flow control valve 96.

In an example illustrated in FIG. 13, the air supply pipe 91 is disposed outside the housing 4. The air supply pipe 91 supplies air to the air supply flow channel 93. Hereinafter, the air supplied to the air supply flow channel 93 from the air supply pipe 91 will be referred to as "fourth air". The fourth flow control valve 96 adjusts the flow rate of the fourth air supplied to the air supply flow channel 93 from the air supply pipe 91. In the example illustrated in FIG. 13, the fourth flow control valve 96 is disposed on the air supply pipe 91. The valve aperture of the fourth flow control valve 96 may be set manually, or may be set by the controller 8.

In an example illustrated in FIG. 14, an air injection opening OP1 is formed between the rotation body 2 (more specifically, the rotation shaft 20) and the tip end portion 46 of the housing 4. In addition, a discharge opening 49, which discharges the fourth air received from the air supply flow channel 93 to a gap G between the rotation body 2 and the housing 4, is formed on the housing 4. The fourth air discharged from the discharge opening 49 forms both a first flow from the gap G toward the third collection flow channel 73 and a second flow from the gap G toward the air injection opening OP1.

The fourth air injected from the air injection opening OP1 prevents foreign matters such as cutting chips from entering the housing 4 through the gaps G. More specifically, in the example illustrated in FIG. 13, the fourth air injected from the air injection opening OP1 forms an air curtain AC around the tool T or the tool holder HD. The air curtain AC prevents foreign matters such as cutting chips from entering the housing 4 through the gap G.

In the example illustrated in FIG. 14, the first flow from the gap G toward the third collection flow channel 73 (more specifically, the flow of the fourth air from the gap G toward the third collection flow channel 73) pushes back oil E1, which has entered the gap G, toward the third collection flow channel 73. Therefore, leakage of the oil from the gap between the rotation body 2 and the tip end portion 46 of the housing 4 is further effectively eliminated or minimized.

The third collection flow channel 73 includes a relatively larger amount of the fourth air (in other words, the fourth air that has been discharged from the discharge opening 49) than the amount in any of the other collection flow channels (71, 72). In addition, in the example illustrated in FIG. 13, the third pipe line 74*c* includes a relatively larger amount of the fourth air (in other words, the fourth air that has been discharged from the discharge opening 49) than the amount in any of the other pipe lines (74*a*, 74*b*). In such a case, when equal suction force is exerted in the first pipe line 74*a*, the second pipe line 74*b*, and the third pipe line 74*c*, an imbalance in collecting the oil easily occurs among the plurality of bearings. In contrast, in the example illustrated in FIG. 13, the suction force exerted in the first pipe line 74*a*, the suction force exerted on the second pipe line 74*b*, and the suction force exerted in the third pipe line 74*c* are independently adjustable. Thus, by appropriately setting the suction force individually, it becomes possible to prevent the insufficient lubrication in each of the plurality of bearings.

Settings of Valve Aperture of First Flow Control Valve 76*a* and Valve Aperture of Second Flow Control Valve 76*b*

In each drawing of FIGS. 15 and 16, it is assumed that the fluid mixture at the first flow rate is supplied to the plurality of bearings 3 from the fluid mixture supplier 6 (see an arrow AR1). In each drawing of FIGS. 15 and 16, it is assumed that the fourth air at the second flow rate is supplied to the air supply flow channel 93 (see an arrow AR7). In addition, in each drawing of FIGS. 15 and 16, it is assumed that air is injected from the air injection opening OP1 (see an arrow AR6).

FIG. 15 illustrates a state in which the plurality of pipe lines (74*a*, 74*b*, 74*c*) are respectively in fluid connection with the plurality of collection flow channels (71, 72, 73). More specifically, in an example illustrated in FIG. 15, the first pipe line 74*a* is in fluid connection with the first collection flow channel 71, the second pipe line 74*b* is in fluid connection with the second collection flow channel 72, and the third pipe line 74*c* is in fluid connection with the third collection flow channel 73.

FIG. 16 illustrates a state in which the plurality of pipe lines (74*a*, 74*b*, 74*c*) are respectively in fluid separation from the plurality of collection flow channels (71, 72, 73). More specifically, in an example illustrated in FIG. 16, the first pipe line 74*a* is in fluid separation from the first collection flow channel 71, the second pipe line 74*b* is in fluid separation from the second collection flow channel 72, and the third pipe line 74*c* is in fluid separation from the third collection flow channel 73.

As illustrated in FIG. 15, under a third condition CD3 in which the plurality of pipe lines (74*a*, 74*b*, 74*c*) are respectively in fluid connection with the plurality of collection flow channels (71, 72, 73), the oil-containing fluid at the first flow rate is supplied to the plurality of bearings from the fluid mixture supplier 6, and the fourth air at the second flow rate is supplied to the air supply flow channel 93, a first collection flow rate is defined as a flow rate of the first oil-containing fluid flowing in the first pipe line 74*a* (see an arrow AR2 in FIG. 15). In addition, under the above-described third condition CD3, a second collection flow rate is defined as a flow rate of the second oil-containing fluid flowing in the second pipe line 74*b* (see an arrow AR3 in FIG. 15). It is to be noted that since the measurement methods of the first collection flow rate and the second collection flow rate have already been described, repeated descriptions of these measurement methods will be omitted.

As illustrated in FIG. 16, under a fourth condition CD4, which is different from the above-described third condition CD3 only in that the plurality of pipe lines (74*a*, 74*b*, 74*c*) are respectively in fluid separation from the plurality of collection flow channels (71, 72, 73), a first discharge flow rate is defined as a flow rate of the first oil-containing fluid discharged to the outside of the first collection flow channel 71 from the first collection flow channel 71 (for example, to the outside of the housing 4) (see an arrow AR4 in FIG. 16). In addition, a second discharge flow rate is defined as a flow rate of the second oil-containing fluid discharged to the outside of the second collection flow channel 72 (for example, to the outside of the housing 4) from the second collection flow channel 72 under the above-described fourth condition CD4 (see an arrow AR5 in FIG. 16). It is to be noted that since the measurement methods (or derivation methods) of the first collection flow rate and the second collection flow rate have already been described, the repeated descriptions of the measurement methods (or derivation methods) will be omitted.

The above-described third condition CD3 may include a condition of maintaining the rotation angle of the rotation body 2 about the first axis AX1 with respect to the housing 4. In this case, the above-described fourth condition CD4 includes a condition of maintaining the rotation angle of the rotation body 2 about the first axis AX1 with respect to the housing 4. Alternatively, the above-described third condition CD3 may include a condition of rotating the rotation body 2 about the first axis AX1 with respect to the housing 4 at a predetermined rotation speed (for example, 20000 rpm, or the maximum rotation speed or a similar rotation speed in the design specifications of the spindle lubricator). In this case, the above-described fourth condition CD4 includes a condition of rotating the rotation body 2 about the first axis AX1 with respect to the housing 4 at the predetermined rotation speed (for example, 20000 rpm, or the maximum rotation speed or a similar rotation speed in the design specifications of the spindle lubricator).

The flow rate (that is, the first flow rate) of the fluid mixture supplied to the plurality of bearings 3 from the fluid mixture supplier 6 under the above-described third condition CD3 is equal to the flow rate (that is, the first flow rate) of the fluid mixture supplied to the plurality of bearings 3 from the fluid mixture supplier 6 under the above-described fourth condition CD4. In the operation of the spindle lubricator 1, it is assumed that an upper limit value of the flow rate of the fluid mixture and a lower limit value of the flow rate of the fluid mixture supplied to the plurality of bearings 3 from the fluid mixture supplier 6 are determined beforehand. In this case, in each the above-described third condition CD3 and the above-described fourth condition CD4, the value of the first flow rate of the fluid mixture supplied to the plurality of bearings 3 from the fluid mixture supplier 6 is set to an optional value within a range between equal to or higher than the above-described lower limit and equal to or lower than the above-described upper limit. In each the above-described third condition CD3 and the above-described fourth condition CD4, the value of the first flow rate of the fluid mixture supplied to the plurality of bearings 3 from the fluid mixture supplier 6 may be set to the above-described upper limit value, may be set to the above-described lower limit value, or may be set to a value lower than the above-described upper limit value and higher than the above-described lower limit value.

The flow rate of the fourth air supplied to the air supply flow channel 93 under the above-described third condition CD3 (that is, the second flow rate) is equal to the flow rate of the fourth air supplied to the air supply flow channel 93 under the above-described fourth condition CD4 (that is, the second flow rate). In the above-described fourth condition CD4, a "third flow rate" is defined as a flow rate of the air injected from the air injection opening OP1. In the above-described fourth condition CD4 (see FIG. 16), it is preferable to set the flow rate (that is, the second flow rate) of the fourth air supplied to the air supply flow channel 93 so that the third flow rate becomes a flow rate necessary for forming an air curtain (for example, a flow rate of a design lower limit value for forming the air curtain).

In an example illustrated in FIG. 17, the valve aperture of the first flow control valve 76*a* is set so that the above-described first collection flow rate falls within a range between equal to or higher than 1 time and equal to or lower than 1.5 times the above-described first discharge flow rate (more preferably, so that the above-described first collection flow rate falls within a range between equal to or higher than 1 time and equal to or lower than 1.2 times the above-described first discharge flow rate). The valve aperture of the first flow control valve 76*a* may be set manually, or may be set by the controller 8. In addition, the valve aperture of the second flow control valve 76*b* is set so that the above-described second collection flow rate falls within a range between equal to or higher than 1 time and equal to or lower than 1.5 times the above-described second discharge flow rate (more preferably, so that the above-described second collection flow rate falls within a range between equal to or higher than 1 time and equal to or lower than 1.2 times the above-described second discharge flow rate). The valve aperture of the second flow control valve 76*b* may be set manually, or may be set by the controller 8

It is to be noted that the above-described third condition CD3 is one embodiment of the above-described first condition CD1, and the above-described fourth condition CD4 is one embodiment of the above-described second condition CD2.

Settings of Valve Aperture of Third Flow Control Valve 76*c* and Valve Aperture of Fourth Flow Control Valve 96

FIG. 17 illustrates a state after the valve aperture of the first flow control valve 76*a* and the valve aperture of the second flow control valve 76*b* have been set. In an example illustrated in FIG. 17, the valve aperture of the third flow control valve 76*c* and the valve aperture of the fourth flow control valve 96 are set so that the flow rate of the fourth air discharged from the discharge opening 49 (see FIG. 14) is higher than the flow rate of the air injected from the air injection opening OP1 (see FIG. 14). In the example illustrated in FIG. 14, the flow rate of the fourth air discharged from the discharge opening 49 is set to be higher than the flow rate of the air injected from the air injection opening OP1, thereby presenting, or eliminating or minimizing the injection of the oil E1 from the air injection opening OP1 in accordance with the injection of the air from the air injection opening OP1.

For example, in a case where the valve aperture of the third flow control valve 76*c* is small, the collection of the third oil-containing fluid from the third collection flow channel 73 is insufficient, and in the example illustrated in FIG. 14, the oil E1 moves from the gap between the housing 4 and the rotation body 2 toward the air injection opening OP1, in some cases. More specifically, when the flow rate of the air injected from the air injection opening OP1 is higher than the flow rate of the fourth air discharged from the discharge opening 49, the oil E1 is injected from the air injection opening OP1 in accordance with the injection of the air from the air injection opening OP1, in some cases. For this reason, it is preferable to appropriately set a relationship between the valve aperture of the third flow control valve 76*c* and the valve aperture of the fourth flow control valve 96 so that the flow rate of the air injected from the air injection opening OP1 does not become higher than the flow rate of the fourth air discharged from the discharge opening 49.

In the example illustrated in FIG. 17, it is preferable to set the valve aperture of the third flow control valve 76*c* and the valve aperture of the fourth flow control valve 96 so that the flow rate of the air injected from the air injection opening OP1 is equal to or higher than the above-described third flow rate (more specifically, equal to or higher than a flow rate of a design lower limit value for forming an air curtain). With such settings, the air curtain that prevents foreign matters from entering the machining head 10 from the tip end portion of the machining head 10 is suitably formed.

In the example illustrated in FIG. 17, the fourth air discharged from the discharge opening 49 is partially collected through the third collection flow channel 73, and thus the flow rate of the air injected from the air injection opening OP1 can be reduced. For this reason, in the example illustrated in FIG. 17, by sufficiently increasing the valve aperture of the fourth flow control valve 96, it becomes possible to set the flow rate of the air injected from the air injection opening OP1 to be equal to or higher than the above-described third flow rate while the fourth air discharged from the discharge opening 49 is partially collected through the third collection flow channel 73. The fourth air discharged from the discharge opening 49 is partially collected through the third collection flow channel 73, thereby preventing the oil E1 (see FIG. 14, if necessary) from moving toward the air injection opening OP1. In addition, the air at equal to or higher than the third flow rate is injected from the air injection opening OP1, thereby preventing foreign matters from entering the machining head 10 from the tip end portion of the machining head 10.

In the example illustrated in FIG. 17, the valve aperture of the third flow control valve 76*c* and the valve aperture of the fourth flow control valve 96 may be set so that the flow rate of the air injected from the air injection opening OP1 is equal to or higher than 1 time and equal to or lower than 1.5 times the above-described third flow rate (more specifically, the flow rate of the design lower limit value for forming the air curtain). The flow rate of the air injected from the air injection opening OP1 is equal to or lower than 1.5 times the above-described third flow rate, and thus the air injected from the air injection opening OP1 does not become excessive.

Fluid Mixture Supplier 6

In the example illustrated in FIG. 17, the fluid mixture supplier 6 includes: an air source AT (for example, an air compressor); an oil tank 61; a pump 62; a second air supply pipe 63; a mixer 64; a supply flow channel 66; and a fluid mixture supply pipe 68, which connects the mixer 64 with the supply flow channel 66.

The air source AT supplies air to the mixer 64 through the second air supply pipe 63. Hereinafter, the air supplied to the mixer 64 through the second air supply pipe 63 will be referred to as “fifth air”. The pump 62 supplies the oil to the mixer 64 from the oil tank 61. The mixer 64 mixes the fifth air received from the air source AT through the second air supply pipe 63 with the oil received from the oil tank 61, and forms a fluid mixture containing the oil and the air. The mixer 64 also feeds the fluid mixture to the supply flow channel 66 through the fluid mixture supply pipe 68.

In the example illustrated in FIG. 17, the fluid mixture supply pipe 68 is disposed outside the housing 4, and the supply flow channel 66 is disposed inside the housing 4. The supply flow channel 66 supplies a fluid mixture containing the oil and the air to the plurality of bearings 3 (more specifically, oil air). In the example illustrated in FIG. 17, the supply flow channel 66 supplies the fluid mixture containing the oil and the air to the first bearing 31*a*, the second bearing 36*b*, and the third bearing 31*c*.

In the example illustrated in FIG. 17, the air source AT, which supplies the air to the mixer 64, also serves as the air source AS, which supplies the air to the plurality of ejectors (75*a*, 75*b*, 75*c*). Since the air source AT, which supplies the air to the mixer 64, and the air source AS, which supplies the air to the plurality of ejectors (75*a*, 75*b*, 75*c*), are configured as one air source, space saving is achieved. In addition, reduction in the manufacturing cost is achieved, and reduction in energy consumption is achieved. Alternatively, the air source AT, which supplies the air to the mixer 64, may be an air source different from the air source AS, which supplies the air to the plurality of ejectors (75*a*, 75*b*, 75*c*).

The fluid mixture supplier 6 may include a fifth flow control valve 67, which adjusts the flow rate of the air supplied to the mixer 64 from the second air supply pipe 63. In the example illustrated in FIG. 17, the fifth flow control valve 67 is disposed on the second air supply pipe 63. The valve aperture of the fifth flow control valve 67 may be set manually, or may be set by the controller 8.

First Air Flow Channel 77*a*, Second Air Flow Channel 77*b*, and Third Air Flow Channel 77*c*

Since the first air flow channel 77*a* and the second air flow channel 77*b* have been described in the first embodiment, repeated descriptions of these flow channels will be omitted. In the example illustrated in FIG. 17, the collector 7 includes a third air flow channel 77*c*, which supplies third air to the third ejector 75*c*. In the example illustrated in FIG. 17, a third flow control valve 76*c* is disposed on the third air flow channel 77*c*.

Main Air Flow Channel 12

In the example illustrated in FIG. 17, the spindle lubricator 1 of the machine tool includes a main air flow channel 12, which connects the first air flow channel 77*a*, the second air flow channel 77*b*, and the third air flow channel 77*c* with the air source AS. In the example illustrated in FIG. 17, the main air flow channel 12 is branched into a plurality of air flow channels including the first air flow channel 77*a*, the second air flow channel 77*b*, and the third air flow channel 77*c*.

The main air flow channel 12 may be connected with an air supply pipe 91, which supplies the air to an air supply flow channel 93, which is provided in the housing 4. The main air flow channel 12 may be connected with a second air supply pipe 63, which supplies the fifth air to the mixer 64.

On-Off Valve 13

In an example illustrated in FIG. 18, the spindle lubricator 1 of the machine tool includes a plurality of on-off valves 13, which are respectively disposed between the air source AS and the plurality of flow control valves (76*a*, 76*b*, 76*c*, 67, 96).

In the example illustrated in FIG. 18, the collector 7 includes a first on-off valve 13*a* and a second on-off valve 13*b*. Additionally, the collector 7 may include a third on-off valve 13*c*.

The first on-off valve 13*a* is disposed between the air source AS and the first flow control valve 76*a*. More specifically, the first on-off valve 13*a* is disposed on the first air flow channel 77*a*. The first on-off valve 13*a* opens and closes a first air flow channel 77*a* between the air source AS and the first flow control valve 76*a*.

The second on-off valve 13*b* is disposed between the air source AS and the second flow control valve 76*b*. More specifically, the second on-off valve 13*b* is disposed on the second air flow channel 77*b*. The second on-off valve 13*b* opens and closes the second air flow channel 77*b* between the air source AS and the second flow control valve 76*b*.

The third on-off valve 13*c* is disposed between the air source AS and the third flow control valve 76*c*. More specifically, the third on-off valve 13*c* is disposed on the third air flow channel 77*c*. The third on-off valve 13*c* opens and closes the third air flow channel 77*c* between the air source AS and the third flow control valve 76*c*.

In the example illustrated in FIG. 18, the air supplier 9 includes a fourth on-off valve 13*d*. The fourth on-off valve 13*d* is disposed between the air source AS and the fourth flow control valve 96. More specifically, the fourth on-off valve 13*d* is disposed on the air supply pipe 91. The fourth on-off valve 13*d* opens and closes the flow channel of the air supply pipe 91 between the air source AS and the fourth flow control valve 96.

In the example illustrated in FIG. 18, the fluid mixture supplier 6 includes a fifth on-off valve 13*e*. The fifth on-off valve 13*e* is disposed between the air source AS and the fifth flow control valve 67. More specifically, the fifth on-off valve 13*e* is disposed on the second air supply pipe 63. The fifth on-off valve 13*e* opens and closes the flow channel of the second air supply pipe 63 between the air source AS and the fifth flow control valve 67.

Controller 8

The controller 8 controls the fluid mixture supplier 6 and the collector 7. Additionally, the controller 8 may control the air supplier 9.

In the example illustrated in FIG. 18, the controller 8 includes: a processor 80; a memory 82, which stores a program and data; and a communication circuit 84. In the example illustrated in FIG. 18, the processor 80, the memory 82, and the communication circuit 84 are connected with one another through a bus 88.

The controller 8 may include a microcontroller in which the processor 80, the memory 82, and the communication circuit 84 are integrated into one integrated circuit, or may include a computer in which a CPU as the processor 80, a storage unit as the memory 82, and a communication unit as the communication circuit 84 are separately provided.

The controller 8 controls the air source AS. By transmitting a drive command C to the air source AS, the controller 8 drives the air source AS (for example, an air compressor).

The controller 8 controls the fluid mixture supplier 6. More specifically, the controller 8 transmits a first group of control commands C1 to the fluid mixture supplier 6, and the fluid mixture supplier 6, which receives the first group of control commands C1, supplies the fluid mixture to the plurality of bearings 3 at the first flow rate. For example, by transmitting the first group of control commands C1 to the fifth on-off valve 13*e* and the pump 62, the controller 8, using the fluid mixture supplier 6, supplies the fluid mixture containing oil and air to the plurality of bearings 3.

The controller 8 controls the collector 7. The controller 8 transmits a second group of control commands C2 to the collector 7, and the collector 7, which receives the second group of control commands C2, collects the oil-containing fluid. For example, by transmitting the second group of control commands C2 to the first on-off valve 13*a*, the second on-off valve 13*b*, and the third on-off valve 13*c*, the controller 8, using the collector 7, collects the oil-containing fluid. In a case where the valve aperture of the first flow control valve 76*a* is set to a first valve aperture, the insufficient lubrication of the bearing due to the suction force of the first ejector 75*a* does not occur. In a case where the valve aperture of the second flow control valve 76*b* is set to a second valve aperture, the insufficient lubrication of the bearing due to the suction force of the second ejector 75*a* does not occur.

The controller 8 may control the air supplier 9 so that the air is injected from the air injection opening OP1. The controller 8 transmits a third group of control commands C3 to the air supplier 9, and the air supplier 9, which receives the third group of control commands C3, supplies the fourth air to the discharge opening 49, which is formed in the housing 4. For example, by transmitting the control command C3 to the fourth on-off valve 13*d*, the controller 8, using the air supplier 9, supplies the fourth air to the discharge opening 49. The fourth air that has been supplied to the discharge opening 49 is partially injected from the air injection opening OP1, and the fourth air that has been supplied to the discharge opening 49 is partially collected by the collector 7 through the third collection flow channel 73.

By appropriately setting the valve aperture of the third flow control valve 76*c* and the valve aperture of the fourth flow control valve 96, (1) the third oil-containing fluid containing the oil that has passed through the first bearing 31*a* without being collected by the first collection flow channel 71 is collected through the third collection flow channel 73, (2) the oil being mixed into the air to be injected from the air injection opening OP1 is prevented, or eliminated or minimized, and (3) an air curtain is suitably formed with the air injected from the air injection opening OP1.

First Rotational Driver 5

In the example illustrated in FIG. 17, the spindle lubricator 1 of the machine tool includes a first rotational driver 5, which rotates the rotation body 2 (more specifically, the rotation shaft 20) about the first axis AX1. The first rotational driver 5 may be a first motor. In the example illustrated in FIG. 17, the first rotational driver 5 (more specifically, the first motor) includes a stator 51 and a rotor 53. In this case, when electric current is supplied to the stator 51, an electromagnetic action rotates the rotor 53 about the first axis AX1. In the example illustrated in FIG. 17, the stator 51 is fixed to the housing 4, and the rotor 53 is fixed to the rotation body 2 (more specifically, the rotation shaft 20).

In the example illustrated in FIG. 17, the rotor 53 is disposed in a middle portion 23 of the rotation shaft 20. The rotor 53 is disposed further in the second direction DR2 than the first bearing 31*a*, and is disposed further in the first direction DR1 than the second bearing 36*b*.

In the example illustrated in FIG. 17, the first rotational driver 5 is disposed inside the housing 4. Alternatively, the first rotational driver 5 may be disposed outside the housing 4. For example, the first rotational driver 5, which is disposed outside the housing 4, may be configured to rotate the rotation body 2 via any power transmission mechanism (for example, a gear, a transmission belt, or any mechanism).

Machining Head 10

The spindle lubricator 1 of the machine tool includes the machining head 10. In an example illustrated in FIG. 19, the machining head 10 includes: (1) the rotation body 2, which holds a tool T; (2) the plurality of bearings 3 including the first bearing 31*a* and the second bearing 36*b*; (3) the housing 4, which supports the rotation body 2 to be rotatable about the first axis AX1 via the plurality of bearings 3; and (4) the first rotational driver 5, which rotates the rotation body 2 about the first axis AX1.

Rotation Body 2

In the example illustrated in FIG. 19, the rotation body 2 includes: the rear end portion 22; and the tip end portion 24, which holds the tool T. More specifically, the rotation body 2 (more specifically, the rotation shaft 20) includes: a rotation shaft main body 21; an attachment portion 28 to which the tool T is attached; and a rod-shaped member 291, which is coupled to the attachment portion 28. The rod-shaped member 291 is disposed inside the rotation shaft main body 21. In the example illustrated in FIG. 19, when an attachment portion driver 14 of the machining head 10 presses the rod-shaped member 291 in the first direction DR1, the rod-shaped member 291 and the attachment portion 28 move in the first direction DR1 relative to the rotation shaft main body 21. In this state, it is possible to change the tool T attached to the attachment portion 28 to another tool. After the tool is changed, a bias member 293 (for example, a coned disc spring), which is disposed on the rotation shaft 20, presses the rod-shaped member 291 in the second direction DR2. In this manner, the rod-shaped member 291 and the attachment portion 28 move in the second direction DR2 relative to the rotation shaft main body 21.

Figure 20:
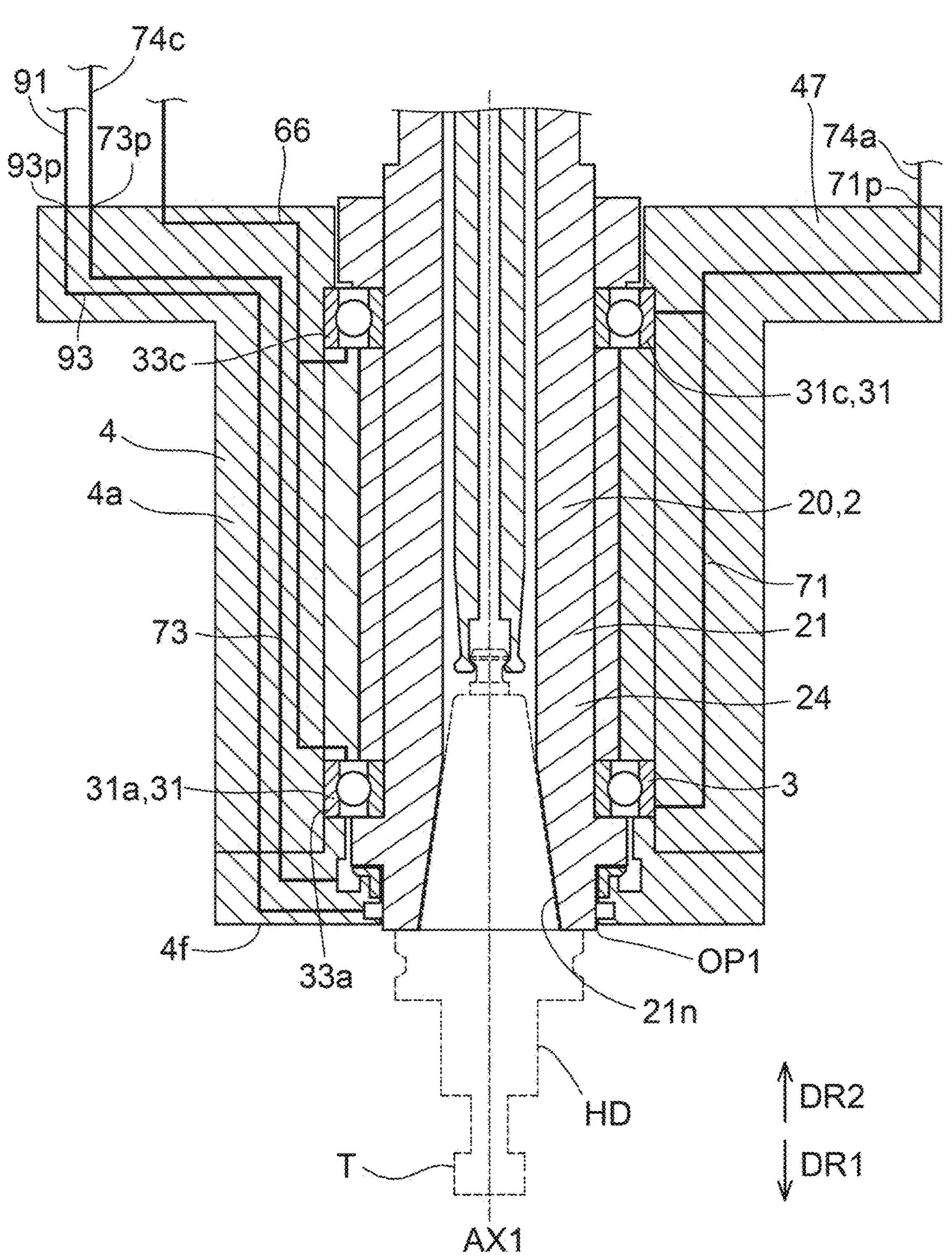
FIG. 20 is a schematic cross-sectional view of a part of the spindle lubricator of the machine tool according to the first modification of the second embodiment, schematically illustrating the part of the spindle lubricator.

In an example illustrated in FIG. 20, the rotation body 2 (more specifically, the rotation shaft main body 21) has an inner circumferential surface 21*n* in contact with the tool holder HD. The inner circumferential surface 21*n* is, for example, a tapered surface having a radius that increases further in the first direction DR1.

Figure 21:
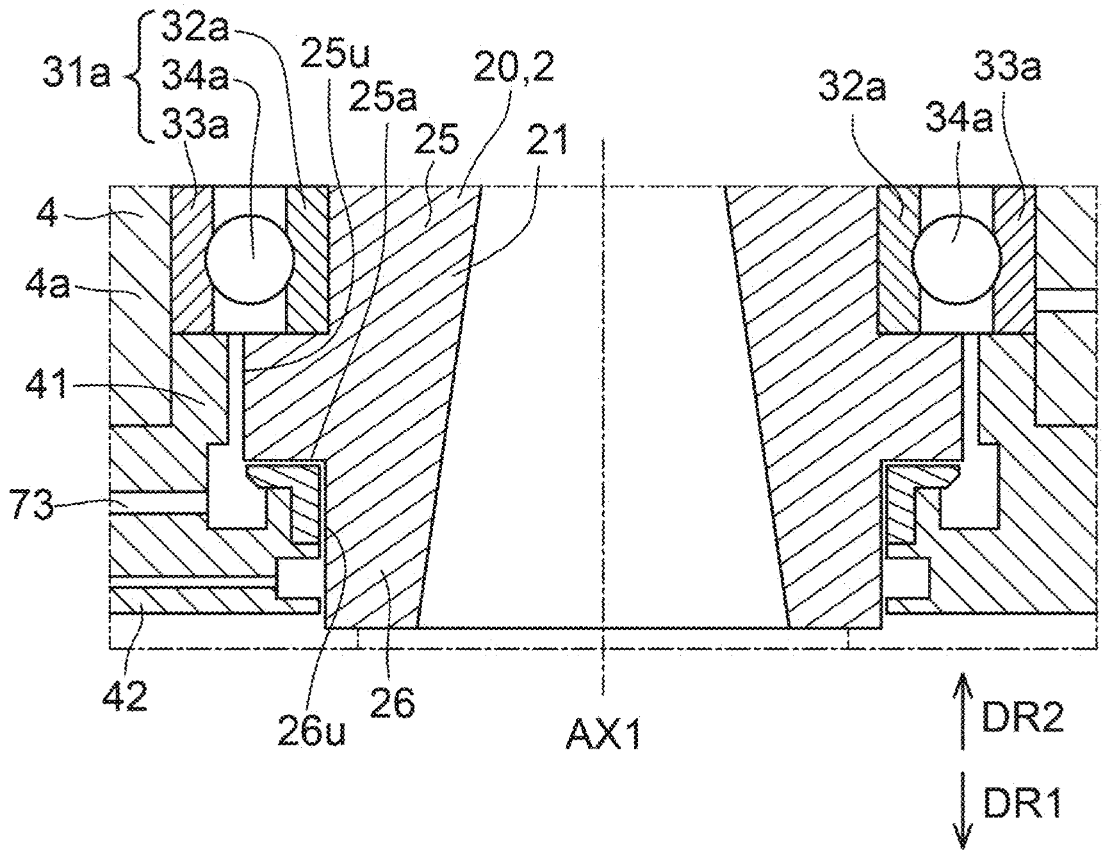
FIG. 21 is a schematic cross-sectional view of a part of the spindle lubricator of the machine tool according to the first modification of the second embodiment, schematically illustrating the part of the spindle lubricator.

In an example illustrated in FIG. 21, the rotation body 2 (more specifically, the rotation shaft 20) includes a first part 25, a second part 26, and a stepped surface 25*a*.

The first part 25 supports the inner ring 32*a* of the first bearing 31*a*. The first part 25 has a first outer circumferential surface 25*u*.

The second part 26 has a second outer circumferential surface 26*u*, which is smaller in diameter than the first outer circumferential surface 25*u*. In other words, the second outer circumferential surface 26*u* of the second part 26 is smaller in diameter than the first outer circumferential surface 25*u* of the first part 25. The second part 26 is disposed further in the first direction DR1 than the first part 25.

The stepped surface 25*a* connects the first outer circumferential surface 25*u* of the first part 25 with the second outer circumferential surface 26*u* of the second part 26.

In the example illustrated in FIG. 21, the first part 25 of the rotation body 2 and the second part 26 of the rotation body 2 are each made up of a part of the rotation shaft main body 21. Alternatively, at least a part of the first part 25 of the rotation body 2 and the second part 26 of the rotation body 2 may be made up of a member other than the rotation shaft main body 21 (for example, an inner ring holding body that is a separate body from the rotation shaft main body 21).

Housing 4

In the example illustrated in FIG. 19, the housing 4 includes: a tip end corresponding part 4*a*; a rear end corresponding part 4*b*; and a middle part 4*c* between the tip end corresponding part 4*b* and the rear end corresponding part 4*c*.

As illustrated in FIG. 20, the tip end corresponding part 4*a* of the housing 4 supports the outer ring of the front bearing 31. In the example illustrated in FIG. 20, the tip end corresponding part 4*a* of the housing 4 supports the outer ring 33*a* of the first bearing 31*a* and the outer ring 33*c* of the third bearing 31*c*.

The housing 4 may include a flange 47, which projects outward. In the example illustrated in FIG. 20, the flange 47 is disposed on the tip end corresponding part 4*a* of the housing 4. An outlet port 71*p* of the first collection flow channel 71 may be provided on the flange 47. In the example illustrated in FIG. 20, the above-described first pipe line 74*a* is connected with the outlet port 71*p*. An outlet port 73*p* of the third collection flow channel 73 may be provided on the flange 47. In the example illustrated in FIG. 20, the above-described third pipe line 74*c* is connected with the outlet port 73*p*. An inlet port 93*p* of the air supply flow channel 93 may be provided on the flange 47. In the example illustrated in FIG. 20, the above-described air supply pipe 91 is connected with the inlet port 93*p*. In the example illustrated in FIG. 20, the supply flow channel 66 is provided in the housing 4. In the example illustrated in FIG. 20, the supply flow channel 66 supplies the fluid mixture containing oil and air (more specifically, oil air) to the front bearing including the first bearing 31*a* and the third bearing 31*c*.

The rear end corresponding part 4*b* of the housing 4 supports the outer ring of the rear bearing 36. In the example illustrated in FIG. 19, the rear end corresponding part 4*b* of the housing 4 supports an outer ring 37*b* of the second bearing 36*b*. The rear end corresponding part 4*b* may include an end plate 40*b*, which is disposed at an end in the second direction DR2 of the housing 4.

In the example illustrated in FIG. 19, the middle part 4*c* of the housing 4 includes a side wall 40*c* having a cylindrical shape. The middle part 4*c* of the housing 4 (more specifically, the side wall 40*c* having a cylindrical shape) may support the above-described stator 51.

In the example illustrated in FIG. 21, the housing 4 (more specifically, the tip end corresponding part 4*a* of the housing 4) includes a third part 41 and a fourth part 42.

The third part 41 supports the outer ring 33*a* of the first bearing 31*a*. As illustrated in FIG. 22, a first gap G1 is formed between the first part 25 of the rotation body 2 and the third part 41 of the housing. In an example illustrated in FIG. 22, the oil E that has passed through the first bearing 31*a* is present in the first gap G1. In the first gap G1, the oil E may be present in a state of oil air, may be present in a state of oil mist, or may be present in a state of liquid-state oil. In the example illustrated in FIG. 22, the first gap G1 is linear in a vertical cross-section including the first axis AX1. Alternatively, the first gap G1 may have a labyrinth shape in the vertical cross-section including the first axis AX1. Alternatively or additionally, as illustrated in FIG. 23, a cutout CT may be formed on a part of the surface that defines the first gap G1. Such a cutout CT may be formed on the first outer circumferential surface 25*u* of the rotation body 2, or may be formed on the surface of the third part 41 of the housing 4.

The fourth part 42 defines an annular receiving space SP, which receives the oil E from the first gap G1. In the annular receiving space SP, the oil E may be present in the state of oil air, may be present in the state of oil mist, or may be present in the state of liquid-state oil. The shape of the annular receiving space SP is not limited, and the annular receiving space SP has any shape.

In an example illustrated in FIG. 23, the above-described first gap G1 and the annular receiving space SP are disposed on a straight line LN parallel to the first axis AX1. In this case, the oil E present in the first gap G1 is smoothly guided to the annular receiving space SP.

In the example illustrated in FIG. 23, the fourth part 42 includes an opening portion 45, which guides the oil E from the annular receiving space SP to the third collection flow channel 73.

Figure 24:
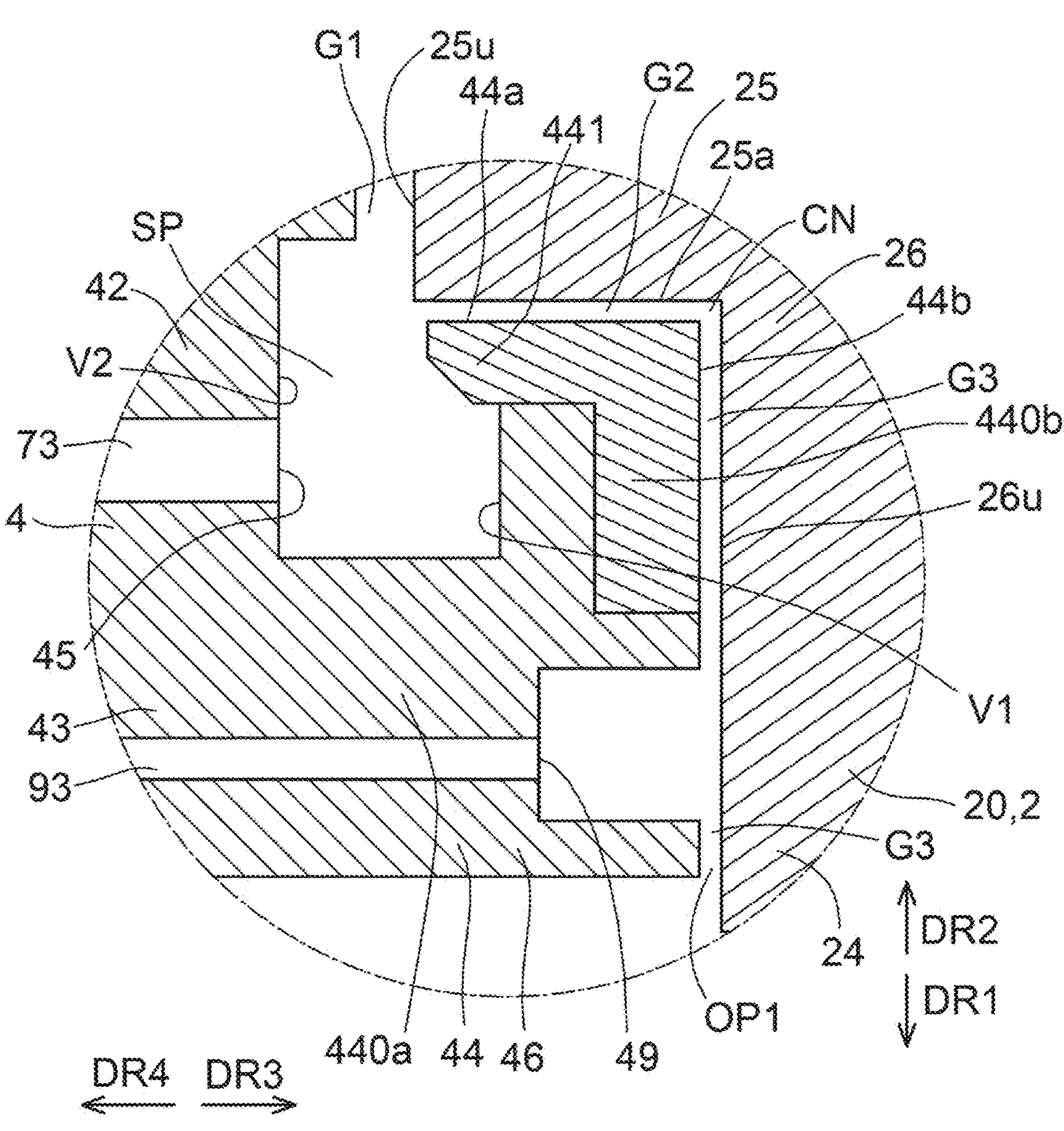
FIG. 24 is a schematic cross-sectional view of a part of the spindle lubricator of the machine tool according to the first modification of the second embodiment, schematically illustrating the part of the spindle lubricator.

In an example illustrated in FIG. 24, a second gap G2, which is in fluid communication with the first gap G1, is formed between the housing 4 and the stepped surface 25*a* of the rotation body 2. In addition, a third gap G3, which is in fluid communication with the second gap G2, is formed between the housing 4 and the second outer circumferential surface 26*u* of the rotation body 2.

A path extending from the first gap G1 to the outside of the machining head 10 is assumed. Such a path can cause leakage of the oil. In an example illustrated in FIG. 24, the second gap G2, which is present between the housing 4 and the stepped surface 25*a*, is present in the path extending from the first gap G1 to the outside of the machining head 10. Thus, the presence of the second gap G2 eliminates or minimizes leakage of the oil to the outside of the machining head 10 through the above-described path.

In the example illustrated in FIG. 24, the extending direction of the first gap G1 is different from the extending direction of the second gap G2. Thus, the oil in the first gap G1 moving toward the second gap G2 is eliminated or minimized. For example, entering of the oil moving downward from the first gap G1 into the second gap G2 is eliminated or minimized. In the example illustrated in FIG. 24, the extending direction of the first gap G1 corresponds to the first direction DR1, and the extending direction of the second gap G2 corresponds to the radially inward direction DR3 (more specifically, a direction perpendicular to the first axis AX1 and toward the first axis AX1).

In the example illustrated in FIG. 24, the third gap G3 communicates with the second gap G2 through a corner portion CN. In addition, the extending direction of the third gap G3 is different from the extending direction of the second gap G2. In the example illustrated in FIG. 24, the extending direction of the third gap G3 corresponds to the first direction DR1, and the extending direction of the second gap G2 corresponds to the radially inward direction DR3 (more specifically, the direction perpendicular to the first axis AX1 and toward the first axis AX1).

Annular Projection Portion 44

Figure 25:
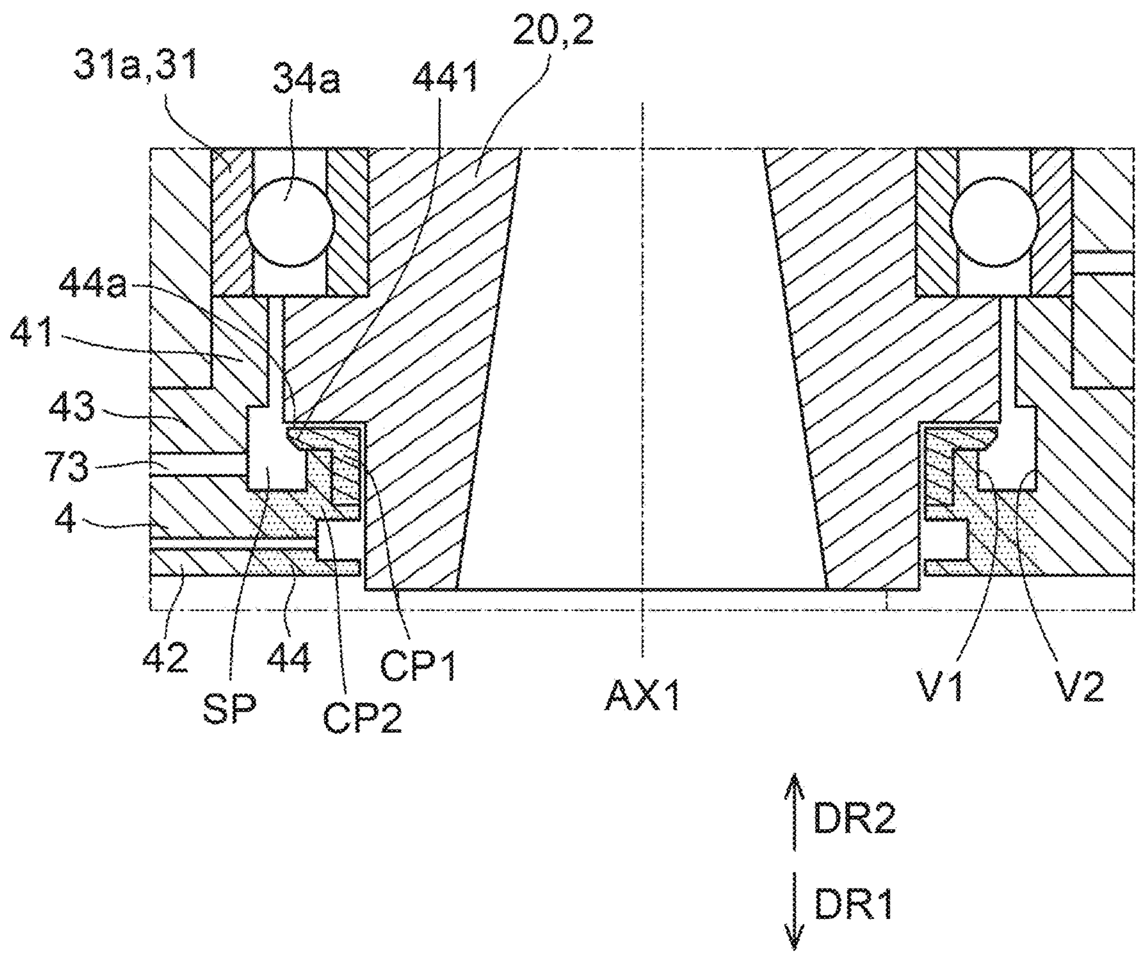
FIG. 25 is a schematic cross-sectional view of a part of the spindle lubricator of the machine tool according to the first modification of the second embodiment, schematically illustrating the part of the spindle lubricator.
Figure 26:
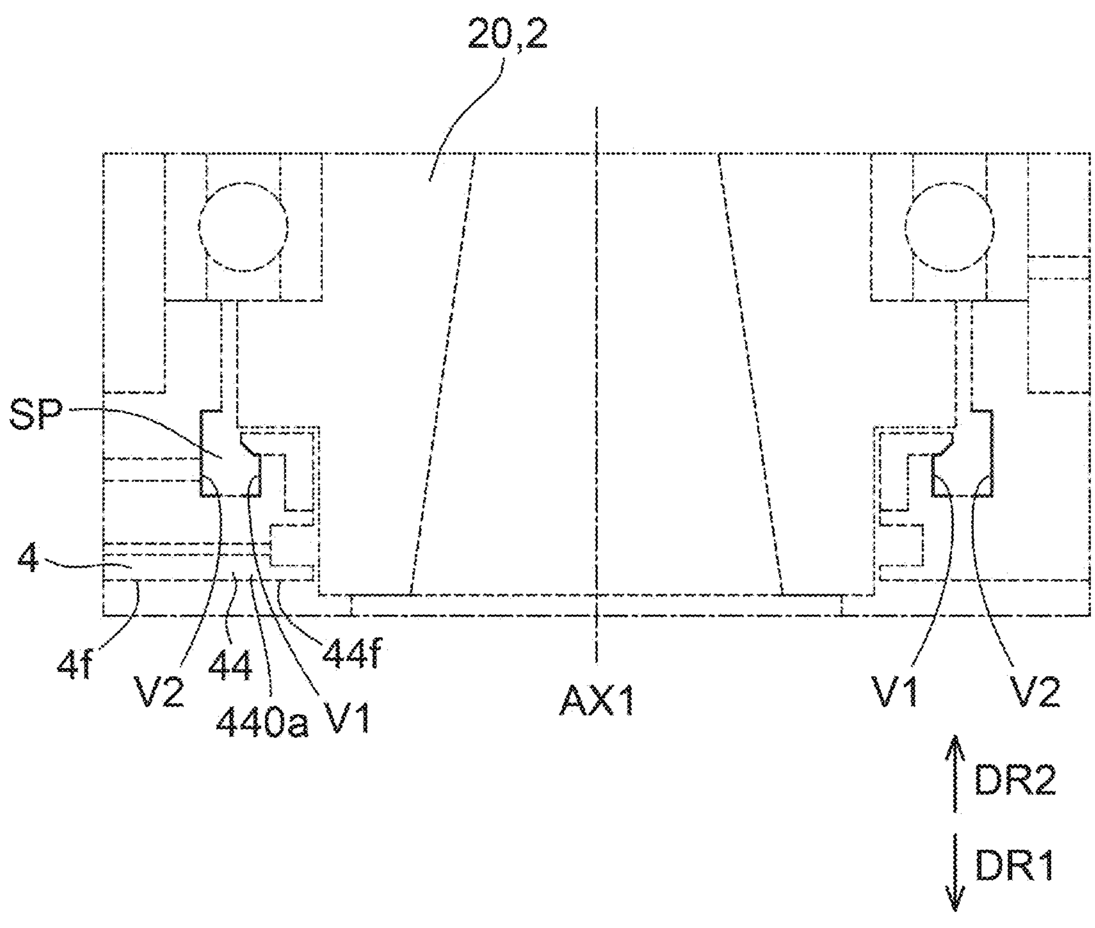
FIG. 26 is a view for describing a first annular groove and a second annular groove.

In an example illustrated in FIG. 25, the fourth part 42 includes: a foot portion 43, which is continuous with the third part 41; and an annular projection portion 44, which projects from the foot portion 43 in a direction toward the first axis AX1. It is to be noted that in FIG. 25, in order to facilitate understanding of the shape of the annular projection portion 44, the annular projection portion 44 is hatched with dots.

As illustrated in FIG. 24, the annular protrusion portion 44 has: a first surface 44*a*, which faces the stepped surface 25*a*; and a second surface 44*b*, which faces the outer circumferential surface (in other words, the second outer circumferential surface 26*u*) of the second part 26 of the rotation body 2.

Additionally, the annular projection portion 44 may include an annular projection 441, which projects in a direction away from the first axis AX1. The annular projection 441 faces both the stepped surface 25*a* and the annular receiving space SP. In a case where the fourth part 42 (more specifically, the annular projection portion 44 of the fourth part 42) includes the annular projection 441, which projects in the direction away from the first axis AX1, the oil E that has entered the annular receiving space SP hardly flows back toward the second gap G2. Therefore, leakage of the oil from the gap between the rotation body 2 and the tip end portion 46 of the housing 4 to the outside of the machining head 10 is effectively eliminated or minimized.

In the example illustrated in FIG. 25, the housing 4 includes: a first component CP1 (more specifically, a first component CP1 having an annular shape) including the above-described annular projection 441; and a second component CP2 (more specifically, a second component CP2 having an annular shape), which supports the first component CP1. In a case where the first component CP1 including the annular projection 441 is a different component from the second component CP2, design freedom of the internal shape (for example, flexibility in the shape of the annular receiving space SP) in the housing 4 increases.

In the example illustrated in FIG. 25, the first component CP1 and the second component CP2 each have a part that faces the annular receiving space SP. The first component CP1 may have a substantially letter L shape in the vertical cross-section that passes through the first axis AX1, or may have any other shape. The second component CP2 may be an end plate disposed at an end in the first direction DR1 of the housing 4.

In the example illustrated in FIG. 24, the annular projection portion 44 includes: a first wall 440*a*, which defines a bottom surface of the annular receiving space SP (in other words, an end face in the first direction DR1 of the annular receiving space SP); and a second wall 440*b*, which defines a second surface 44*b* facing the second outer circumferential surface 26*u* of the rotation body 2.

In the example illustrated in FIG. 24, the first wall 440*a* is an annular wall that is continuous with the foot portion 43 of the fourth part 42 and that extends from the foot portion 43 in the radially inward direction DR3. In addition, the second wall 440*b* is an annular wall that is continuous with an inner edge portion of the first wall 440*a* and that extends in the second direction DR2 from the inner edge portion. Further, the annular projection 441 is continuous with an end portion in the second direction DR2 of the second wall 440*b*, and projects in the radially outward direction DR4 from the end portion.

The annular protrusion portion 44 may include a first annular groove V1. In the example illustrated in FIG. 24, the first annular groove V1 is a groove that faces the annular receiving space SP and that is recessed in the radially inward direction DR3. The first annular groove V1 prevents, or eliminates or minimizes flowing back of the oil in the annular receiving space SP toward the second gap G2.

In the example illustrated in FIG. 24, the fourth part 42 of the housing 4 includes a second annular groove V2. The second annular groove V2 is a groove that faces the annular receiving space SP and that is recessed in the radially outward direction DR4 (in other words, a direction away from the first axis AX1). In the example illustrated in FIG. 24, the second annular groove V2 is disposed in the fourth part 42 of the housing 4 so as to face the first annular groove V1.

In FIG. 26, in order to facilitate understanding of the shapes of the first annular groove V1 and the second annular groove V2, portions other than the first annular groove V1 and the second annular groove V2 are indicated by broken lines, and the first annular groove V1 and the second annular groove V2 are indicated by solid lines. In an example illustrated in FIG. 26, the oil is receivable in both the first annular groove V1 and the second annular groove V2. In this case, the annular receiving space SP includes a space defined by the first annular groove V1 and a space defined by the second annular groove V2, and it becomes possible to increase the entire volume of the annular receiving space SP.

In the example illustrated in FIG. 26, the annular projection portion 44 has a third surface 44*f*, which constitutes a part of an end face 4*f* of the housing 4 in the first direction DR1. Such a third surface 44*f* is a surface at one end of the above-described first wall 440*a* in the first direction DR1.

Air Injection Opening OP1 and Discharge Opening 49

In the example illustrated in FIG. 24, the air injection opening OP1, which communicates with the third gap G3, is formed between the tip end portion 46 of the housing 4 and the rotation body 2.

In addition, in the housing 4, the air supply flow channel 93 through which the fourth air supplied from the air supply pipe 91 flows, and the discharge opening 49, which discharges the fourth air, are formed. The discharge opening 49 discharges the fourth air received from the air supply flow channel 93 to the third gap G3 so as to form a first air flow toward the second gap G2 from the third gap G3 and a second air flow toward the air injection opening OP1 from the third gap G3.

The fourth air injected from the air injection opening OP1 prevents foreign matters such as cutting chips from entering the machining head 10 through the third gap G3 or any gap. More specifically, the fourth air injected from the air injection opening OP1 forms the air curtain AC around the tool T or the tool holder HD. Such an air curtain prevents foreign matters such as the cutting chips from entering the machining head 10 through the third gap G3 or any gap.

In the example illustrated in FIG. 24, the fourth air that flows toward the second gap G2 from the third gap G3 prevents the oil E from entering the second gap G2 from the first gap G1 or the annular receiving space SP. In addition, the fourth air that flows toward the second gap G2 from the third gap G3 pushes back the oil that has entered the second gap G2 toward the annular receiving space SP.

It is to be noted that at least part of the fourth air that flows toward the second gap G2 from the third gap G3 reaches the annular receiving space SP. The air that has reached the annular receiving space SP is collected through the third collection flow channel 73.

The air that has not been collected by the first collection flow channel 71, the second collection flow channel 72, the third collection flow channel 73, or any flow channel (or the air containing a small amount of oil) is discharged to the outside of the machining head 10 through a gap in the machining head 10 (see the broken line arrows in FIG. 19).

Third Embodiment

Figure 28:
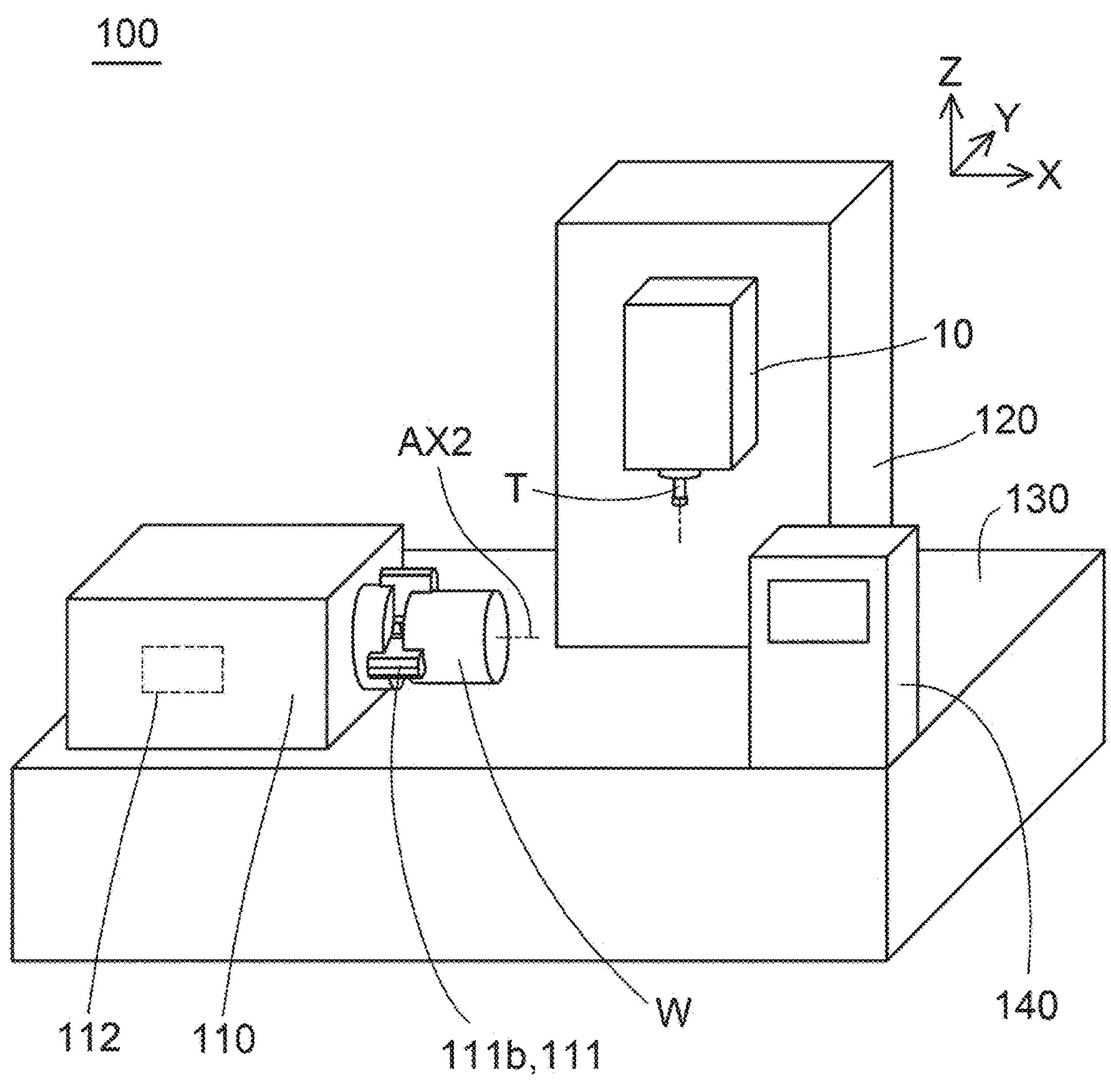
FIG. 28 is a schematic perspective view of another example of the machine tool according to the third embodiment, schematically illustrating another example of the machine tool.
Figure 29:
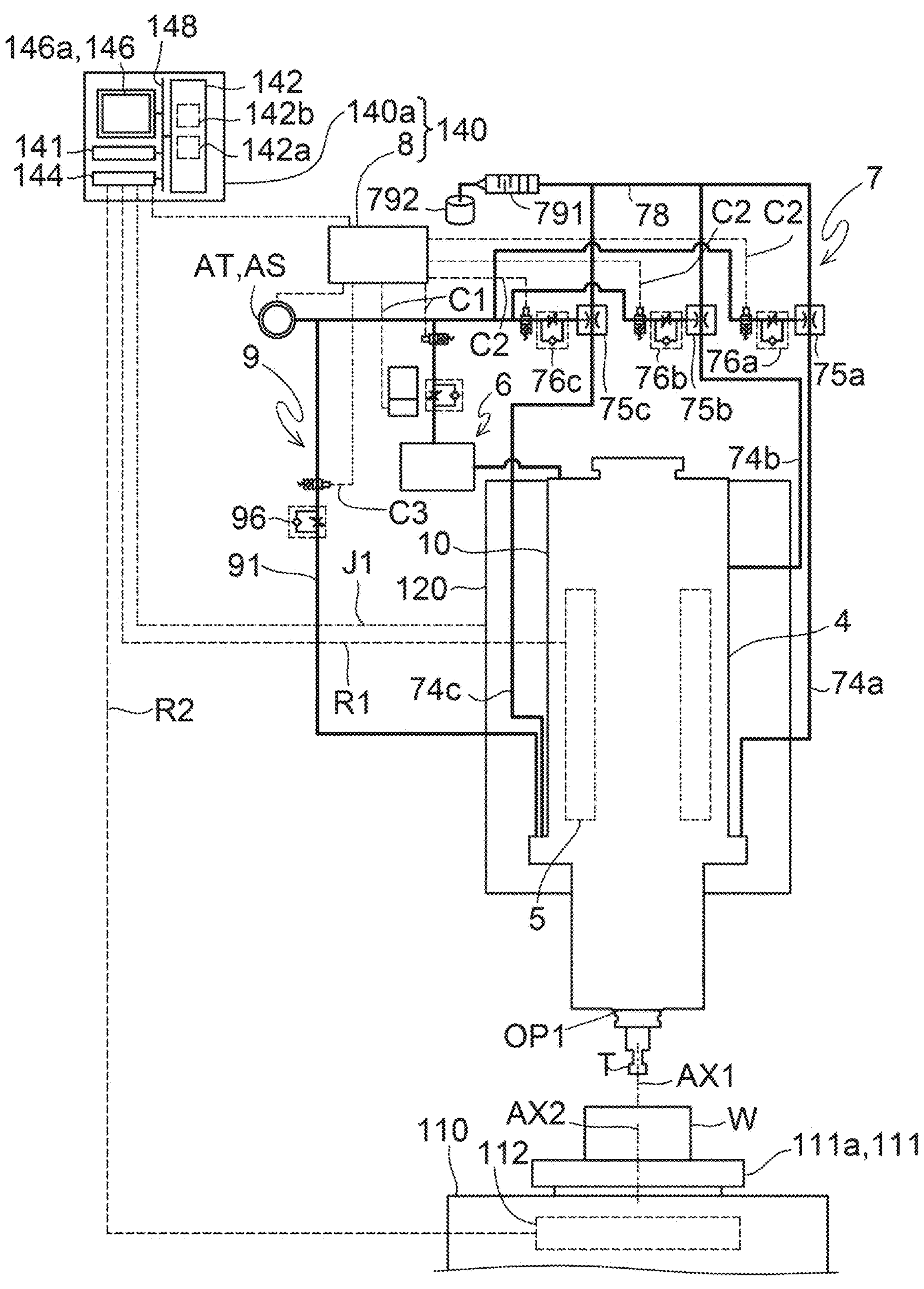
FIG. 29 is a schematic illustration of a state in which a controller is capable of controlling a plurality of pieces of equipment to be controlled.
Figure 30:
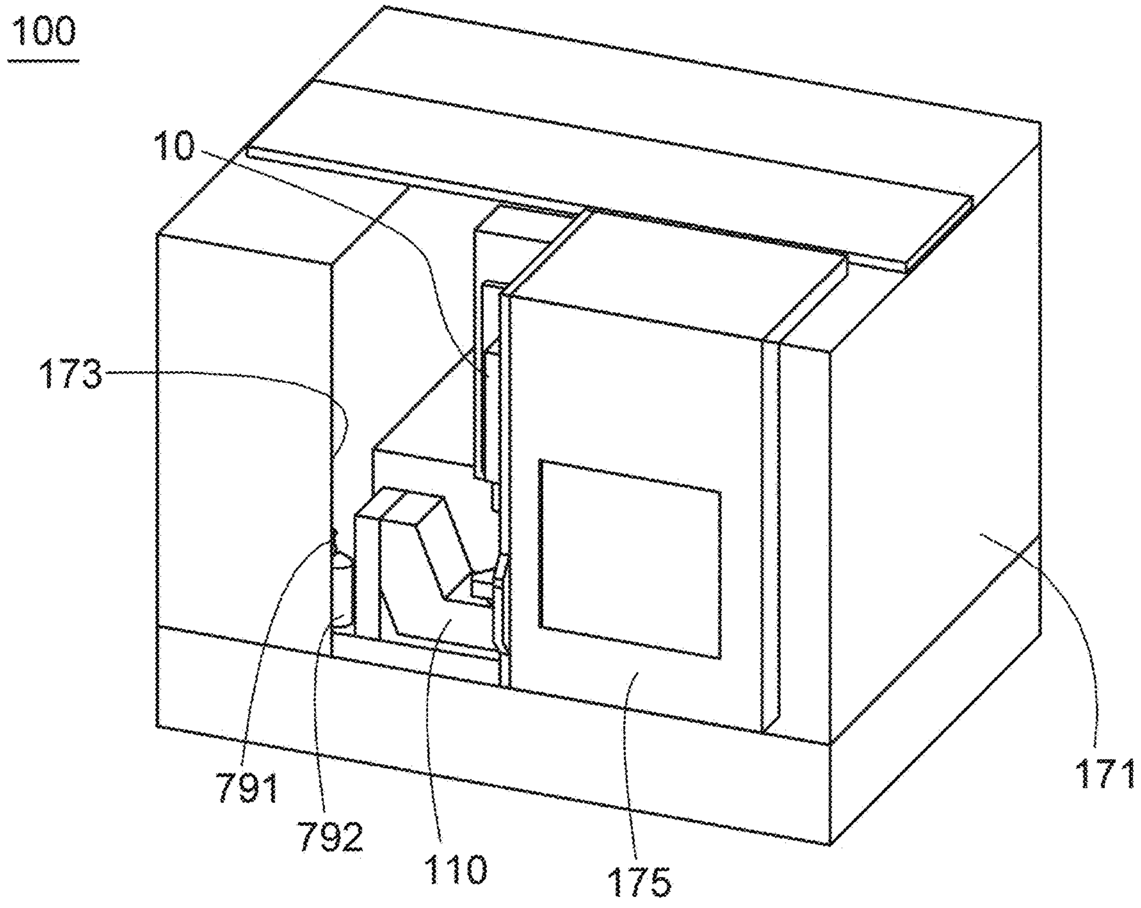
FIG. 30 is a view for describing an example of an arrangement of a collection container.
Figure 31:
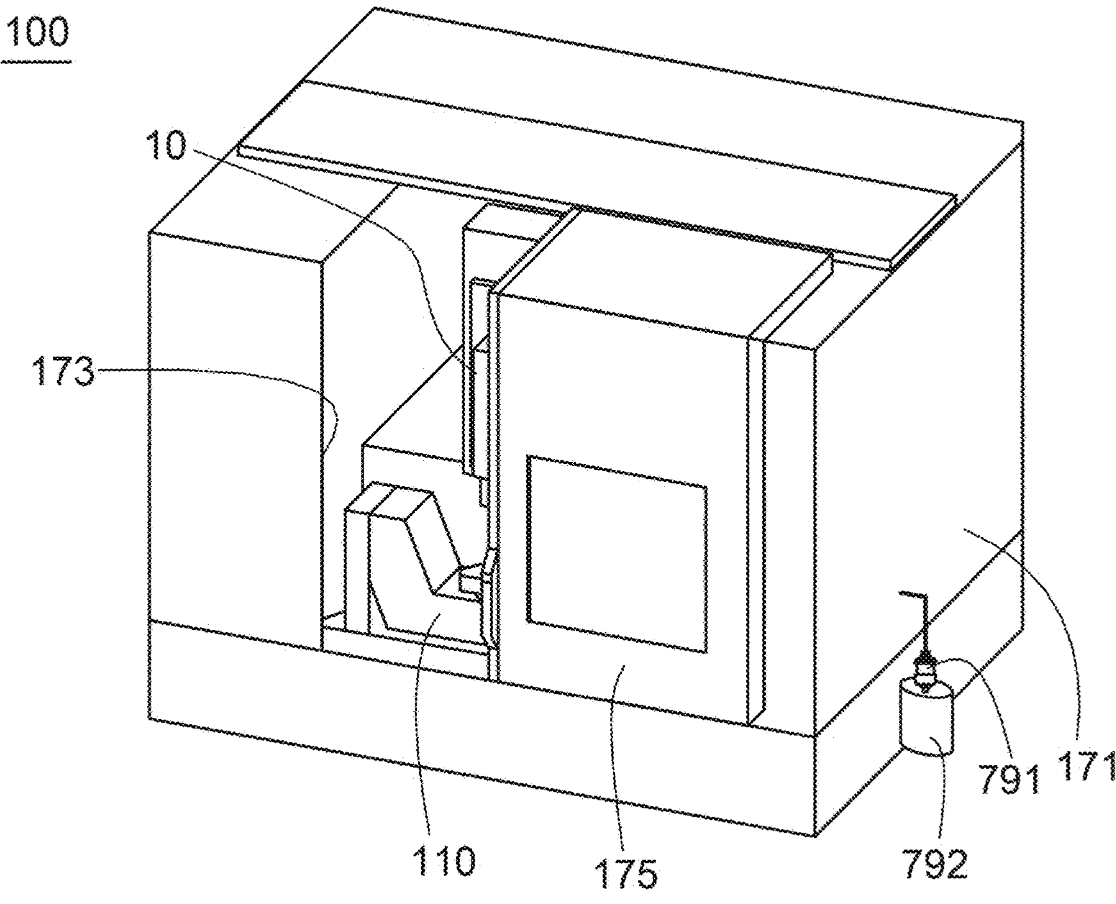
FIG. 31 is a view for describing another example of the arrangement of the collection container.

A machine tool 100 according to a third embodiment will be described with reference to FIGS. 1 to 31. FIG. 27 is a schematic perspective view of an example of the machine tool 100 according to a third embodiment, schematically illustrating the example of the machine tool. FIG. 28 is a schematic perspective view of another example of the machine tool 100 according to the third embodiment, schematically illustrating another example of the machine tool. FIG. 29 is a schematic illustration of a state in which a controller 140 is capable of controlling a plurality of pieces of equipment to be controlled. FIG. 30 is a view for describing an example of an arrangement of a collection container 792. FIG. 31 is a view for describing another example of the arrangement of the collection container 792.

In the third embodiment, differences from the first embodiment and the second embodiment will be mainly described. On the other hand, in the third embodiment, repeated descriptions of the matters that have been described in the first embodiment or the second embodiment will be omitted. Therefore, it is needless to say that the matters that have been described in the first embodiment or the second embodiment are applicable to the third embodiment, even though they are not explicitly described in the third embodiment.

As illustrated in FIGS. 27 and 29, the machine tool 100 according to the third embodiment includes: a machining head 10; a fluid mixture supplier 6; a collector 7; a workpiece holder 110, which supports a workpiece W; a mover 120, which moves the machining head 10 relative to the workpiece holder 110; and a controller 140.

Since the machining head 10, the fluid mixture supplier 6, and the collector 7 have been described in the first embodiment or the second embodiment, the repeated descriptions of these configurations will be omitted.

Workpiece Holder 110

In an example illustrated in FIG. 27, the workpiece holder 110 includes: a support 111 (more specifically, a table 111*a*), which supports the workpiece W; and a second rotational driver 112, which rotates the support 111 (more specifically, the table 111*a*) about a second axis AX2. The workpiece holder 110 may include a tilter 113, which tilts the table 111*a* about an axis AX3, which is perpendicular to the second axis AX2.

Alternatively, as illustrated in FIG. 28, the workpiece holder 110 may include: a chuck 111*b*, which holds the workpiece W; and a second rotational driver 112, which rotates the chuck 111*b* about the second axis AX2.

Mover 120

The mover 120 moves the machining head 10 relative to the workpiece holder 110. The mover 120 may be an apparatus capable of moving the machining head 10 three-dimensionally. The mover 120 may be capable of moving the machining head 10 along Z axis parallel to the vertical direction. The mover 120 may be capable of moving the machining head 10 along X axis parallel to the horizontal direction. The mover 120 may also be capable of moving the machining head 10 along Y axis perpendicular to both X axis and Z axis. In the examples illustrated in FIGS. 27 and 28, the machining head 10 is supported by a base 130 via the mover 120.

Controller 140

The controller 140 controls at least the first rotational driver 5, the fluid mixture supplier 6, and the mover 120. Additionally, the controller 140 may control the collector 7.

As illustrated in FIG. 29, the controller 140 includes: a hardware processor 141 (hereinafter, simply referred to as the "processor 141"); a memory 142; a communication circuit 144; and an inputter 146 (for example, a display 146*a* equipped with a touch panel). The processor 141, the memory 142, the communication circuit 144, and the inputter 146 are connected with one another through a bus 148.

The memory 142 stores data 142*a*, which is necessary for machining a workpiece, and a program 142*b* for operating each component of the machine tool 100. The memory 142 is a storage medium to be readable by the processor 141 of the controller 140. The memory 142 may be, for example, a non-volatile or volatile semiconductor memory such as a RAM, a ROM, or a flash memory, may be a magnetic disk, or may be a memory in any other format.

The inputter 146 is not limited to the display 146*a* which is equipped with the touch panel. For example, the controller 140 may include the inputter 146 such as a button, a switch, a lever, a pointer, or a keyboard, and a display for displaying data that has been input into the inputter 146 or any other information. The memory 142 may also be distributed in a plurality of locations. For example, the memory 142 may be partially included in a cloud storage.

A plurality of computers may also cooperate with each other to function as the controller 140. In an example illustrated in FIG. 29, the controller 140 includes: a main controller 140*a*; and the above-described controller 8. In other words, the main controller 140*a* and the controller 8 cooperate with each other to function as the controller 140. The controller 8 operates, based on a command received from the main controller 140*a*. It is to be noted that in a case where the functions of the controller 8 that have been described in the first embodiment or the second embodiment are incorporated in the main controller 140*a*, the controller 8 is omitted. In other words, the main controller 140*a* itself functions as the controller 8.

In the example illustrated in FIG. 29, when the controller 140 transmits the first group of control commands C1 to the fluid mixture supplier 6, the fluid mixture supplier 6, which receives the first group of control commands C1, supplies the fluid mixture to the plurality of bearings 3 at the first flow rate. In this manner, the fluid mixture containing oil and air is supplied to the plurality of bearings 3.

In the example illustrated in FIG. 29, when the controller 140 transmits the second group of control commands C2 to the collector 7, the collector 7, which receives the second group of control commands C2, collects the oil-containing fluid.

For example, the collector 7, which receives the second group of control commands C2, supplies the first air to the first ejector 75*a*. The first air generates negative pressure in the first pipe line 74*a*, and such negative pressure sucks the first oil-containing fluid from the first collection flow channel 71 through the first pipe line 74*a*. In a case where the valve aperture of the first flow control valve 76*a* is set to a first valve aperture, the insufficient lubrication of the bearings due to the suction force of the first ejector 75*a* does not occur.

For example, the collector 7, which receives the second group of control commands C2, supplies the second air to the second ejector 75*b*. The second air generates negative pressure in the second pipe line 74*b*, and such negative pressure sucks the second oil-containing fluid from the second collection flow channel 72 through the second pipe line 74*b*. In a case where the valve aperture of the second flow control valve 76*b* is set to a second valve aperture, the insufficient lubrication of the bearings due to the suction force of the second ejector 75*b* does not occur.

For example, the collector 7, which receives the second group of control commands C2, supplies the third air to the third ejector 75*c*. The third air generates negative pressure in the third pipe line 74*c*, and such negative pressure sucks the third oil-containing fluid from the third collection flow channel 73 through the third pipe line 74*c*.

In the example illustrated in FIG. 29, when the controller 140 transmits a control command C3 to the air supplier 9, the air supplier 9, which receives the control command C3, supplies the fourth air to the discharge opening 49, which is formed in the housing 4.

The fourth air discharged from the discharge opening 49 is partially injected from the air injection opening OP1. An air curtain is formed of the air injected from the air injection opening OP1. In addition, the fourth air discharged from the discharge opening 49 is partially collected by the collector 7 through the third collection flow channel 73.

In the example illustrated in FIG. 29, when the controller 140 transmits a first movement command J1 to the mover 120, the mover 120, which receives the first movement command J1, moves the machining head 10 relative to the workpiece holder 110. In this manner, it becomes possible to move the tool T held by the rotation body 2 toward the workpiece W.

In the example illustrated in FIG. 29, when the controller 140 transmits a first rotation command R1 to the first rotational driver 5, the first rotational driver 5, which receives the first rotation command R1, rotates the rotation body 2 about the first axis AX1. In this manner, it becomes possible to machine the workpiece W with the tool T held by the rotation body 2.

The controller 140 may be capable of controlling the second rotational driver 112. For example, when the controller 140 transmits a second rotation command R2 to the second rotational driver 112, the second rotational driver 112, which receives the second rotation command R2, rotates the support 111, which supports the workpiece W, about the second axis AX2.

When the processor 141 of the controller 140 executes the program 142*b* stored in the memory 142, the controller 140 generates a control command. In addition, the communication circuit 144 transmits such a control command to the equipment to be controlled (more specifically, the first rotational driver 5, the mover 120, the fluid mixture supplier 6, the collector 7, the air supplier 9, and the second rotational driver 112). In this manner, the processor 141 executes the program 142*b*, and thus the controller 140 is capable of controlling the first rotational driver 5, the mover 120, the fluid mixture supplier 6, the collector 7, the air supplier 9, and the second rotational driver 112.

Arrangement of Collection Container 792

In an example illustrated in FIG. 30, in a plan view, the machine tool 100 includes: an outer wall 171, which surrounds the workpiece holder 110 and the machining head 10; an opening portion 173, which is formed on the outer wall 171, and through which a workpiece to be carried into the workpiece holder 110 passes; and a door 175, which opens and closes the opening portion 173.

In the example illustrated in FIG. 30, the collection container 792 is disposed at a position within reach of an operator from the outside of the machine tool through the opening portion 173. In other words, the collection container 792 is disposed in the vicinity of the opening portion 173. In this case, the operator is able to easily take out the drain oil that has been collected in collection container 792 from machine tool 100. Alternatively, as illustrated in FIG. 31, the collection container 792 may be disposed outside the outer wall 171.

In a case where the collection container 792 is disposed in the vicinity of the opening portion 173, or in a case where it is disposed outside the outer wall 171, the pipe line extending to the collection container 792 from the machining head 10 is long. As the pipe line becomes longer, the pressure loss of the fluid that flows through the pipe line increases, and it becomes more difficult to optimize the lubrication in each of the plurality of bearings. According to the third embodiment, it is possible to individually set the suction force to be exerted by each ejector. Therefore, even in a case where the pipe line to the collection container 792 is long, it becomes possible to optimize the lubrication in each of the plurality of bearings by appropriately setting each suction force. In particular, by setting the valve apertures of the flow control valves (75*a*, 75*b*, and the like) in consideration of the above-described first condition CD1 and second condition CD2 (or the above-described third condition CD3 and fourth condition CD4), it becomes possible to easily and appropriately set each suction force to be exerted by each ejector.

Use Method of Machine Tool

Figure 32:
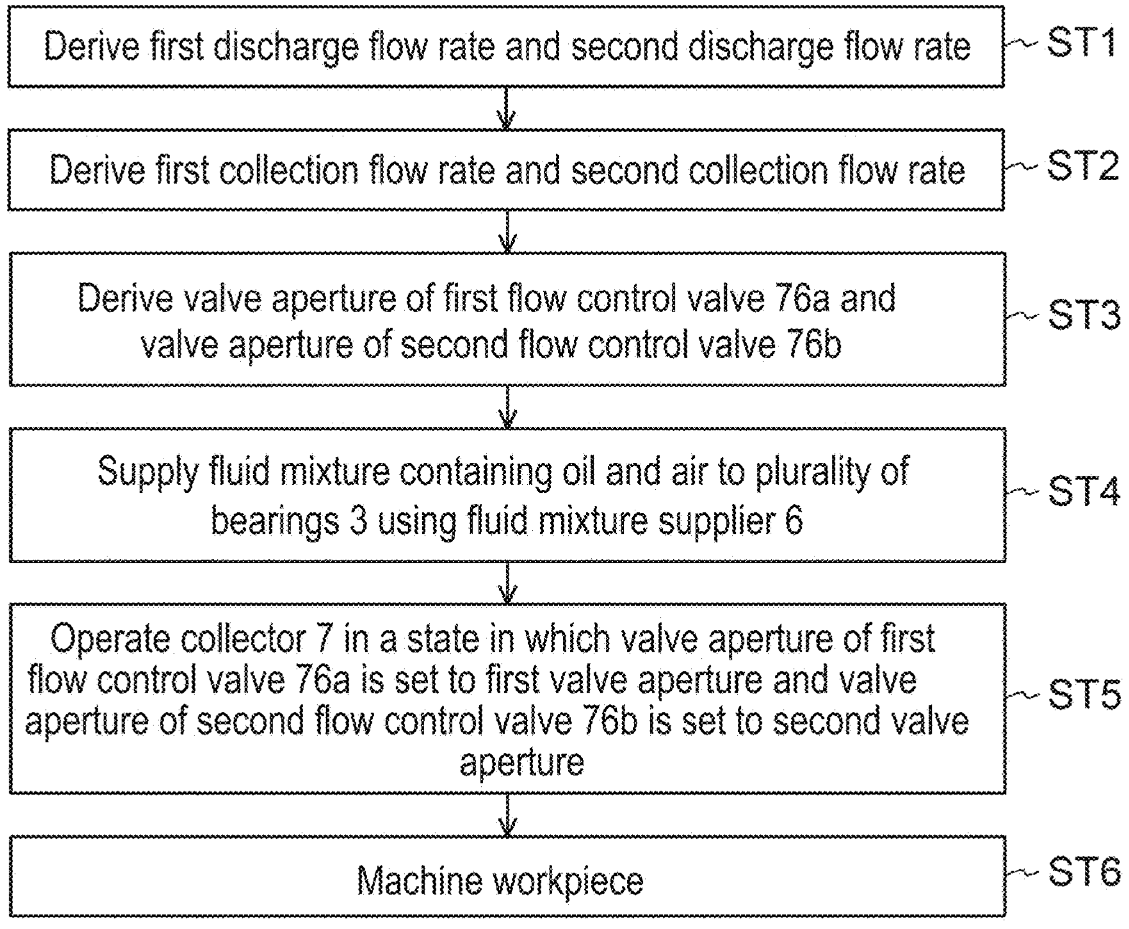
FIG. 32 is a flowchart of an example of a use method of a machine tool according to one embodiment.

A use method of a machine tool according to one embodiment will be described with reference to FIGS. 1 to 32. FIG. 32 is a flowchart of an example of the use method of the machine tool according to one embodiment.

The machine tool used in the use method of the machine tool is, for example, the machine tool 100 according to the third embodiment. Since the machine tool 100 and the constituent elements of the machine tool 100 have been described in the first embodiment to the third embodiment, repeated descriptions of the machine tool 100 and the constituent elements of the machine tool 100 will be omitted.

In a first step ST1, the above-described first discharge flow rate and the above-described second discharge flow rate are derived. The first step ST1 is a discharge flow rate derivation step.

Under the above-described second condition CD2 (see FIG. 5 or FIG. 9), the discharge flow rate derivation step (first step ST1) includes deriving a first discharge flow rate through measurement or simulation, in a case where the first discharge flow rate is defined as a flow rate of the first oil-containing fluid discharged to the outside of the first collection flow channel 71 (for example, to the outside of the housing 4) from the first collection flow channel 71.

Under the above-described second condition CD2 (see FIG. 5 or FIG. 9), the discharge flow rate derivation step (first step ST1) includes deriving a second discharge flow rate through measurement or simulation, in a case where the second discharge flow rate is defined as a flow rate of the second oil-containing fluid discharged to the outside of the second collection flow channel 72 (for example, to the outside of the housing 4) from the second collection flow channel 72.

It is to be noted that in a case where the machine tool 100 includes the third collection flow channel 73, the air supply flow channel 93, and the air injection opening OP1, the discharge flow rate derivation step (first step ST1) may include deriving the first discharge flow rate through measurement or simulation, in the case where the first discharge flow rate is defined as a flow rate of the first oil-containing fluid discharged to the outside of the first collection flow channel 71 (for example, to the outside of the housing 4) from the first collection flow channel 71, under the above-described fourth condition CD4 (see FIG. 16, and it is to be noted that the fourth condition CD4 is an aspect of the second condition CD2). In addition, under the above-described fourth condition CD4 (see FIG. 16), the discharge flow rate derivation step (first step ST1) may include deriving the second discharge flow rate through measurement or simulation, in the case where the second discharge flow rate is defined as a flow rate of the second oil-containing fluid discharged to the outside of the second collection flow channel 72 (for example, to the outside of the housing 4) from the second collection flow channel 72.

In a second step ST2, the above-described first collection flow rate and the above-described second collection flow rate are derived. The second step ST2 is a collection flow rate derivation step.

Under the above-described first condition CD1 (see FIG. 4 or FIG. 8), the collection flow rate derivation step (second step ST2) includes deriving a first collection flow rate through measurement or simulation, in a case where the first collection flow rate is defined as a flow rate of the first oil-containing fluid flowing through the first pipe line 74*a*.

Under the above-described first condition CD1 (see FIG. 4 or FIG. 8), the collection flow rate derivation step (second step ST2) includes deriving a second collection flow rate through measurement or simulation, in a case where the second collection flow rate is defined as a flow rate of the second oil-containing fluid flowing through the second pipe line 74*b*.

It is to be noted that in a case where the machine tool 100 includes the third collection flow channel 73, the air supply flow channel 93, and the air injection opening OP1, the first collection flow rate derivation step (second step ST2) may include deriving the first collection flow rate through measurement or simulation, in a case where the first collection flow rate is defined as a flow rate of the first oil-containing fluid flowing through the first pipe line 74*a*, under the above-described third condition CD3 (see FIG. 15, and it is to be noted that the third condition CD3 is an aspect of the first condition CD1). Further, under the above-described third condition CD3 (see FIG. 15), the collection flow rate derivation step (second step ST2) may include deriving the second collection flow rate through measurement or simulation, in a case where the second collection flow rate is defined as a flow rate of the second oil-containing fluid flowing through the second pipe line 74*b*.

In a third step ST3, the valve aperture of the first flow control valve 76*a* and the valve aperture of the second flow control valve 76*b* are derived. The third step ST3 is a valve aperture derivation step.

The valve aperture derivation step (third step ST3) includes deriving the first valve aperture of the first flow control valve 76*a* so that the ratio of the first collection flow rate to the first discharge flow rate falls within a predetermined range. For example, the valve aperture derivation step includes deriving the first valve aperture of the first flow control valve 76*a* so that the above-described first collection flow rate falls within a range between equal to or higher than 1 time and equal to or lower than 1.5 times the above-described first discharge flow rate (more preferably, so that the above-described first collection flow rate falls within a range between equal to or higher than 1 time and equal to or lower than 1.2 times the above-described first discharge flow rate). Such a first valve aperture may be derived, based on a correlation between the valve aperture of the first flow control valve 76*a* and the first collection flow rate. Alternatively, the first valve aperture may be derived through trial and error.

The valve aperture derivation step (third step ST3) includes deriving the second valve aperture of the second flow control valve 76*b* so that the ratio of the second collection flow rate to the second discharge flow rate falls within a predetermined range. For example, the valve aperture derivation step includes deriving the second valve aperture of the second flow control valve 76*b* so that the above-described second collection flow rate falls within a range between equal to or higher than 1 time and equal to or lower than 1.5 times the above-described second discharge flow rate (more preferably, so that the above-described second collection flow rate falls within a range between equal to or higher than 1 time and equal to or lower than 1.2 times the above-described second discharge flow rate). Such a second valve aperture may be derived, based on a correlation between the valve aperture of the second flow second flow control valve 76*b* and the second collection flow rate. Alternatively, the second valve aperture may be derived through trial and error.

It is to be noted that in a case where the machine tool 100 includes the third collection flow channel 73, the air supply flow channel 93, and the air injection opening OP1, the valve aperture derivation step (third step ST3) may include deriving the valve aperture of the third flow control valve 76*c* (hereinafter, referred to as a "third valve aperture") and the valve aperture of the fourth flow control valve 96 (hereinafter, referred to as a "fourth valve aperture") so that the flow rate of the fourth air discharged from the discharge opening 49 (see FIG. 14) is set to be higher than the flow rate of air injected from the air injection opening OP1 (see FIG. 14).

More specifically, the valve aperture derivation step (third step ST3) may include deriving the third valve aperture of the third flow control valve 76*c* and the fourth valve aperture of the fourth flow control valve 96 so that (1) the flow rate of the fourth air discharged from the discharge opening 49 (see FIG. 14) is higher than the flow rate of the air injected from the air injection opening OP1 (see FIGS. 14), and (2) the flow rate of the air injected from the air injection opening OP1 is equal to or higher than the above-described third flow rate (more specifically, equal to or higher than a flow rate of the design lower limit for forming the air curtain).

The above-described first step ST1 to third step ST3 are performed, for example, before the spindle lubricator 1 (or the machine tool 100) is shipped to a customer. More specifically, the above-described first step ST1 to third step ST3 are performed before the machine tool 100 is installed in a factory of a customer. In addition, for example, after the machine tool 100 is installed in a factory of a customer, a fourth step ST4 to a sixth step ST6, which will be described later, are performed. More specifically, the fourth step ST4 to sixth step ST6, which will be described later, are performed when the machine tool 100 machines a workpiece.

In the fourth step ST4, a fluid mixture containing oil and air is supplied to the plurality of bearings 3. The fourth step ST4 is a fluid mixture supply step. The fluid mixture supply step is performed using the fluid mixture supplier 6.

In the fifth step ST5, the collector 7 is operated. The fifth step ST5 is a collector operation step. The collector operation step includes operating the collector 7 in a state in which the valve aperture of the first flow control valve 76*a* is set to the above-described first valve aperture and the valve aperture of the second flow control valve 76*b* is set to the above-described second valve aperture. It is to be noted that in a case where the machine tool 100 includes the third collection flow channel 73, the collector operation step includes collecting, through the third collection flow channel 73, the third oil-containing fluid containing oil that has passed through the first bearing 31*a* without being collected by the first collection flow channel 71. More specifically, the collector operation step may include operating the collector 7 in a state in which the valve aperture of the third flow control valve 76*c* is set to the above-described third valve aperture.

In the sixth step ST6, the workpiece is machined. The sixth step ST6 is a workpiece machine step. In the workpiece machine step, the workpiece W is machined by the tool T, which is held by the rotation body 2 and which is rotated about the first axis AX1.

The fourth step ST4 to the sixth step ST6 are performed in parallel. More specifically, while the workpiece machine step is being performed, the collector 7 is operated in a state in which the fluid mixture containing oil and air is supplied to the plurality of bearings 3 using the fluid mixture supplier 6, the valve aperture of the first flow control valve 76*a* is set to the above-described first valve aperture, and the valve aperture of the second flow control valve 76*b* is set to the above-described second valve aperture.

In a case where the collector 7 is operated in a state in which the valve aperture of the first flow control valve 76*a* is set to the above-described first valve aperture, the first oil-containing fluid is suitably collected through the first collection flow channel 71 and the first pipe line 74*a*. In addition, the insufficient lubrication of the bearings due to the suction force of the first ejector 75*a* does not occur. It is to be noted that the first oil-containing fluid that has passed through the first ejector 75*a* is preferably fed to the exhaust cleaner 791 through the exhaust pipe line 78.

When the collector 7 is operated in a state in which the valve aperture of the second flow control valve 76*b* is set to the above-described second valve aperture, the second oil-containing fluid is suitably collected through the second collection flow channel 72 and the second pipe line 74*b*. In addition, the insufficient lubrication of the bearings due to the suction force of the second ejector 75*b* does not occur. It is to be noted that the second oil-containing fluid that has passed through the second ejector 75*b* is preferably fed to the exhaust cleaner 791 through the exhaust pipe line 78.

It is to be noted that in a case where the machine tool 100 includes the air supply flow channel 93 and the air injection opening OP1, the workpiece machine step (the sixth step ST6) is preferably performed in a state in which (1) the fourth air is supplied to the air supply flow channel 93, which is provided in the housing, (2) the fourth air is partially injected as an air curtain from the air injection opening OP1, which is formed between the rotation body 2 and the tip end portion 46 of the housing 4, and (3) the flow rate of the fourth air supplied to the air supply flow channel 93 is higher than the flow rate of the air injected from the air injection opening OP1.

More specifically, the collector 7 is preferably operated in a state in which the valve aperture of the third flow control valve 76*c* is set to the above-described third valve aperture, and the air supplier 9 is preferably operated in a state in which the valve aperture of the fourth flow control valve 96 is set to the above-described fourth valve aperture. When the collector 7 is operated in a state in which the valve aperture of the third flow control valve 76*c* is set to the above-described third valve aperture, the third oil-containing fluid containing the oil that has passed through the first bearing 31*a* without being collected by the first collection flow channel 71 is collected through the third collection flow channel 73 when the workpiece machine step (sixth step ST6) is performed. In addition, when the collector 7 is operated in a state in which the valve aperture of the third flow control valve 76*c* is set to the above-described third valve aperture and the air supplier 9 is operated in a state in which the valve aperture of the fourth flow control valve 96 is set to the above-described fourth valve aperture, (1) the oil being mixed into the air injected from the air injection opening OP1 is prevented, or eliminated or minimized, and (2) the air curtain is suitably formed with the air injected from the air injection opening OP1.

The present invention is not limited to the above-described embodiments or modifications, and it is apparent that the embodiments or modifications can be appropriately modified or changed within the scope of the technical idea of the present invention. In addition, various techniques used in each of the embodiments or modifications are applicable to other embodiments or other modifications as long as a technical contradiction does not occur. Furthermore, any additional configuration in each embodiment or each modification can be omitted as appropriate.

For example, in the example illustrated in FIG. 27, the machine tool 100 is a vertical machining center. Alternatively, the machine tool 100 according to one embodiment may be a horizontal machining center. Further, the machine tool 100 may be a multitasking machine capable of performing machining other than cutting.

As used herein, the term "comprise" and its variations are intended to mean open-ended terms, not excluding any other elements and/or components that are not recited herein. The same applies to the terms "include", "have", and their variations.

As used herein, a component suffixed with a term such as "member", "portion", "part", "element", "body", and "structure" is intended to mean that there is a single such component or a plurality of such components.

As used herein, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

As used herein, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

As used herein, the phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A spindle lubricator of a machine tool, the spindle lubricator comprising:

a rotation body configured to hold a tool;

a plurality of bearings comprising a first bearing and a second bearing;

a housing that supports the rotation body to be rotatable about a first axis via the plurality of bearings;

a fluid mixture supplier configured to supply a fluid mixture containing oil and air to the plurality of bearings; and a collector configured to collect an oil-containing fluid containing the oil, wherein the collector comprises a plurality of collection flow channels that are disposed in the housing to collect the oil-containing fluid from the plurality of bearings, a plurality of ejectors disposed outside the housing, and a plurality of flow control valves, wherein the plurality of collection flow channels comprise a first collection flow channel that is configured to collect a first oil-containing fluid from at least one bearing including the first bearing, and a second collection flow channel that is configured to collect a second oil-containing fluid from at least one bearing including the second bearing, wherein the plurality of ejectors comprise a first ejector that is configured to generate negative pressure due to first air supplied from a first air flow channel and that is configured to suck the first oil-containing fluid from the first collection flow channel, and a second ejector that is configured to generate negative pressure due to second air supplied from a second air flow channel and that is configured to suck the second oil-containing fluid from the second collection flow channel, and wherein the plurality of flow control valves comprise a first flow control valve that is configured to adjust a flow rate of the first air supplied to the first ejector from the first air flow channel, and a second flow control valve that is configured to adjust a flow rate of the second air supplied to the second ejector from the second air flow channel.

2. The spindle lubricator of the machine tool according to claim 1, further comprising:

a plurality of pipe lines comprising:

a first pipe line that is configured to fluidly connect the first collection flow channel with the first ejector; and a second pipe line that is configured to fluidly connect the second collection flow channel with the second ejector, wherein a valve aperture of the first flow control valve is configured to be set such that a first collection flow rate is equal to or higher than 1 time and equal to or lower than 1.5 times a first discharge flow rate, in which the first collection flow rate is defined as a flow rate of the first oil-containing fluid flowing through the first pipe line under a first condition in which the plurality of pipe lines are respectively in fluid connection with the plurality of collection flow channels and in which the fluid mixture is supplied to the plurality of bearings from the fluid mixture supplier at a first flow rate, and the first discharge flow rate is defined as a flow rate of the first oil-containing fluid discharged to an outside of the first collection flow channel from the first collection flow channel under a second condition in which the plurality of pipe lines are in fluid separation from the plurality of collection flow channels and in which the fluid mixture is supplied to the plurality of bearings from the fluid mixture supplier at the first flow rate, wherein a valve aperture of the second flow control valve is configured to be set such that a second collection flow rate is equal to or higher than 1 time and equal to or lower than 1.5 times a second discharge flow rate, in which the second collection flow rate is defined as a flow rate of the second oil-containing fluid flowing through the second pipe line under the first condition, and the second discharge flow rate is defined as a flow rate of the second oil-containing fluid discharged to an outside of the second collection flow channel from the second collection flow channel under the second condition.

3. The spindle lubricator of the machine tool according to claim 2, wherein the plurality of collection flow channels comprise a third collection flow channel that collects a third oil-containing fluid containing the oil that has passed through the first bearing without being collected by the first collection flow channel, wherein the plurality of pipe lines comprise a third pipe line that fluidly connects the third collection flow channel with a third ejector, wherein the plurality of ejectors comprise the third ejector that is configured to generate negative pressure in the third pipe line with third air supplied from a third air flow channel and that is configured to suck the third oil-containing fluid from the third collection flow channel through the third pipe line, and wherein the plurality of flow control valves comprise a third flow control valve that is configured to adjust a flow rate of the third air supplied to the third ejector from the third air flow channel.

4. The spindle lubricator of the machine tool according to claim 1, wherein the plurality of collection flow channels comprise a third collection flow channel that collects a third oil-containing fluid containing the oil that has passed through the first bearing without being collected by the first collection flow channel, wherein the plurality of ejectors comprise a third ejector that is configured to generate negative pressure with third air supplied from a third air flow channel and that is configured to suck the third oil-containing fluid from the third collection flow channel, and wherein the plurality of flow control valves comprise a third flow control valve that is configured to adjust a flow rate of the third air supplied to the third ejector from the third air flow channel.

5. The spindle lubricator of the machine tool according to claim 4, wherein the rotation body comprises a tip end portion that is configured to hold the tool, a rear end portion opposite to the tip end portion along the first axis, a first part that supports an inner ring of the first bearing and that has a first outer circumferential surface, a second part that has a second outer circumferential surface with a diameter smaller than a diameter of the first outer circumferential surface, the second part being disposed further in a first direction than the first part, the first direction being a direction from the rear end portion toward the tip end portion, and a stepped surface that connects the first outer circumferential surface with the second outer circumferential surface, wherein the housing comprises a third part that supports an outer ring of the first bearing, and a fourth part that defines an annular receiving space configured to receive the oil from a first gap between the first part and the third part, wherein the fourth part has an opening portion that is configured to guide the oil to the third collection flow channel from the annular receiving space, wherein a second gap in fluid communication with the first gap is formed between the housing and the stepped surface, and wherein a third gap in fluid communication with the second gap is formed between the housing and the second outer circumferential surface.

6. The spindle lubricator of the machine tool according to claim 5, wherein the fourth part comprises an annular projection that projects in a direction away from the first axis, and wherein the annular projection faces both the stepped surface and the annular receiving space.

7. The spindle lubricator of the machine tool according to claim 6, further comprising an air supplier, the air supplier comprising:

an air source disposed outside the housing;

an air supply flow channel disposed in the housing;

an air supply pipe that connects the air source with the air supply flow channel and via which fourth air is supplied to the air supply flow channel; and a fourth flow control valve that is configured to adjust a flow rate of the fourth air supplied to the air supply flow channel from the air supply pipe, wherein an air injection opening is formed between the rotation body and a tip end portion of the housing, and wherein the housing has a discharge opening via which the fourth air received from the air supply flow channel is configured to be discharged to a gap between the rotation body and the housing to form both a first flow toward the third collection flow channel from the gap and a second flow toward the air injection opening from the gap.

8. The spindle lubricator of the machine tool according to claim 5, further comprising an air supplier, the air supplier comprising:

an air source disposed outside the housing;

an air supply flow channel disposed in the housing;

an air supply pipe that connects the air source with the air supply flow channel and via which fourth air is supplied to the air supply flow channel; and a fourth flow control valve that is configured to adjust a flow rate of the fourth air supplied to the air supply flow channel from the air supply pipe, wherein an air injection opening is formed between the rotation body and a tip end portion of the housing, and wherein the housing has a discharge opening via which the fourth air received from the air supply flow channel is configured to be discharged to a gap between the rotation body and the housing to form both a first flow toward the third collection flow channel from the gap and a second flow toward the air injection opening from the gap.

9. The spindle lubricator of the machine tool according to claim 4, further comprising an air supplier, the air supplier comprising:

an air source disposed outside the housing;

an air supply flow channel disposed in the housing;

an air supply pipe that connects the air source with the air supply flow channel and via which fourth air is supplied to the air supply flow channel; and a fourth flow control valve that is configured to adjust a flow rate of the fourth air supplied to the air supply flow channel from the air supply pipe, wherein an air injection opening is formed between the rotation body and a tip end portion of the housing, and wherein the housing has a discharge opening via which the fourth air received from the air supply flow channel is configured to be discharged to a gap between the rotation body and the housing to form both a first flow toward the third collection flow channel from the gap and a second flow toward the air injection opening from the gap.

10. The spindle lubricator of the machine tool according to claim 9, further comprising:

a plurality of pipe lines comprising:

a first pipe line that is configured to fluidly connect the first collection flow channel with the first ejector;

a second pipe line that is configured to fluidly connect the second collection flow channel with the second ejector; and a third pipe line that is configured to fluidly connect the third collection flow channel with the third ejector, wherein a valve aperture of the first flow control valve is configured to be set such that a first collection flow rate is equal to or higher than 1 time and equal to or lower than 1.5 times the first discharge flow rate, in which the first collection flow rate is defined as a flow rate of the first oil-containing fluid flowing through the first pipe line under a third condition in which the plurality of pipe lines are respectively in fluid connection with the plurality of collection flow channels, in which the fluid mixture is supplied to the plurality of bearings from the fluid mixture supplier at a first flow rate, and in which the fourth air at a second flow rate is supplied to the air supply flow channel, and the first discharge flow rate is defined as a flow rate of the first oil-containing fluid discharged to an outside of the first collection flow channel from the first collection flow channel under a fourth condition in which the plurality of pipe lines are in fluid separation from the plurality of collection flow channels, in which the fluid mixture is supplied to the plurality of bearings from the fluid mixture supplier at a first flow rate, and in which the fourth air at a second flow rate is supplied to the air supply flow channel, wherein a valve aperture of the second flow control valve is configured to be set such that a second collection flow rate is equal to or higher than 1 time and equal to or lower than 1.5 times the second discharge flow rate, in which the second collection flow rate is defined as a flow rate of the second oil-containing fluid flowing through the second pipe line under the third condition, and the second discharge flow rate is defined as a flow rate of the second oil-containing fluid discharged to an outside of the second collection flow channel from the second collection flow channel under the fourth condition.

11. The spindle lubricator of the machine tool according to claim 10, wherein the third flow control valve and the fourth flow control valve are configured to set such that a flow rate of the fourth air discharged from the discharge opening is higher than a flow rate of air injected from the air injection opening.

12. A machine tool comprising:

a machining head comprising:

a rotation body configured to hold a tool;

a plurality of bearings comprising a first bearing and a second bearing;

a housing that supports the rotation body to be rotatable about a first axis via the plurality of bearings; and a first rotational driver configured to rotate the rotation body about the first axis;

a fluid mixture supplier configured to supply a fluid mixture containing oil and air to the plurality of bearings;

a collector configured to collect an oil-containing fluid containing the oil;

a workpiece holder configured to support a workpiece;

a mover configured to move the machining head relative to the workpiece holder; and control circuitry configured to control at least the first rotational driver, the fluid mixture supplier, and the mover, wherein the collector comprises a plurality of collection flow channels that are disposed in the housing to collect the oil-containing fluid from the plurality of bearings, a plurality of ejectors disposed outside the housing, and a plurality of flow control valves, wherein the plurality of collection flow channels comprise a first collection flow channel that is configured to collect a first oil-containing fluid from at least one bearing including the first bearing, and a second collection flow channel that is configured to collect a second oil-containing fluid from at least one bearing including the second bearing, wherein the plurality of ejectors comprise a first ejector that is configured to generate negative pressure due to first air supplied from a first air flow channel and that is configured to suck the first oil-containing fluid from the first collection flow channel, and a second ejector that is configured to generate negative pressure due to second air supplied from a second air flow channel and that is configured to suck the second oil-containing fluid from the second collection flow channel, and wherein the plurality of flow control valves comprise a first flow control valve that is configured to adjust a flow rate of the first air supplied to the first ejector from the first air flow channel, and a second flow control valve that is configured to adjust a flow rate of the second air supplied to the second ejector from the second air flow channel.

13. The machine tool according to claim 12, further comprising:

an outer wall that surrounds the workpiece holder and the machining head in a plan view;

an opening portion which is formed on the outer wall and through which the workpiece to be carried into the workpiece holder passes; and a door that opens and closes the opening portion, wherein the collector comprises an exhaust pipe line configured to receive exhaust from the plurality of ejectors, and a collection container in fluid connection with the exhaust pipe line, and wherein the collection container is either disposed outside the outer wall or disposed at a position within reach of an operator from an outside of the machine tool through the opening portion.

14. The machine tool according to claim 12, further comprising:

a plurality of pipe lines comprising:

a first pipe line that fluidly connects the first collection flow channel with the first ejector; and a second pipe line that fluidly connects the second collection flow channel with the second ejector.

15. The machine tool according to claim 14, wherein a valve aperture of the first flow control valve is configured to be set such that a first collection flow rate is equal to or higher than 1 time and equal to or lower than 1.5 times the first discharge flow rate, in which the first collection flow rate is defined as a flow rate of the first oil-containing fluid flowing through the first pipe line under a first condition in which the plurality of pipe lines are respectively in fluid connection with the plurality of collection flow channels and in which the fluid mixture is supplied to the plurality of bearings from the fluid mixture supplier at a first flow rate, and the first discharge flow rate is defined as a flow rate of the first oil-containing fluid discharged to an outside of the first collection flow channel from the first collection flow channel under a second condition in which the plurality of pipe lines are in fluid separation from the plurality of collection flow channels and in which the fluid mixture is supplied to the plurality of bearings from the fluid mixture supplier at a first flow rate, wherein a valve aperture of the second flow control valve is configured to be set such that a second collection flow rate is equal to or higher than 1 time and equal to or lower than 1.5 times the second discharge flow rate, in which the second collection flow rate is defined as a flow rate of the second oil-containing fluid flowing through the second pipe line under the first condition, and the second discharge flow rate is defined as a flow rate of the second oil-containing fluid discharged to an outside of the second collection flow channel from the second collection flow channel under the second condition.

16. A use method of the machine tool according to claim 14, the use method comprising:

deriving a first discharge flow rate that is defined as a flow rate of the first oil-containing fluid discharged to an outside of the first collection flow channel from the first collection flow channel under a second condition in which the plurality of pipe lines are in fluid separation from the plurality of collection flow channels and in which the fluid mixture is supplied to the plurality of bearings from the fluid mixture supplier at a first flow rate;

deriving a second discharge flow rate that is defined as a flow rate of the second oil-containing fluid discharged to an outside of the second collection flow channel from the second collection flow channel under the second condition;

deriving a first collection flow rate that is defined as a flow rate of the first oil-containing fluid flowing through the first pipe line under a first condition in which the plurality of pipe lines are respectively in fluid connection with the plurality of collection flow channels and in which the fluid mixture is supplied to the plurality of bearings from the fluid mixture supplier at the first flow rate;

deriving a second collection flow rate that is defined as a flow rate of the second oil-containing fluid flowing through the second pipe line under the first condition;

deriving a first valve aperture of the first flow control valve such that a ratio of the first collection flow rate to the first discharge flow rate is within a predetermined range;

deriving a second valve aperture of the second flow control valve such that a ratio of the second collection flow rate to the second discharge flow rate is within a predetermined range;

supplying the fluid mixture to the plurality of bearings using the fluid mixture supplier;

operating the collector in a state in which a valve aperture of the first flow control valve is set to the first valve aperture and a valve aperture of the second flow control valve is set to the second valve aperture; and rotating the tool about the first axis to machine the workpiece.

17. The use method of the machine tool according to claim 16, wherein the operating the collector comprises collecting, via a third collection flow channel, a third oil-containing fluid containing the oil that has passed through the first bearing without being collected by the first collection flow channel, and wherein the machining the workpiece is performed in a state in which fourth air is supplied to an air supply flow channel disposed in the housing, the fourth air is partially injected as an air curtain from an air injection opening formed between the rotation body and a tip end portion of the housing, and a flow rate of the fourth air supplied to the air supply flow channel is higher than a flow rate of the air injected from the air injection opening.

18. A spindle lubricator of a machine tool, comprising:

a rotation body configured to hold a tool;

a front bearing;

a rear bearing;

a housing that supports the rotation body to be rotatable about a first axis via the front bearing and the rear bearing;

a fluid mixture supplier configured to supply a fluid mixture containing oil and air to the front bearing and the rear bearing; and a collector configured to collect an oil-containing fluid containing the oil and comprising:

a first collection flow channel that is provided in the housing and through which a first oil-containing fluid flows from the front bearing;

a second collection flow channel that is provided in the housing and through which a second oil-containing fluid flows from the rear bearing;

a first ejector connected to the first collection flow channel and configured to generate negative pressure due to first air supplied from a first air flow channel so as to suck the first oil-containing fluid through the first collection flow channel;

a second ejector connected to the second collection flow channel and configured to generate negative pressure due to second air supplied from a second air flow channel so as to suck the second oil-containing fluid through the second collection flow channel;

a first flow control valve provided in the first air flow channel to adjust a flow rate of the first air supplied to the first ejector; and a second flow control valve provided in the second air flow channel to adjust a flow rate of the second air supplied to the second ejector.

19. The spindle lubricator of the machine tool according to claim 18, wherein the front bearing includes a plurality of bearings.

20. The spindle lubricator of the machine tool according to claim 18, wherein the rear bearing includes a plurality of bearings.

* * * * *